United States Patent [19]
Knowlton et al.

[11] Patent Number: 5,973,692
[45] Date of Patent: Oct. 26, 1999

[54] SYSTEM FOR THE CAPTURE AND INDEXING OF GRAPHICAL REPRESENTATIONS OF FILES, INFORMATION SOURCES AND THE LIKE

[76] Inventors: Kenneth Charles Knowlton, 51 Pond View Dr., Merrimack, N.H. 03054; Gary Steven Miliefsky, 3 Village La. River Crossing, Apt. 1A, Tyngsborough, Mass. 01879

[21] Appl. No.: 08/814,118

[22] Filed: Mar. 10, 1997

[51] Int. Cl.[6] .................................................. G06F 3/00
[52] U.S. Cl. .............................................................. 345/348
[58] Field of Search .................................. 345/348, 349, 345/335, 342, 346, 356, 357, 969; 395/200.53, 200.54, 200.31, 200.33, 200.47; 707/104

[56] References Cited

U.S. PATENT DOCUMENTS

| | | | |
|---|---|---|---|
| 5,572,643 | 11/1996 | Judson | 395/200.48 |
| 5,642,490 | 6/1997 | Morgan et al. | 345/342 |
| 5,701,451 | 12/1997 | Rogers et al. | 707/1 |
| 5,721,851 | 2/1998 | Cline et al. | 345/349 |
| 5,724,506 | 3/1998 | Cleron et al. | 395/200.6 |
| 5,724,595 | 3/1998 | Gentner | 707/501 |
| 5,727,129 | 3/1998 | Barrett et al. | 707/10 |
| 5,737,560 | 4/1998 | Yohanan | 345/349 |
| 5,737,619 | 4/1998 | Judson | 707/500 |
| 5,740,549 | 4/1998 | Reilly et al. | 705/14 |
| 5,781,189 | 7/1998 | Holleran et al. | 345/335 |

*Primary Examiner*—Matthew M. Kim
*Assistant Examiner*—Crescelle N. dela Torre
*Attorney, Agent, or Firm*—G. D. Clapp, Esq.

[57] ABSTRACT

A visual link mechanism residing in a local system for identifying addresses of locations in the plurality of remote systems wherein the local system is connected through a network to the plurality of remote systems. The visual link mechanism includes a visual link library and a network access mechanism responsive to a visual link including a displayable graphic icon for accessing the location represented by a selected graphic icon. Various structures of visual links are described, each being an entity existing independently of the system environment in which it resides, and the network access mechanism includes a layout table for storing a plurality of plans for arranging and displaying a plurality of visual link graphic icons in a display, a visual links organizer, a visual link screen saver, and a hash protection mechanism for detecting the unauthorized construction or modification of visual links or other forms of files. Also described is a visual link capture engine for extracting graphics information from a data file and generating a corresponding graphic icon and a display layout generator for generating display layouts of sets of predetermined numbers of displayable visual objects.

16 Claims, 17 Drawing Sheets

```
              2-UP
              1-UP
2-LEFT  1-LEFT  TARGET  1-RIGHT  2-RIGHT
              1-DOWN
              2-DOWN
```
FIG. 3B
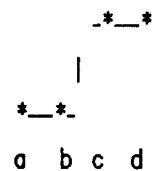
FIG. 3C
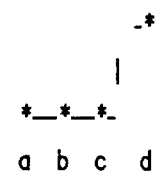
FIG. 3D
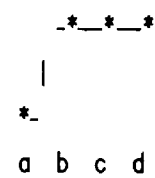
FIG. 3E
FIG. 3F
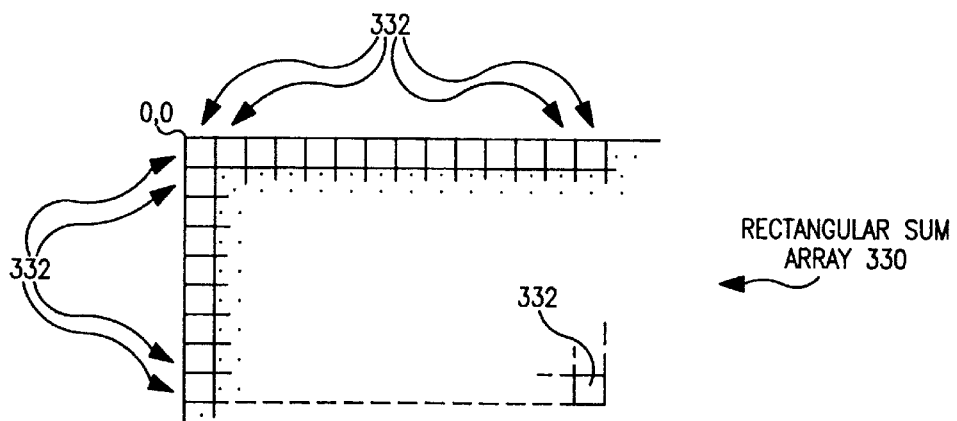
FIG. 3G
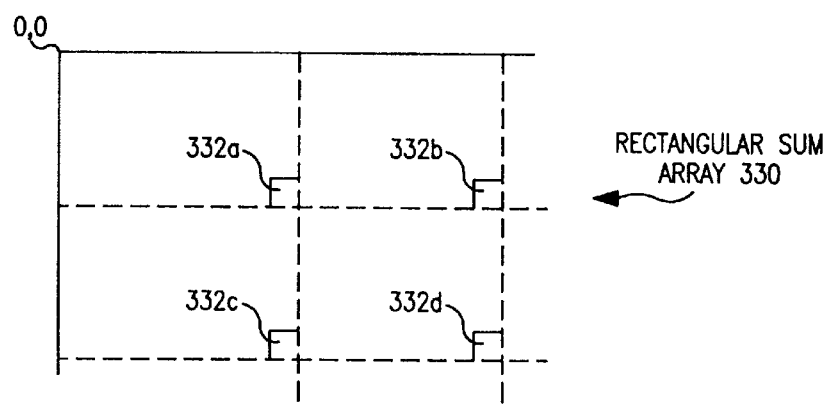
FIG. 3H

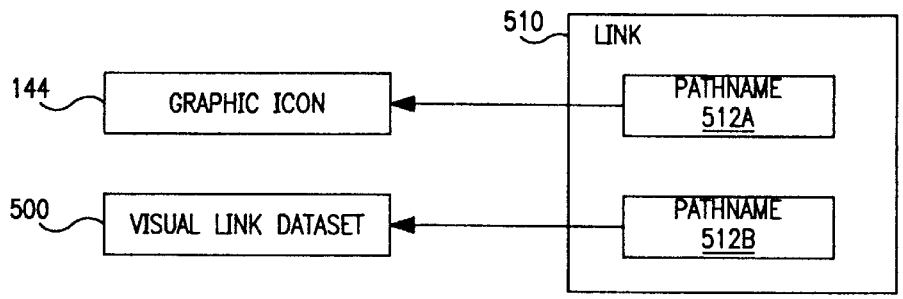
FIG. 5D
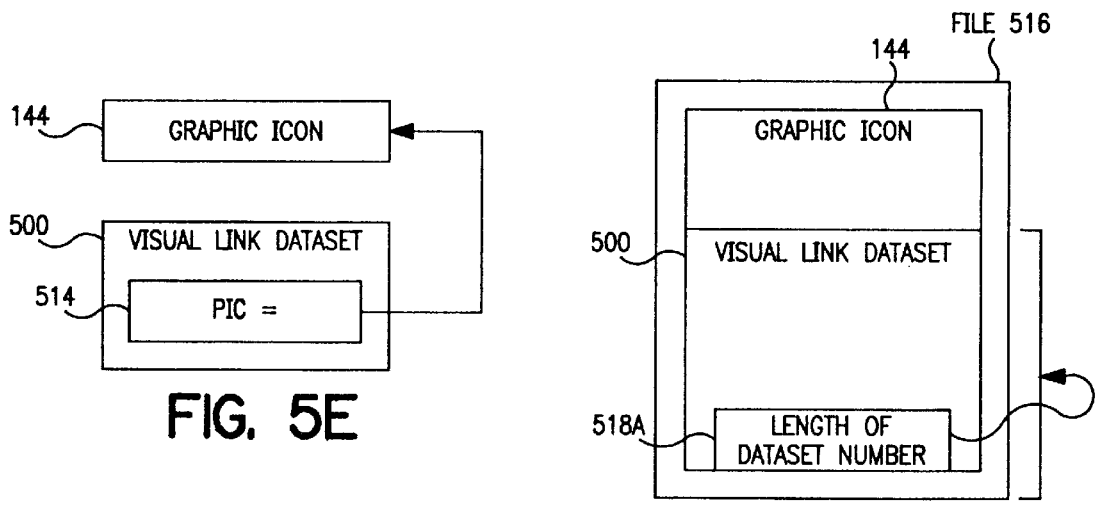
FIG. 5E
FIG. 5F
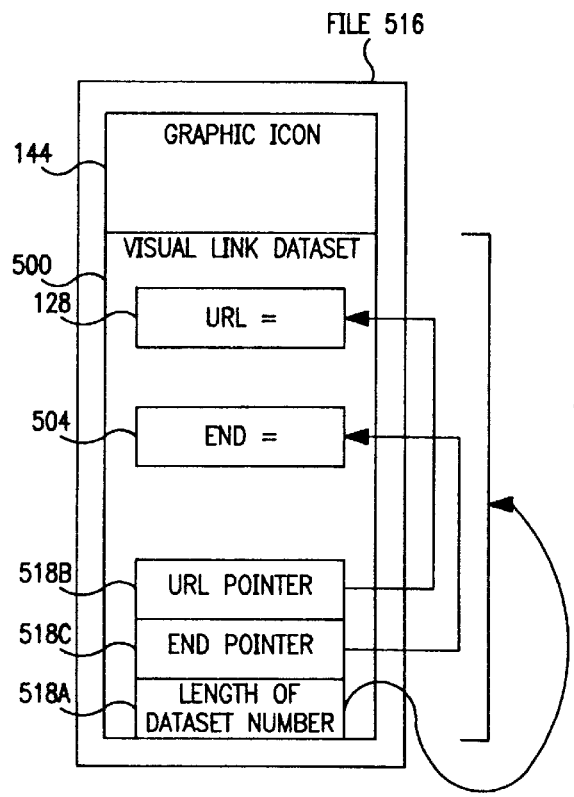
FIG. 5G

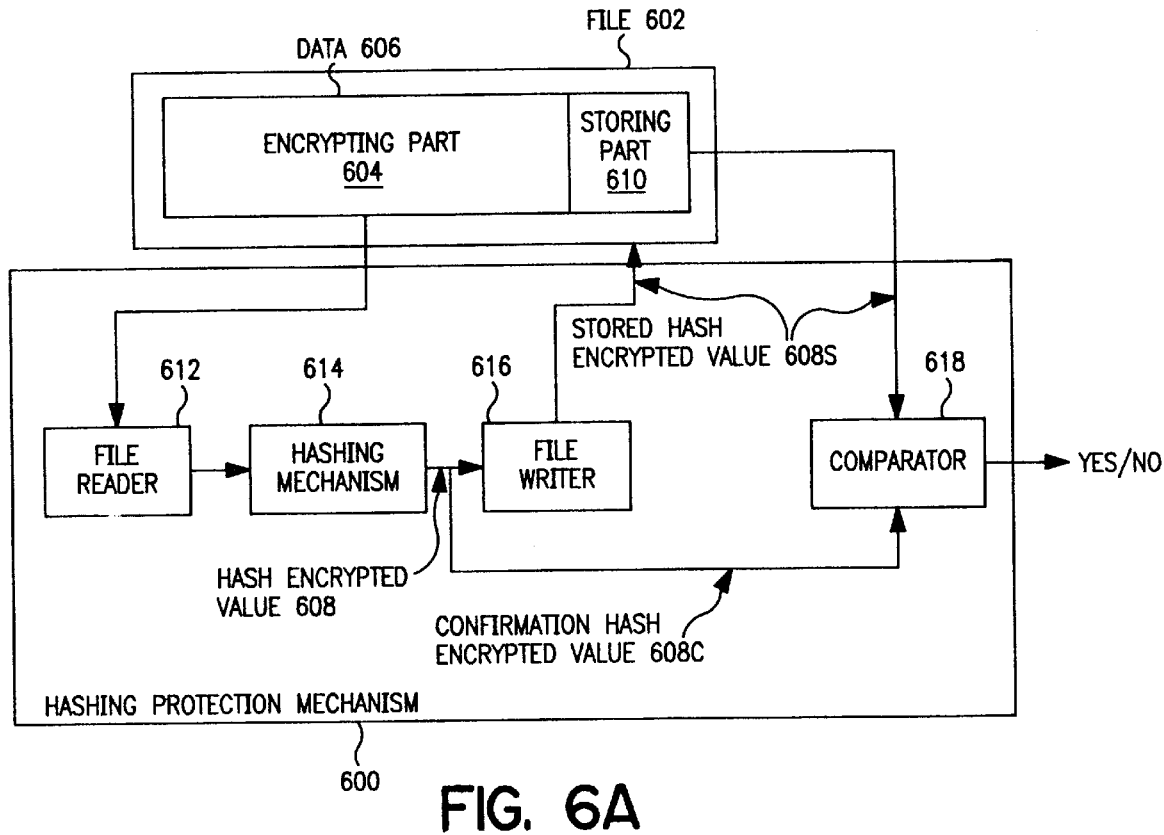

FIG. 6A

```
ORIGINAL FILE                    HASH FILE AS PROTECTED
-------------                    ---------------------
[vloascii]                       [vloascii]
VER=1.1                        1 VER=1.1
URL=http://www.foo.com         0 URL=http://www.foo.com
TTL=Welcom to FooBar           0 TTL=Welcom to FooBar
SUB=Misc. GUI stuff            1 SUB=Misc. GUI stuff
AUT=Ken Knowlton               0 AUT=Ken Knowlton
ORG=Netwave Inc.               1 ORG=Netwave Inc.
ADR=Tyngsboro MA               0 ADR=Tyngsboro MA
TEL=(509) 555-1234             1 TEL=(509) 555-1234
FAX=(508) 555-6789             0 FAX=(508) 555-6789
EML=gary@goofey.com            0 EML=gary@goofey.com
CAT=humor networks             0 CAT=humor networks
KWD=GUI browsing               1 KWD=GUI browsing
REM=an example                 1 REM=an example
SEE=http://www.bar.com         1 SEE=http://www.bar.com
UID=456789                     0 UID=456789
PWD=*&~%$#@!                   1 PWD=*&~%$#@!
UDA=                           0 UDA=
MIC=Boo! Click here            0 MIC=Boo! Click here
MOD=02-20-1997 19:09           1 MOD=02-20-1997 19:09
CRE=02-18-1997 17:07           0 CRE=02-18-1997 17:07
END=000391                     0 END=000391
```

FIG. 6B-1        FIG. 6B-2

SYSTEM FOR THE CAPTURE AND INDEXING OF GRAPHICAL REPRESENTATIONS OF FILES, INFORMATION SOURCES AND THE LIKE

FIELD OF THE INVENTION

The present invention relates to a method and apparatus for the graphical representation of bodies or sources of information and, in particular, a method and apparatus for capturing and displaying graphic representations of bodies or sources of information and for indexing and accessing the bodies or sources of information.

BACKGROUND OF THE INVENTION

The volume of information accessible to users of computer systems, either directly on a local system or indirectly through a network, such as the internet and the World Wide Web constructed on the internet, usually referred to as "the Web", has increased to the point where tracking and indexing the information so that the user can locate a given body or source of information has become a primary problem. For example, users may have literally thousands of documents, spreadsheets, and graphics files directly available on their local system and as many universal resource locators (URLs), wherein each URL essentially points to or is an address of a location of a body or source of information on the internet and contains the information required to direct a TCP/IP based protocol executing on a system to a particular location or resource on the internet and on intranets.

The problem is compounded in that the methods and means in general use for indexing such information remains relatively primitive compared to the methods and means for generating and accessing the information.

For example, it is well known and widely accepted that humans comprehend complex or voluminous information more readily when it is presented in graphical form rather than as text or numbers. This characteristic is, in fact, widely exploited in computer operating environments such as Microsoft Windows and Apple Macintosh and in most applications programs, such as Netscape Navigator, and even in much of the information itself, which is frequently graphical in nature or uses or incorporates graphical information.

The methods presently in use for indexing information or sources of information, however, generally represent bodies or sources of information, such as files or URLs, in text form, that is, as lists of alphanumeric names or designators. For example, even the computer operating environments and applications programs providing graphical user interfaces, such as Microsoft Windows, the Apple Macintosh and Netscape Navigator, either use alphanumeric designators alone or use alphanumeric designators to distinguish between otherwise identical icons representing files generically.

The systems of the prior art have generally retained alphanumeric designators to represent bodies or sources of information because of the difficulties inherent in representing each individual file or source of information with a graphic representation that is sufficiently distinguishable from other graphic representations of files or sources of information and that presents a visually strong image to a user.

The primary problem in this respect is the volume of data that must be stored to represent each file or source of information individually when there are potentially hundreds of such files or sources of information to individually designate. That is, it has been generally accepted in the prior art that it is necessary to have a relatively large and complex graphic representation of each file or source of information in order to have visually strong and distinguishable representations of files or sources of information when there is more than a relatively limited number of files or sources of information. As such, only a few specialized applications programs, such as the Corel graphics programs and, for example, hypertext markup language (HTML) pages, such as frequently used on the Web, have attempted to provide any form of graphically based indexing of files. These programs and HTML pages have generally used compressed versions of fill size images for this purpose, which are in themselves large graphics files, thereby requiring long extensive storage space and long transmission times to transfer over a network.

Related problems are, of course, the overwhelming effort necessary to generate what may be literally hundreds of unique representations to be associated with various files and sources of data, and the inherent problems in organizing and displaying such graphic representations for files and information sources on a typical display.

Still other related problems are, for example, the detection of the unauthorized construction or modification of computer files, such as visual links, and an effective method for providing encrypted authorization within a file, again such as a visual link, without increasing the size of the file or causing difficulties for human and system readers of the file.

The present invention provides a solution to these and other problems of the prior art.

SUMMARY OF THE INVENTION

The present invention is directed to a visual link mechanism residing in a local system for identifying addresses of locations in the plurality of remote systems wherein the local system is connected through a network to a plurality of remote systems and typically a memory for storing data and programs, a processor operating under control of the programs to perform operations on the data, and a display.

According to the present invention, the visual link mechanism includes a visual link library for storing visual links wherein each visual link corresponds to an address of a location in the plurality of remote systems, and a network access mechanism connected to the network for displaying the visual links to a user and allowing the user to select a visual link representing a corresponding location in a remote system. The network access mechanism is responsive to the visual link selected by the user for accessing the location represented by the selected visual link, and each visual link includes a graphic icon providing a displayable image representing the corresponding location and the address of the corresponding location.

Each visual link may also include alphanumeric information relating to the corresponding location, including a title identifying the location and text describing the location, and may include keywords relating to the contents of the location.

Each visual link preferably may include the graphic icon providing a displayable image representing the corresponding location and a visual link dataset containing information relating to the location, including the address of the corresponding location, wherein each visual link dataset may include a plurality of designators, each designator storing corresponding information relating to the corresponding location and including a graphic icon designator for storing an identification of the corresponding graphic icon, an address designator for storing the address of the corresponding location, and an end designator for indicating the end of the visual link dataset.

The designators may further include a subject designator for storing text information identifying the contents of the location, an author designator for storing text information identifying the author of the contents of the location, and a keyword designator for storing key words relating to the contents of the location.

According to the present invention, the visual link mechanism further includes a link for relating the graphic icon and the visual link dataset. In one implementation, the link comprises a file for storing a pathname of the graphic icon and a pathname of the visual link dataset and in another the link comprises a graphic icon pointer designator stored in the visual link dataset for storing an identification of the graphic icon. In still other implmentations, the graphic icon and the visual link dataset are stored in a single file, the graphic icon being stored starting at the beginning of the file and the visual link dataset following the graphic icon, wherein the visual link dataset further includes a length of dataset number stored at the end of the file and indicating the location of the start of the visual link dataset relative to the end of the file. In yet other implementations, the visual link dataset further includes an address pointer and an end pointer stored preceding the length of dataset number and indicating the locations of the address designator and the end designator in the file.

Further according to the present invention, the network access mechanism includes a layout table for storing a plurality of plans for arranging and displaying a plurality of graphic icons in display spaces wherein each plan corresponds to a display space of predetermined dimensions and to a predetermined number of graphic icons of predetermined dimensions and defining the arrangement of the graphic icons in the display space, a input for providing a set of display definition inputs wherein each set of display definition inputs includes a display space definition identifying the dimensions of a display space and a set of visual object definitions identifying a set of graphic icons of a predetermined number and of predetermined dimensions to be displayed in the display space. A display generator is responsive to the display definition inputs for reading from the layout memory a plan corresponding to a set of display definition inputs and generating a display of the identified set of graphic icons in the display space according to the corresponding plan and displaying the identified set of graphic icons on the display. In one implementation, the input for providing a set of display definition inputs includes a visual link display memory for storing groups of identifications of visual links, each group of identifications of visual links being a set of visual object definitions identifying a set of graphic icons of a predetermined number and of predetermined dimensions to be displayed in the display space.

Still further according to the present invention, the network access mechanism includes a visual links organizer connected to the display for displaying the visual links to a user and allowing the user to select a visual link representing a corresponding location in a remote system and a network communication mechanism connected to the visual links organizer and responsive to the visual link selected by the user for accessing the location represented by the selected visual link.

The visual link mechanism of the present invention may also include a visual link screen saver connected from the visual link library and to the display and responsive to operations of the local system for generating a visual link screen saver display of selected graphic icons on the display wherein the screen saver is responsive to an indication of a displayed graphic icon of the visual link screen saver display for invoking the a network access mechanism for accessing the location represented by the selected visual link corresponding to the selected graphic icon.

In other aspects, the present invention includes a hash protection mechanism for detecting the unauthorized construction or modification of visual links or other forms of files, including a file reader for reading an encryption part of a file and a stored hash encryption value stored in a storing part of the file, a hashing mechanism for generating an encrypted hash value from the data contained in the encryption part of the file, and a comparator for comparing the generated encrypted hash value and the stored hash value and determining when the generated and stored hash values are equal. According to the present invention, the storing part of the file includes data of the file separate from the encrypting part of the data of the file and the data of the storing part of the file is characterized in having alternate and semantically equivalent expressions wherein the stored hash encryption value is encoded in the data of the storing part of the file using the alternate and semantically equivalent expressions representing the data of the storing part of the file to encode the stored hash encryption value.

The present invention also includes a capture engine for extracting graphics information from a data file and generating a corresponding graphic icon forming a displayable image representing the graphics information. According to the present invention, the capture engine includes a grayscale image generator for receiving an original image and generating a corresponding grayscale image containing brightness values representing the original image, an edge image mechanism for receiving the grayscale image and generating a corresponding edge image representing areas of visually significant graphic structure in the grayscale image as represented by areas of change in the brightness values, a candidate region search mechanism for receiving the edge image and identifying initial candidate regions of the edge image representing visually significant areas of the original image, and a candidate region adjustment and comparator mechanism for selecting a candidate region to be used in generating a corresponding graphic icon and for adjusting the selected candidate region to conform to predetermined dimensions for a graphic icon.

In further aspects of the present invention, the grayscale image generator includes a grayscale lookup table for storing grayscale brightness values corresponding to each of the possible brightness values of image elements in original images, a grayscale converter for reading the brightness values of the image elements of the original image, reading the corresponding grayscale brightness values stored in the grayscale lookup table, and generating a corresponding grayscale image wherein each image element of the original image is represented by a grayscale image element having the grayscale brightness value corresponding to the brightness value of the image element.

Also according to the present invention, each image element of the original image is represented by a set of color values, the set of color values of an image element of the original element representing the color and brightness value of the image element. Accordingly, the grayscale lookup table contains a grayscale brightness value corresponding to each of the possible sets of color values of image elements in original images and the grayscale converter is responsive to the set of color values of each image element of the original image for reading the corresponding grayscale brightness values stored in the grayscale lookup table and generating a corresponding grayscale image wherein each image element of the original image is represented by a grayscale image element having the grayscale brightness value corresponding to the set of color values of the image element.

Also, the grayscale image generator generates each image element of the grayscale image from a plurality of corresponding elements of the original image so that the number of image elements in the grayscale image is proportionally reduced from the number of image elements in the corresponding original image.

According to the present invention, the edge image mechanism includes an edge image generator for receiving an input grayscale image and generating a corresponding output edge image wherein each image element of an output edge image is represented by an edge value proportionate to the difference between the brightness value of the corresponding image element in the input grayscale image and the brightness values of the neighboring image elements of the corresponding image element in the input grayscale image. An output edge image thereby represents areas of visually significant graphic structure in the input grayscale image as represented by areas of change in the brightness values of the input grayscale image.

The edge image mechanism may also include a lowpass filter connected between the grayscale image generator and the edge image generator for receiving a grayscale image and generating a corresponding filtered grayscale image of reduced resolution and provides the filtered grayscale image to the edge image generator as the correspond input grayscale image to the edge image generator, wherein each image element of a filtered grayscale image is determined as a proportioned summation of the brightness values of selected neighboring image elements of the image element of the grayscale image so that a filtered grayscale image thereby represents visual structures of significant extents of the grayscale image.

In further aspects of the present invention, the edge image generator generates each image element of an output edge image from a plurality of corresponding elements of the input grayscale image so that the number of image elements in the output edge image is proportionally reduced from the number of image elements in the corresponding grayscale input image.

Still further according to the present invention, the candidate region search mechanism includes a rectangular sum array generator for receiving an output edge image and generating a corresponding rectangular sum array having a sum element corresponding to each image element of the output edge image wherein each sum element represents the sum of the edge values of the image elements of a region of the output edge image bounded by a coordinate location of the output edge image and the output edge image element corresponding to the sum element. A rectangular sum search mechanism is connected from the rectangular sum array generator to receive the rectangular sum array for examining the summed edge values represented in each of the sum elements of the rectangular sum array and identifying at least one initial candidate region having a high summed edge value, each initial candidate region thereby representing and corresponding to a region of the original image having a significant visual structure.

Still further, the candidate region adjustment and comparator mechanism includes an edge adjuster for receiving the at least one initial candidate region and generating from each initial candidate region a corresponding grown candidate region by adjusting the extents of each initial candidate region to include all portions of significant visual structures having a part thereof contained within the initial candidate region, generating from each grown candidate region a corresponding edge adjusted candidate region by adjusting the extents of each grown candidate region so that each edge adjusted candidate region conforms to one of a set of predetermined extents for graphic icons, comparing each edge adjusted candidate region with others of the edge adjusted candidate regions and selecting the edge adjusted candidate region having the highest amount of significant visual structure, and comparing each selected edge adjusted candidate region with previously existing graphic icons. When the selected edge adjusted candidate region is similar to a previously existing graphic icon, the edge adjuster selects a next one of the at least one edge adjusted candidate regions, and, when a selected candidate region is distinguished from the previously existing graphic icons, identifies the corresponding region of the original image for use as a graphic icon.

The present invention also provides a display layout generator for generating layouts of sets of predetermined numbers of displayable visual objects of predetermined dimensions into a display area of predetermined dimensions. According to the present invention, the display layout generator includes a possible layouts generator for receiving a display space definition defining the dimensions of the display area and a visual object definition defining the numbers and dimensions of the visual objects to be arranged in the display area and generating all possible layouts of the visual objects in the display area by placing in a layout a visual object and searching forward with a next visual object to identify a placement of the next visual object and backtracking on each next placed visual object by removing the next placed visual object and selecting and placing a different next visual object until all combinations of visual objects and placements of visual objects have been exhausted.

The display layout generator further includes a layout memory for storing each arrangement of the set of visual objects in the display area generated by the possible layouts generator, a layout test mechanism for testing each new layout by comparing each new layout with previously existing layouts to determine when the new layout has a subpopulation of a previously existing layout or matches a previously existing layout and when the previously existing layout has a subpopulation of the new layout, wherein a subpopulation is a subset of the visual objects, a layout previous/next selector for selecting the new layout or the previously existing layout by discarding the new layout when the new layout has a subpopulation of a previously existing layout or matches a previously existing layout and replacing the previously existing layout with the new layout when the previously existing layout has a subpopulation of the new layout, a layouts comparator for comparing pairs of layouts stored in the layout generator memory and discarding any layout that contains a subpopulation of another layout, and a layout table for storing the final layouts for use in generating visual displays of the sets of visual objects in the display areas.

According to the present invention, the layout generator may further include a screen map generator for receivinging the display space definition and the visual object definition and generating a screen map corresponding to the defined display area and having instance locations representing possible placement locations of the visual objects in the display area, an instance pattern generator for receiving the screen map and the visual object definition and generating, for each type of visual object of the set of visual objects wherein a type of visual object is defined by the dimensions of a visual object, at least one instance pattern representing all possible instances of locations of the visual object in the screen map, and an instance pattern enumerator for enumerating the resulting instance patterns and providing the enumerated instance patterns to the possible layouts generator to be used as initial starting points in generating layouts.

The layout generator may further include a screen spatial division generator connected from the possible layouts generator for receiving the display space definition and the enumerated instances patterns and dividing the defined display area into spatial divisions along axes of symmetry, a location instances sorter for sorting, for each spatial division of the display area, the enumerated instance patterns of visual objects in each spatial division by visual object type, and generating a set of location instances of visual objects for each spatial division, a location instance search and compose mechanism for searching for and generating, from the sets of location instances of visual objects for each spatial division, at least one combination of location instances in at least one spatial division wherein each combination of location instances contains a combination of visual objects of the set of visual objects, and a super-object generator for designating each combination of visual objects as a visual super-object and providing the designations to the possible layouts generator as respresenting corresponding visual object.

The layout generator may also include a corner area examiner connected from the possible layouts generator for receiving the layouts and examining the corner areas of the layouts for unique combinations of visual objects and discarding layouts having corner areas having layouts of visual objects that are rotational or reflectional equivalents of a previously existing layout.

Finally, the layout generator may also include a screen sub-area divider connected from the possible layouts generator for receiving the display area definition and dividing the display area into sub-areas and provide to the possible layouts generator a display space definition for each sub-area for use in generating layouts for each sub-area and a screen sub-area combiner connected from the layout comparator for composing layouts for the display area by combining the layouts for the sub-areas and provide the combined layouts to the layout comparator as the layout for the defined display area.

DESCRIPTION OF THE DRAWINGS

The foregoing and other objects, features and advantages of the present invention will be apparent from the following description of the invention and embodiments thereof, as illustrated in the accompanying figures, wherein:

FIGS. 3B, 3C, 3D, 3E and 3F are diagrammatic representations of scaling and edge determination performed by the capture engine of the present invention;

FIGS. 3G and 3H illustrate the use of a rectangular sum array to determine area content by the capture engine of the present invention;

FIGS. 4E-1 through 4E-5 are block diagrams illustrating the generation of graphic icon layouts and plans by the visual links organizer;

FIGS. 5A through 5G illustrate embodiments of visual links according to the present invention; and, FIGS. 6A and 6B illustrate a hashing protection mechanism for detecting the unauthorized construction or modification of a file such as a visual link wherein FIGS. 6B-1 and 6B-2 together comprise FIG. 6B.

DESCRIPTION OF THE INVENTION

Figure 1A:
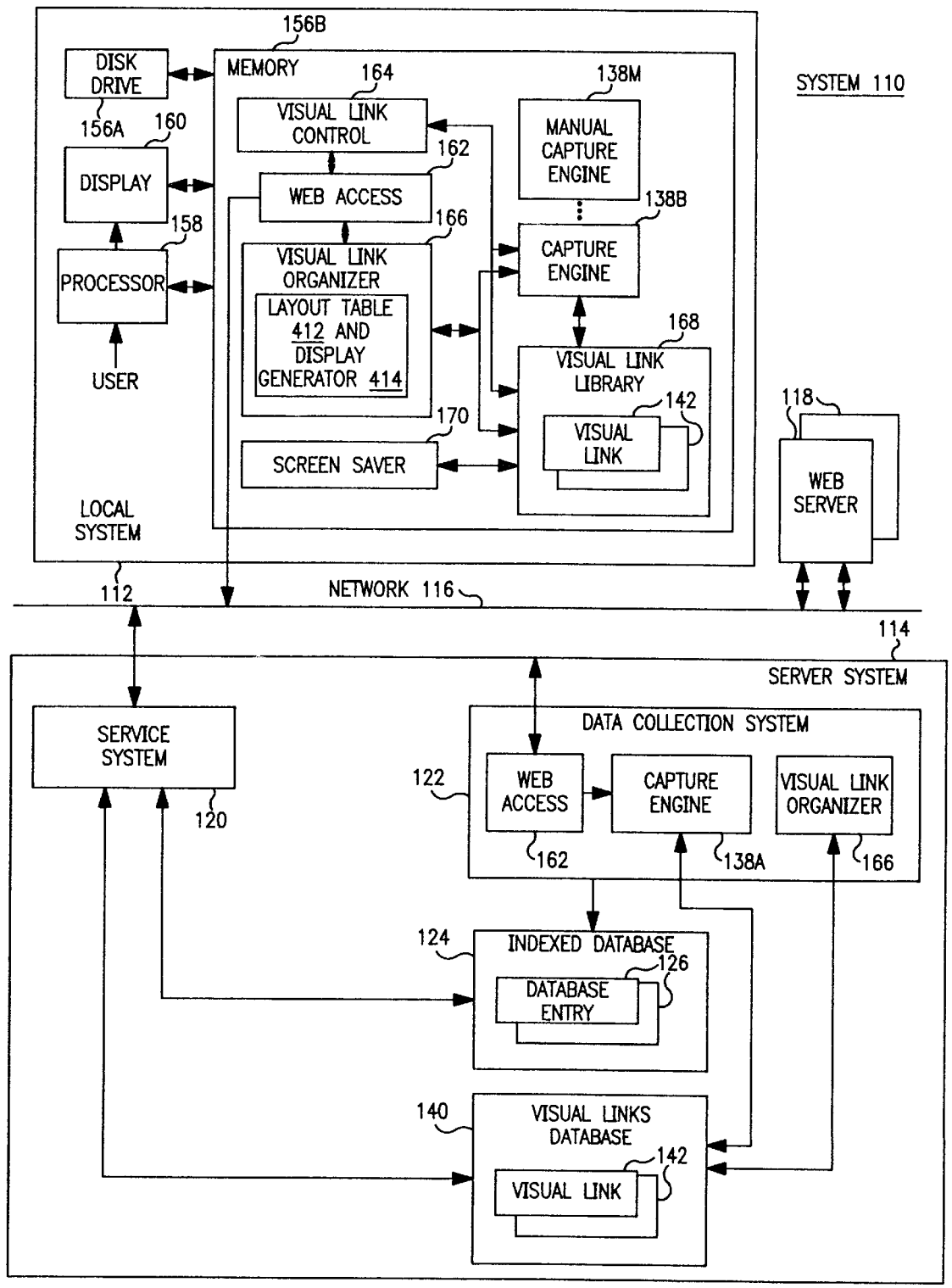
FIG. 1A is a block diagram of a system embodying the present invention.

As described above, the present invention is a system and a method and apparatus for the graphical representation of bodies or sources of information, such as files or internet or Web locations, and, in particular, for capturing and displaying graphic representations of the bodies or sources of information for use in indexing and accessing the bodies or sources of information. The following will first describe a presently preferred embodiment of a system for indexing and displaying and accessing information on the World Wide Web, hereafter referred to as the Web, and will then describe components of that system for capturing and displaying graphic representations of bodies of information, such as files, or sources of information, such as sites or HTML documents, on the Web and the use of such graphical representations to access such bodies or sources of information. It will be appreciated by those of ordinary skill in the arts, however, that the present system for indexing and displaying and accessing information accessible across or through a network is not limited to the World Wide Web and HTML documents residing therein, but is also applicable for indexing and displaying and accessing information accessible across or through other forms of networks, such as electronic mail systems, wherein a location on such a network is identified by some form of pointer or address and wherein locations, files or persons on such a network are visually identifiable to a user, for example, by means of a representative graphic icon or, in an electronic mail system, a photograph of a recipient. The following descriptions, however, will focus on exemplary embodiments of the present invention as implemented for use on World Wide Web systems as representative of all generally similar types of networks wherein users wish to identify, index and access locations, files or persons on the networks.

Finally, it will be noted that in the following each reference number is a three or four digit number comprised of two rightmost digits and one or two leftmost digits wherein the one or two leftmost digits refer to the number of the figure in which the referred to element first appears while the right two digits identify the element within the figure in which the element first appears. Once assigned, a given reference number is used throughout the subsequent figures and descriptions to refer to the corresponding element.

It will also be noted that closely related figures, that is, figures illustrating related discussions in the following description, are indicated as a group of related figures by assigning a figure number to the group of figures and distinguishing among the figures of a group by alphabetic suffixes, such as FIG. 1A, FIG. 1B, and so on. In addition, certain figures are contained on multiple drawings and, in such instances, the individual drawings comprising the figures and the portions of the figures appearing thereupon are indicated and referred to by a figure number with an appended drawing number; for example, a FIG. 3A may be related to FIGS. 3B and 3C and may be comprised of three drawings identified as FIG. 3A-1, FIG. 3A-2 and FIG. 3A-3. In a similar manner, certain figures may be optionally combined with other figures, for example, to illustrate alternate or expanded embodiments of the subject matter illustrated in a first figure, and in these instances the figures are again identified by a figure number with an appended drawing number, so that a mechanism illustrated in a FIG. 4E-1 may be extended or expanded by additional components or mechanisms illustrated in FIGS. 4E-2, 4E-3, and so on.

A. Description of a Preferred Embodiment of the Invention

1. Description of a System 110 for Capturing and Displaying Bodies and Sources of Information, and Accessing the Information (FIGS. 1A, 1B, 1C and 1D)

Referring to FIG. 1A, therein is shown a block diagram of a System 110 incorporating the present invention. The System 110 is illustrated therein as having a Local System 112 connected to a Server System 114 through a Network 116. In the present discussion, and for purposes of illustration of an embodiment of the present invention, Network 116 is the internet and, in particular, the World Wide Web (Web) implemented on the internet, and Server System 114 is a World Wide Web server while Local System 112 and Server System 114 communicate with one another and with other Web Servers 118 through an appropriate communications protocol, such as TCP/IP.

Referring first to Server System 114, as shown in FIG. 1A Server System 114 includes a Network Service System 120 for communicating with Local System 112 and Web Servers 118 and a Network Data Collector and Indexing Server 122, such as a Web "Spider", for automatically searching Network 116 to locate Web Servers 118 and to access, capture and retrieve information stored on Web Servers 118, such as in HTML documents or other forms of files. As is well known in the relevant arts, Network Data Collector and Indexing Server 122 operates to construct an Indexed Database 124 containing the information retrieved from Web Servers 118 wherein the retrieved information, is represented in FIG. 1A as stored in Database Entries 126.

Figure 1B:
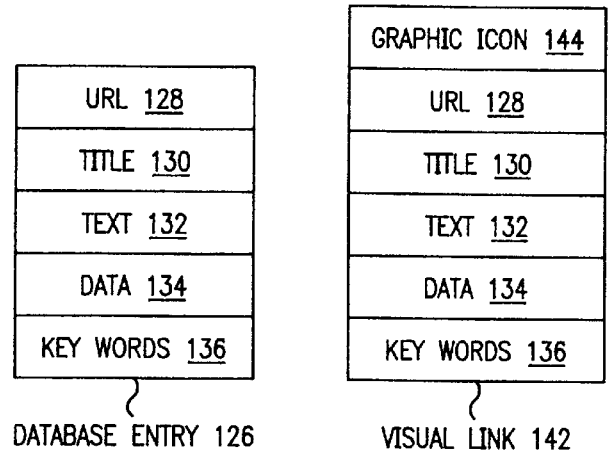
FIG. 1B is diagrammatic representations of a database entry and a visual link.

As illustrated in FIG. 1B, each Database Entry 126 will typically alphanumeric information that include a Universal Resource Locator (URL) 128, often referred to as a "link", identifying the location or address on the Web of a corresponding HTML document, a Title 130 containing text of any arbitrary length and usually comprising a name of the HTML document, a Text 132 of any arbitrary length and usually comprising a brief description of the HTML document or its contents. Each Database Entry 126 may also include a Date 134 containing the date and time the "link" was last updated, and may include Keywords 136, which may contain one or more keywords characterizing the HTML document and used to search for and locate the corresponding Database Entry 126. In other implementations, such as electronic mail systems, for example, the role of URLs in the following discussions may be fulfilled by electronic mail addresses of various forms, in a manner that will be well and easily understood by those or ordinary skill in the relevant arts.

As is well known and understood in the relevant arts, a user of Local System 112 may use a web program executing on Local System 112, such as Netscape Navigator, to access the Web and, with particular regard to the present invention, to access Server System 114 to search for Web Servers 118 having information sought by the user. Server 114 will then access and search Indexed Database 124 to locate Database Entries 126 relevant to the user's request, and will return at least portions of the Database Entries 126 to Local System 112, such as the URL 128, Title 130 and Text 132. The user of Local System 112 may then use the returned URL's 128 to access and retrieve the corresponding HTML documents from Web Servers 118 and may store a URL 128 returned from Server System 114 for subsequent use, together with its associated information. The user of Local System 112 may also, as is common practice, capture and store URLs 128 of documents and sites and their associated information, such as Title 130, and perhaps Text 132, from a document or site accessed on a Web Server 118. Again, in other implementations, such as electronic mail systems, for example, the role of a web server and index may be fulfilled by electronic mail servers of various forms and electronic mail indexes residing on electronic mail servers, in a manner that will be well and easily understood by those or ordinary skill in the relevant arts.

According to the present invention, Server System 114 further includes a Visual Links Automatic Capture Engine 138A which, as described in further detail in the following, accesses HTML pages located in Web Servers 118 by Network Data Collector and Indexing Server 122 and constructs a Visual Links Database 140 which contains Visual Links 142 corresponding to the HTML documents indexed in Database Entries 126. As shown in FIG. 1B, and as will be discussed in further detail in a subsequent description, a Visual Link 142 will include alphanumeric information including a Universal Resource Locator (URL) 128 and may include a Title 130, a Text 132, and a Date 134, and may include Keywords 136.

In addition, however, a Visual Link 142 includes a Graphic Icon 144 which is generated or extracted from the graphics and text information present in the corresponding HTML document, or other type of file, by Visual Links Automatic Capture Engine 138A and which, as described in further detail in the following, serves as a visual representation to the user of the associated document or file. Yet again, in other implementations, such as electronic mail systems, for example, the role of Graphic Icons 144 in the following discussions may be fulfilled by graphic representations of various forms of files, locations or recipients on a network, such as photographs of electronic mail recipients, in a manner that will be well and easily understood by those or ordinary skill in the relevant arts.

In alternate embodiments of Server System 114, for example, one which operates entirely with Visual Links 142, Visual Links Database 140 may entirely replace Indexed Database 124. In more typical embodiments, for example, until or unless Visual Links 142 are universally adopted, Server System 116 will operate with a mixture of text only links and Visual Links 142. Such systems may be implemented as described above, with matching, linked entries in Indexed Database 124 and Visual Links Database 140, or with text only links stored in Indexed Database 124 and Visual Links 142 stored in Visual Links Database 142. In yet other embodiments, Server System 114 may be implemented with the text portions of all links in Indexed Database 124 and any corresponding Graphic Icon 144 stored in Visual Links 142 with the text and graphics portions linked to one another, or Server System 114 may be implemented with only a Visual Links Database 140, as described above, but with the Graphic Icon 144 component of all text only links left empty.

Finally in this regard, it has been described that in certain implementations of Server System 114, Graphic Icons 144 may be generated by a Visual Links Automatic Capture Engine 138A residing in a Server System 114 from the text and graphics information contained in each HTML document, or other type of file that has been accessed by Server System 114. Graphic Icons 144 may also be generated in a like manner by a user of a Local System 112, using an implementation of Visual Links Automatic Capture Engine 138A residing in the Local System 112, or by the operators of a Web Server 118, again using a Visual Links Automatic Capture Engine 138A. It will also be noted that Graphic Icons 144 need not be generated from an HTML document by a Visual Links Automatic Capture Engine 138A, but may be generated independently by a user of a Local System 112 or the operators of a Server System 114 or a Web Server 118, or even by an independent supplier of pre-made Graphic Icons 144 using, for example, virtually any of a wide range of well known and readily available graphics creation programs, and may be used subsequently in the construction of Visual Links 142 or, for example, to replace an already existing Graphic Icon 144 associated with a Visual Link 142.

In a like manner, Visual Links 142 may also be generated or otherwise created by the operators of Web Servers 118, by the operators of Server System 114, or by the users of Local Systems 112, or otherwise provided. The Visual Links 142 so created may be embedded in the HTML documents residing in Web Servers 118 or in a Server System 114 or Local System 112, or may be stored in indexes or databases residing in a Web Server 118, a Server System 114 or a Local System 112. For example, a Visual Links 142 may be read directly from an HTML document or other file by Network Data Collector and Indexing Server 122, stored in Indexed Database 124 or Visual Links Database 140, as described above, and provided to and stored in a Local Server 112 from Server System 114. In further example, a Visual Link 142 may also be read directly by Local Server 112 when the document or other file is accessed by Local Server 112, typically by the user "clicking" on a representation of the Visual Link 142 embedded and displayed in the HTML page or file, as described below, in the manner usual for HTML links.

Figure 1C:
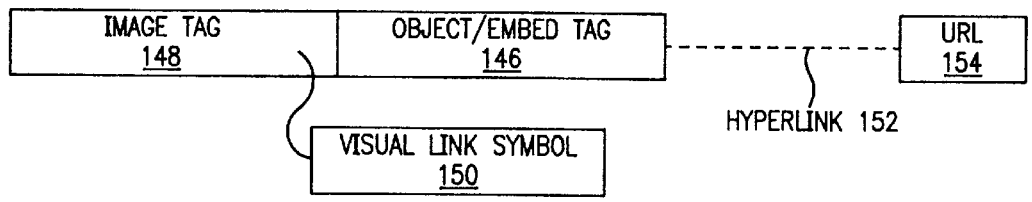
FIG. 1C illustrates the embedding of a visual link reference in a hypertext document.

Considering Visual Links 142 further, and assuming the use of HTML documents or other forms of files supporting linking, such as files generated or operated upon application programs supporting Microsoft Windows Object Linking and Embedding (OLE), a Visual Link 142 can be inserted into an HTML document by means of an OBJECT Tag or an EMBED Tag 146, depending upon whether Netscape of ActiveX standards are followed. As illustrated in FIG. 1C, the OBJECT or EMBED Tag 146 follows an IMG Tag 148 displaying a Visual Links Symbol 150 and is hyperlinked 152 to the URL 154, and associated link related information, so that a user "clicking" on Visual Links Symbol 150 will access the URL 154 and associated information. In an alternate implementation, alternate hyperlinked text or graphics, such as a Visual Link 142 may be included with the OBJECT or EMBED tag.

In this regard, it will be appreciated by those of ordinary skill in the relevant arts that there are a number of ways for a user to interact with a Visual Links Symbol 150. For example, when a user passes a mouse cursor over a Visual Links Symbol 150 or icon, the symbol or icon may be replaced by the URL or by key words or by a descriptive text so long as the cursor is colocated with the symbol or icon, or this information may be displayed in a separate window, such as a "pop-up" window.

Referring now to Local System 112, as shown in FIG. 1A, Local System 112 is, for example, a personal computer executing the Microsoft Windows operating environment and including typical components, such as a Disk Drive 156A and a Memory 156B for storing programs and data, a Processor 158 for operating on the data under control of the programs, and a Display 160 for providing a visual display of the operations of the system. Although not shown explicitly in FIG. 1A, it will be understood by those of ordinary skill in the relevant arts that Server System 114 and Service System 116 will likewise include a Disk Drive 156A and a Memory 156B for storing programs and data and a Processor 158 for operating on the data under control of the programs and will generally include a Display 160 for providing a visual display of the operations of the systems.

As also shown in FIG. 1A, Local System 112 further includes a Web Access Program 162, such as Netscape Navigator, as will Server System 114, although in a different form and implementation and capabilities from that in Local System 112, and, according to the present invention, a Visual Links Control 164 and a Visual Links Organizer 166, both of which are associated with and operate in association with Web Access Program 162. Associated with Visual Links Control 164 and Visual Links Organizer 166 is a Visual Links Library 168 for storing Visual Links 142. Local System 112 may also include a Visual Links Automatic Capture Engine 138A or 138B, perhaps in more limited form than that implemented in Server System 114, thereby allowing a user of Local System 112 to create Visual Links 142 locally, rather than only downloading Visual Links 142 from Server System 114 or Web Servers 118.

Visual Links Control 164 operates to interface and integrate Visual Links 142, Visual Links Organizer 166 and Visual Links Automatic Capture Engine 138A or 138B, if present, into Web Access Program 162, and allows a user to access the target of a Visual Link 142 and to save a Visual Link 142 in Visual Links Library 168 or a file. Visual Links Organizer 166, in turn, allows a user to create and edit Visual Links 142, to store Visual Links 142 in Visual Links Library 168, and to otherwise manage Visual Links 142 and Visual Links Libraries 168. Visual Links Organizer, which will be described in detail further below, also allows a user to organize the display of Visual Links 142 in a Visual Links Library 168.

As shown in FIG. 1A, a Local System 112 may also include a Visual Links Screen Saver 170 which is connected from Visual Links Library 168 and which is responsive to the operations of Local System 112 in the usual manner of screen savers to generate a screen saver display on Display 160. The design and operation of screen savers is well known and understood by those of ordinary skill in the relevant arts and, as such, will not be discussed further herein. It must be noted, however, that in accordance with the present invention the visual elements of the screen saver display are comprised of Graphic Icons 144 from Visual Links Library 168, and may be selected by Visual Links Screen Saver 170 at random or by user control and may, for example, include the most frequently used Graphic Icons 144 or selected layouts of Graphics Icons 144, as will be described in a following discussion. In addition, the usual operation of a screen saver utility in disabling the screen saver and returning the display presented on Display 160 to the executing operations of the system upon, for example, any mouse input by a user, may be selectively disabled, thereby allowing the mouse to be used in conjuncation is the display of Graphic Icons 144 by Visual Links Screen Saver. This operation, in turn, allows the user to select, or "click", a Graphic Icon 144 being displayed by Visual Link Screen Saver 170, in the same manner as Web Access 162 and Visual Link Organizer 166, to invoke Web Access 162 and to access the site, document or file associated with the selected Graphic Icon 144.

Lastly, it will be noted that FIG. 1A illustrates additional elements of the present invention, specifically a Layout Table 412 and a Display Generator 414 in Visual Links Organizer 166, which will be discussed in a later description of the generation and use of display layouts of Graphic Icons 144 and other displayable visual objects.

Finally, it must be noted that the functions and operations of Visual Links Control 164 and Visual Links Organizer 166 are implemented through the standard functions and utilities of Microsoft Windows in the presently preferred embodiment. The functionality and capabilities of Microsoft Windows are well known to those in the relevant arts and are well described in readily available publications, such as "Windows 3.1 Programmer's Reference" by James W. McCord and published by Que Corporation and "Inside OLE 2" by Kraig Brockschmidt and published by Microsoft Press, which are incorporated herein by reference as necessary. As such, the following will describe Visual Links Control 164 and Visual Links Organizer 166 only as necessary to describe and understand, for example, the operation of Visual Links Automatic Capture Engine 138A and of Visual Links Organizer 166 in organizing the display of Visual Links 142, which will be described in detail.

2. General Description of Visual Links Automatic Capture Engine 138 and Visual Links Organizer 166 (FIGS. 1A–1D, 2A and 2B)

As described above, a primary function of Visual Links Automatic Capture Engine 138, hereafter referred to generally as a Visual Links Automatic Capture Engine 138 and representing both Visual Links Automatic Capture Engine 138A and at least certain aspects of the embodiments of a Visual Link Manual Capture Engine 138M, is to extract graphics information from the text and graphics presented on a page of an HTML document, or other file containing graphic information, to be incorporated into a Visual Link 142 as a Graphic Icon 144. As will be seen in the following description, and because the icons generated by Visual Link Capture Engine 138 are formed of graphics information extracted from the HTML page or document referred to by the Visual Link 142 containing the Graphic Icon 144, the icons of the present invention provide visually strong, distinctive images to be used in visually identifying the corresponding HTML page or document to a user. In addition, and as will also be seen from the following, while not in itself a compressed image, a Graphic Icon 144 may require significantly less space to store and display than do the typical compressed "thumbnail" images of the prior art, and less network time to communicate from one system to another. Further, the Graphic Icons 144 of the present image, being generated from the rich variety of images available on HTML documents or pages, or in other graphics files, provide a range and variety of images not generally available in the standard types of "icons" used, for example, in Microsoft Windows applications, in part because of the slightly larger size of Graphic Icons 144 and in part because of the relative ease with which visually distinct Graphic Icons 144 are generated.

An essential function of Visual Link Capture Engine 138 is the extraction of graphics information from the graphically represented text and images present in an HTML document or page, or other form of image file, and the forming of that graphics information into a Graphic Icon 144.

Visual Link Capture Engine 138 may perform this operation in a number of ways, for example, providing a user with a mechanism to manually delineate and copy an area of an image, such as an area of an HTML page or document or other form of graphic image, to comprise the graphic information that is used to create a Graphic Icon 144. Such mechanisms are commonly known and implemented using, for example, the functions and operations available in the Microsoft Windows operating environment and used, for example, in Microsoft Paint and similar drawing programs. This approach may be used, for example, in an implementation of Visual Link Capture Engine 138 used in Local System 112, and designated in FIG. 1A as Visual Links Manual Capture Engine 138M, where a user is creating Visual Links 142 for a relatively small number of HTML documents or pages or a relatively small number of other image files.

A user may also use the facilities of a graphic paint or annotation system to add, replace, or delete, in any combination, or otherwise modify, selected parts of a selected area. A user may also, as an alternative or in combination with such operations, create a part of or the entirety of the visual image by the graphics operations of such a graphics application program or utility, or by selection of a part of or the entirety of the visual image from an independent library of images, and may modify an image or a part of an image selected from a library of images for such purposes. In such cases, the image part of a Visual Link 142 is thereby not derived, at least not totally, from the imagery of an HTML image.

In this regard, it is discussed in the following detailed descriptions of a Visual Links Automatic Capture Engine 138 that it has been found preferable, in the presently preferred embodiment, that the dimensions and aspect ratios of the Graphic Icons 144 be selected to allow efficient packing into a given display area. For these reasons, the dimensions and proportions of Graphic Icons 144 are preferably selected from a relatively small set of possible dimensions and aspect ratios to allow the efficient organization, packing and display of Graphic Icons 144 in a directory window. The method for manual selection of an area of an image to be used in generating a Graphic Icon 144 thereby preferably represents to the user not only the original image, or a section of interest thereof, and the area selected by the user for possible use in generating the Graphic Icons 144, but also the possible Graphic Icons 144 that would result from the proposed selection.

Figure 1D:
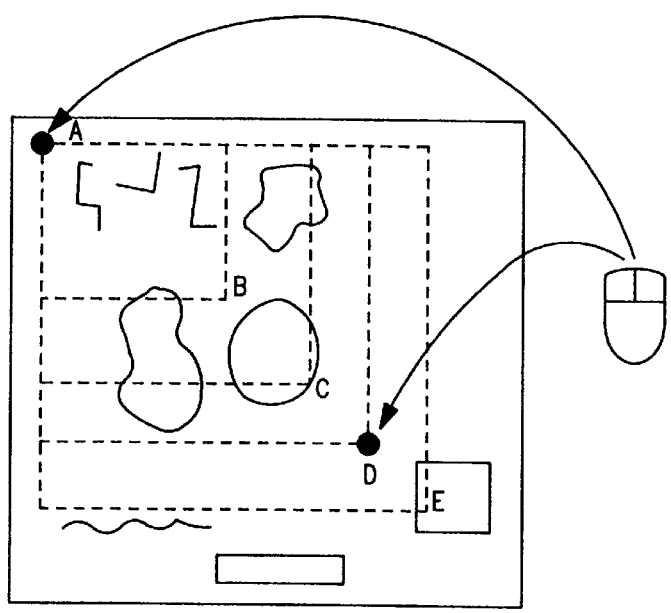
FIG. 1D illustrates the designation of an area of a hypertext document to comprise a graphic icon.

For example, the user may be provided with a mouse controlled "stretchy rectangle" to use in selecting a portion of the original image for possible use in generating a Graphic Icon 144, in the manner well known, for example, in Microsoft Windows graphics programs such as the Microsoft Paint program. The Graphic Icons 144 generation program would then display one or more representations of the Graphic Icons 144 that could result from the use of the area delineated by the user, thereby allowing the user to select one of the possible Graphic Icons 144 that would result from that selection. In another embodiment, and as illustrated in FIG. 1D, the user would use, for example, the mouse cursor to designate one corner, such as the upper left corner, of an area of the original image and the Graphic Icon 144 generation program would overlay and display on the original image a set of rectangles representing the set of possible Graphic Icons 144 wherein the set of rectangles conform to the range of dimensions and aspect ratios selected for the Graphic Icons 144, the upper left corner of each of the displayed rectangles being located at the initial point designated by the user. The user could then select one of the displayed rectangles as delineating the area of the original image to be used in generated the Graphic Icon 144, for example, by "clicking" on the lower right corner of the chosen rectangle.

As illustrated in FIG. 1D for an exemplary implementation, the upper left corner of the delineating rectangle, designated in FIG. 1D as corner A, is first positioned so as to identify the upper left of the intended area. Thereupon, in the present example, four candidate aspect ratio rectangles are displayed superimposed on the image, the bottom right corners being designated in FIG. 1D as corners B, C, D and E. The user then selects one of the candidate aspect ration rectangles by "clicking" on the bottom right corner of the selected candidate aspect ratio rectangle, whereupon the unselected rectangles cease to be displayed. The user may then re-position the entire selected candidate aspect ratio rectangle to select the most appropriate area of the image by "dragging" the upper left corner of the selected rectangle, and may resize the selected rectangle to fit the most approporiate area by dragging the bottom right corner of the selected rectangle, with the system enforcing the aspect ratio constraint for the selected rectangle.

Visual Link Capture Engine 138 as implemented in Server System 114, however, will preferably provide an automatic mechanism, designated in FIG. 1A as Visual Links Visual Link Capture Engine 138, for selecting areas of graphics images and forming them into Graphic Icons 144 because the large number of Visual Links 142 that must be generated. It may also be desirable to provide an implementation of Visual Links Visual Link Capture Engine 138 for use in Local System 112, however, for example, when a user generally lacks the skill, interest or time to create Visual Links 142 manually.

Such visual links may, for example and in one possible implementation, be held only temporarily, for example, for the duration of a session, thereby providing a visual reference for revisiting a server that was accessed earlier in the session.

In a like manner, it may be preferable to provide an implementation of Visual Links Manual Capture Engine 138M in Server System 114 for use by the operators thereof, for example, when a source image or page has no suitable areas from which Visual Links Visual Link Capture Engine 138 can generate a suitable Graphic Icon 144 or when the results generated by Visual Links Visual Link Capture Engine 138 are ambiguous. Such results may occur, for example, when a page or image is entirely comprised of low contrast visual structures or when all of the visual structures therein are comprised of fine detail text or graphics.

One solution to this problem is, and for example, to use as the "image" a few words or a legible part of the URL 154, such as the string of characters typically following In addition, and if and when the catpure engine operates automatically, it may be advantageous to display the document or web page in a selective way, for example, by omitting parts of the page comprising small text or material otherwise not directly and sufficiently descriptive of the page, such as advertisements. Such parts of a page may be omitted by use of the methods described in the following for selecting areas of an image to be used in creating Graphic Icons 144, for example, and advertisements or similar areas of a page may be omitted based upon their non-image contents, such as links to other sites.

A Visual Links Visual Link Capture Engine 138 for selecting areas of graphics images and forming them into Graphic Icons 144 must meet a number of requirements and must provide a number of functions. For example, the Visual Link Capture Engine 138 must provide an evaluation procedure and mechanism for comparing the worth, that is, the visual strength, of various proposed regions of an image, and at least affirming the validity of a region of an image as a source of image information for a Graphic Icon 144. The evaluation procedure will appropriately weight and balance the image areas, bold text areas and logos, and will be relatively insensitive and unresponsive to areas containing small fonts and fine details.

The Visual Link Capture Engine 138 will also provide an efficient mechanism for searching an image, such as an HTML page or document or other form of image, and identifying possible areas or regions to be evaluated or selected for use in creating the Graphic Icon 144. In this regard, a given image may contain an extremely large number of possible subregions which may serve as source regions for a Graphic Icon 144; for example, a 640 pixel by 1480 pixel bitmap image may contain more than 10 billion possible regions that might be used to generate a Graphic Icon 144.

In addition, the original image may appear as or be comprised of a set of definitions of graphic objects, as may be defined, for example, by hypertext markup language (HTML). In these instances, it may be desirable to cull the graphics objects for the purpose of omitting from the "original" image, and thus from consideration for use in a Graphic Icon 144, such parts of the "original" image as are commonly not suitable for use in creating a Graphic Icon 144. Examples of such may include fine text, a wallpaper background, or bitmap parts that may with high probability be automatically classified as advertisements or other pictorial subparts irrelevant to the purpose of visually depicting the essential visual appearance of the original image. Again, such parts or components of an original image may be culled based upon the methods described herein, or upon their contents.

Finally, the image information extracted from a graphics image, which may be of various dimensions and proportions, must be shaped into a Graphic Icon 144. In this regard, however, a single fixed aspect ratio, for example, of 3:4, for either the extracted graphics information or the Graphic Icon 144 is too constraining considering the possible areas or regions that may be selected from a given graphics image as most distinctive and most unique to that graphics image, both in itself and relative to other graphics images. It is preferable, however, to efficiently organize and display the maximum number of Graphic Icons 144 in, for example, a directory window, and, for this reason, the dimensions and aspect ratios of the Graphic Icons 144 will preferably be selected to allow efficient packing of any arbitrary set of icons into a given display area. For these reasons, the dimensions and proportions of Graphic Icons 144 are preferably selected from a relatively small set of possible dimensions and aspect ratios to allow the efficient organization, packing and display of Graphic Icons 144 in a directory window.

Visual Link Capture Engine 138 will therefore provide an Visual Link Capture Engine 138 that automatically shapes the extracted image information into a Graphic Icon 144 selected from a relatively small set of possible dimensions and aspect ratios that are selected for efficient packing into a display area.

In a related problem, Visual Links Organizer 166 will provide a mechanism for efficient packing any arbitrary collection of Graphic Icons 144 having various dimensions and aspect ratios from that set of dimensions and aspect ratios into a display area.

First considering the evaluation procedure and mechanism for comparing the worth, that is, the visual distinctiveness, of various proposed regions of an image, and affirming the validity of a region of an image as a source of image information for a Graphic Icon 144, it is apparent that bold text and pictorial material, that is, large or highly contrasting features or areas of text or image, are significantly more visible and distinctive than are areas of, for example, fine text or low contrast pictorial material.

According to the present invention, as and described in further detail below, the most visually significant features of an image, that is, the largest and highest contrast or highest visibility features, are emphasized, and the less significant features suppressed, by coarsening and blurring the overall image, which is usually in the form of a bitmap image. Also according to the present invention, the features or regions of most significance in an image will generally be as evident in a gray-scale version of a bitmap as in a color version, so that a gray-scale version of the image may be used rather than the color version to simplify and speed the task of identifying the regions or features of most significance.

Pursuant to evaluation, therefore, a coarse grayscale version of the original image, for example, ¼ the linear size in pixels of the original image, is low-pass filtered, and an "edge" image is made from the coarse grayscale version of the original image, wherein the edge image is regions having high numerical values in the regions of high non-uniformity of the filtered image. The amount of blurry "edge" in any subrectangle, relative to its size, is taken as an approximation of the degree to which this rectangular area contains visually bold or significant information.

It is anticipated that some very small regions of the coarse grayscale version of the original image may contain high evaluations of edge-per-area, yet not be suitable for use as Graphic Icons 144. Therefore, and according to a presently preferred embodiment of the invention, candidate areas are required to be of predetermined minimum size and the criteria by which regions are rejected for consideration includes size. As such, and in the present implementation, if two areas exhibit the same average amount of edge-per-pixel, then the larger of the two is deemed to be the better region to be used in creating the Graphic Icon 144.

Because the Visual Link Capture Engine 138 searches for bold and coarse features, and because, for reasons discussed in the following, it is not necessary to locate the boundaries of the Graphic Icon 144's source area in the original image or in the coarse grayscale version of the original image with pixel accuracy, the Visual Link Capture Engine 138 performs a first search with a second, very low-resolution image. The very low resolution image is constructed, for example, made from the ¼ size edge image and is, for example, 1/16 the linear size of the original image, or ¼ the size of the ¼ scale edge image. The use of such a low resolution image, have a proportionally smaller number of total pixels and a correspondingly smaller number of pixels in each sub-region thereof, the Visual Link Capture Engine 138 can perform a relatively thorough search, involving crude test-for-appropriateness of a very wide range of sizes, locations and aspect ratios of initially selected regions of the original image. Subsequent refinement of the area or areas thus found is then based on the more accurate ¼ size edge image.

Once a suitable area of the ¼ size edge image is found, the candidate area, which in the present embodiment of the invention is a rectangle, is refined by the process of iteratively pushing one or another side of the rectangle outward by one row of pixels so long as this increases the rectangle's worthiness for use in creating the Graphic Icon 144, and finally adjusting each side of the rectangle inward or outward accordingly as the rows of pixels just inside or just outside of the rectangle have or do not have significant edge indications. That is, a side of the rectangle is retracted the if the strip of pixels inside that side contains little or no edge feature and the side of the rectangle is extended if the edge indications in the strip of pixels outside that side indicate the continuation of features already partly contained in the rectangle.

Finally, it has been described above that the rectangle of image information extracted from a graphics image as representing the visually most distinctive and unique area of the original image may be of various dimensions and proportions. It has also been described that the selected rectangle of graphic information is then preferably shaped into a Graphic Icon 144 having a size and aspect ratio selected from a relatively small set of possible dimensions and aspect ratios to allow the efficient organization, packing and display of Graphic Icons 144 in a directory window.

In a presently preferred embodiment of the invention, the set of possible aspect ratios for the final Graphic Icons 144 have been chosen to include aspect ratios of 6×2 (units of height to width), 4×3, 3×4 and 2×6 as these aspect ratios result in Graphic Icons 144 having the same total area and because an arbitrary group of Graphic Icons 144 having these aspect ratios will pack efficiently into a given display area. The ultimate icons will therefore be resized, according to one exemplary set of sizes, to be 120 pixels high by 40 pixels wide, or 80 pixels high by 60 pixels wide, or 60 pixels high by 80 pixels wide, or 40 pixels high by 120 pixels wide, or they may be slightly less in one or both dimensions but will be deemed nominally to "occupy" these screen display areas. Accordingly, and because the region of the original image that has been selected as visually most distinctive and unique will rarely have one of these predetermined aspect ratios, a final adjustment of the area or region of graphic information that has been selected and extracted from the original image is necessary to conform the selected area or region to one of these predetermined aspect ratios.

A number of such adjustment processes are possible, and the presently preferred embodiment of the Visual Link Capture Engine 138 may or does use any or any combination of these adjustment processes. For example, in a first process, the icon may be left in the shape as extracted from the original image and placed in a final display into the best-fitting shape of area, leaving blank unused area on left and right, or on top and bottom. In a second process, the icon can be distorted by a vertical or horizontal stretch so that it fits such an area and, in a third process, the area from which the icon is cut may be extended either vertically or horizontally to match an acceptable shape while, in a fourth process, a combination of stretching, of up to, perhaps, 10%, may be combined with an extension of the source area. Finally, in yet another method, and if and where a background color can automatically be discerned, that color may be used to fill the extra area so that the icon's sides do not make a disconcerting cut through other visual objects in the vicinity.

In all cases, therefore, the Graphic Icons 144 are produced by appropriate scaling, so that they each occupy the same amount of screen area and pack efficiently into the display screen area, such as directory window. In addition, and as discussed in the following, the Graphic Icons 144 may be but are not necessarily all created to the same color scheme, such as the 256 color standard used in Microsoft Windows, so that they can be displayed simultaneously, and in certain implementations the final color compatibility may be achieved by a color conversion just preceding the display of the icons to a user. Finally, and in addition to the above described advantages, each display of Graphic Icons 144, such as a directory or folder in the directory, will, as a whole, present a certain distinctiveness because of its near-unique combination and placement pattern of Graphic Icons 144, thereby providing the user with a further visual aid for looking for, remembering and recognizing individual Graphic Icons 144.

Finally, the various images and versions of images used by the visual Link Capture Engine 138 of the present invention and described above are illustrated in FIG. 2A wherein Image 210 represents the original image of an HTML page or document, or other graphics image, and Grayscale Image 212 represents the ¼ size grayscale image generated from Original Image 210 and Filtered Grayscale Image 214 represents low pass filtered, that is, coarsened and blurred image generated from Grayscale Image 212 and Edge Image 216, in turn, represents the edge image generated from Filtered Grayscale Image 214. Coarse Edge Image 218 then represents the 1/16 scaled image generated from Edge Image 216 for purposes of identifying candidate regions from which to construct the Graphic Icon 144, while Graphic 44 Image 220 represents the region of Original Image 210 that has been selected, as described above, for construction of the Graphic Icon 144, and Graphic 44 represents Graphic 44 Image 220 after adjustment to one of the predetermined sizes and aspect ratios chosen for Graphic Icons 144, that is, Graphic 44 is the final Graphic Icon 144.

It will be noted that the presently preferred embodiment of Visual Link Capture Engine 138 operates with grayscale images, that is, the relative "brightness" of image components, in identifying those areas of an original image most suitable for incorporation into a Graphic Icon 144. As such, the following descriptions of Visual Link Capture Engine 138 will primarily focus on the grayscale implementation of the processes for generating Graphic Icons 144.

Alternate implementations of the Visual Link Capture Engine 138, however, may utilize the color information, that is, such as the red, green and blue components, of Original Image 210 in identifying the visually most significant and unique region of the image. The methods, processes and mechanisms of the capture engine of the present invention as implemented for the use of color information are very similar to those for the use of grayscale images, however. As such, the use of color image information will be discussed briefly in the following, using FIG. 2A for purposes of illustration, before continuing with a detailed discussion of the mechanisms using grayscale information and those of ordinary skill in the relevant arts will understand the adaptation of the grayscale mechanisms to the use of color information.

In a presently preferred embodiment of a Visual Link Capture Engine 138 using color information, the colors are not treated separately through the entire process. Instead the color information is included or combined into a single edge image corresponding to and equivalent to ¼ scale Filtered Grayscale Image 214 and this color Filtered Grayscale Image 214 is then used in the processes and mechanisms described in the following in the same manner as a grayscale Filtered Grayscale Image 214.

As will be described in the following with regard to the grayscale implementation of Visual Link Capture Engine 138, the amount of "edge" at a given pixel of an image is an indication of how much the "brightness" of the image is changing at that pixel and is thereby an indication of the distinctiveness of that region of the image relative to other regions of the image. In the implementation of Visual Link Capture Engine 138 using color information, however, the amount of "edge" at a pixel of the image is an indication of how much the red or green or blue components of the image, or any combination of the red, green or blue components of the image, are changing in that region, as well as an indication of how much the "brightness" of the image is changing at that region. The amount of "edge" therefore reflects the amount of "color-and-brightness" change, which is generally referred to in brief as the "color" change.

This embodiment of Visual Link Capture Engine 138 thereby determines a "color change" at each pixel of the blurred image wherein the color change may be usefully defined and used as any of a number of measures. For example, the color change may be defined and determined as the red component change plus the green component change plus the blue component change plus the brightness component change at a pixel, wherein the brightness component change is the only component considered in the presently preferred grayscale implementation of the capture engine described below. In one implementation, the red component change at a pixel may, for example, be determined as the red component left-right change across the pixel plus the red component above-below change across the pixel, and likewise for the green, blue and brightness components. The left-right and above-below changes at a given pixel and for a given component may, in turn and for example, be defined as the absolute values of the differences between that component at the pixels to, respectively, the left and right and above and below that pixel. In yet other implementations, the change in a component may be defined as either the larger of the absolute value of the difference in the component between the top and bottom neighbors of each pixel or the absolute value of the difference in the component between the right and left neighbors of each pixel, thus separately considering changes occurring in the horizontal and vertical directions.

The "amount of edge" at given pixel, in turn, may be determined as the average, for that pixel, of each of the component changes and, in another implementation, as the maximum of the component changes, rather than the average.

Whichever method is used, this process thereby determines for, each pixel, a value depending upon both how much the brightness component is changing in a given direction at each pixel and how much the red, green and blue components are changing in that direction at each pixel. For example, given a "pie chart" wherein the different sections of the chart have approximately the same brightness but are drawn in different colors, this process will determine significant "edge" along the radial division lines between the sections of the chart.

Figure 2A:
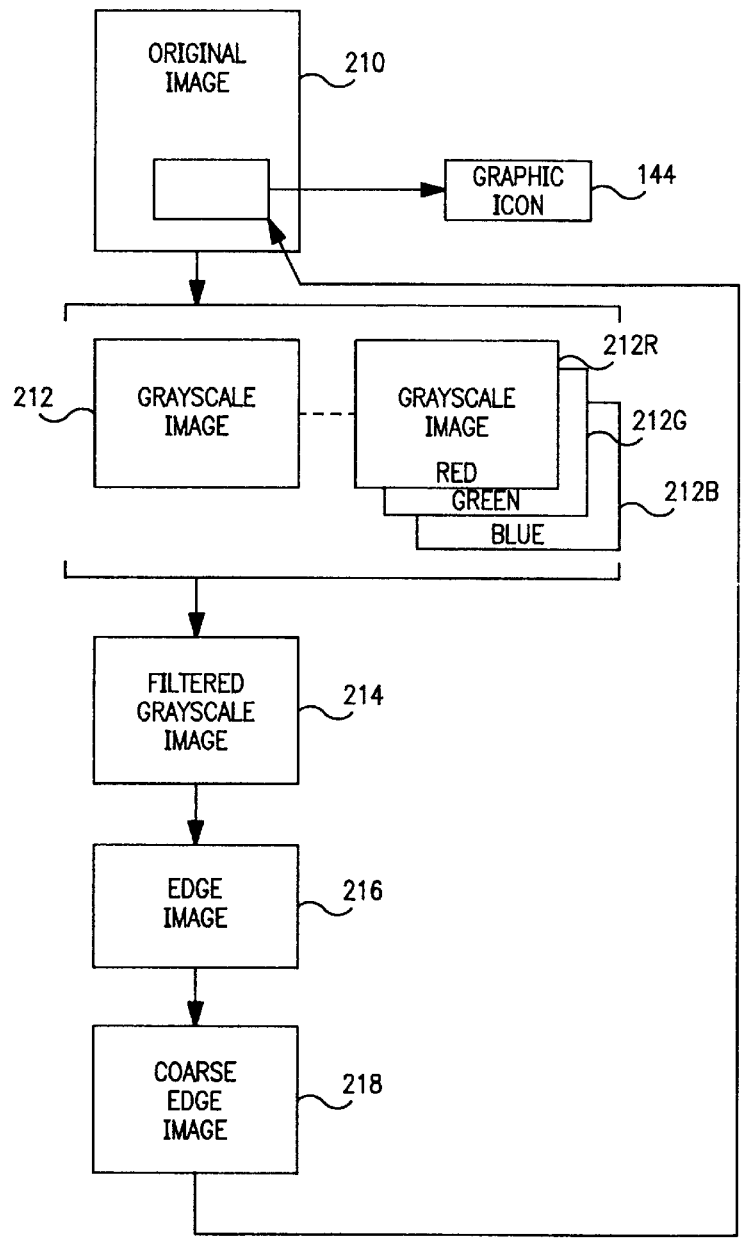
FIG. 2A is a diagrammatic representation of the image data structures generated and used in capturing a graphic icon.

It will be noted that in yet another alternate implementation of the capture engine using color information, Visual Link Capture Engine 138 may generate three Grayscale Images 212 wherein each Grayscale Image 212, respectively designated in FIG. 2A as Red Color Image 212R, Green Color Image 212G, and Blue Color Image 212B, contains the grayscale equivalent values of, respectively, the red, green and blue components of Original Image 210. The Visual Link Capture Engine 138 will then execute the same operations as described above, but for each of the three Color Images 212R, 212G and 212B separately, and will generate three corresponding Coarse Edge Images 218, one corresponding to each of Red Color Image 212R, Green Color Image 212G, and Blue Color Image 212B. In one implementation, the three Coarse Edge Images 218, which could possibly correspond to three different candidate regions of Original Image 210, are then evaluated as described above to select the visually most significant and unique region of the original image to use in constructing the Graphic Icon 144 as described above.

In one alternate implementation of the three color image process, the Visual Link Capture Engine 138 uses the three original Coarse Edge Images 218 corresponding to Red Color Image 212R, Green Color Image 212G, and Blue Color Image 212B to select the region or regions of the original image providing the visually most significant and unique region or regions of the original image, each being selected on the basis of a single color component, that is, red, green or blue. The result may again be one, two or three different candidate regions of the original image, depending, for example, on whether any of the single color component Coarse Edge Images 218 overlap. The Visual Link Capture Engine 138 then generates a Red Color Image 212R, Green Color Image 212G, and Blue Color Image 212B for each candidate region selected on the basis of the individual color components. In most instances, however, the automatic color mechanism need only generate two new grayscale images for each region as each region will already be represented by one grayscale image. For example, if a given region has been selected of containing the visually most significant area of Original Image 210 based upon the red color component, a Red Color Image 212R and the corresponding Filtered Grayscale Image 214, Edge Image 216 and Coarse Edge Image 218 will already exist, so that the Visual Link Capture Engine 138 need generate this images only for the blue and green components.

The capture mechanism would then perform the above analysis of each candidate region, but three times, once for each color component of each candidate region, and combines the three evaluations for each candidate region to generate a value representing the visual merits of each candidate region. The Visual Link Capture Engine 138 then selects the visually most significant of the candidate regions to use in constructing the Graphic Icon 144 as described above.

Returning to consideration of the operation of Visual Link Capture Engine 138 using only brightness information, the above described capture of image information and creation of a Graphic Icon 144 can be illustrated by way of an example. In this instance, it is assumed that the Original Image 210 exists in one of the more complex image formats, such as the 256-color bitmap image format wherein each byte value 0–255 corresponds to a color whose red, green and blue components are defined in an auxiliary color lookup table (LUT).

The Visual Link Capture Engine 138 first reads the color LUT and composes a gray-scale LUT whereby the brightness of each of the 256 colors is taken to be the average of that color's red, green, and blue component values. It will be noted in this regard that alternative and more refined measures of brightness are known to those of skill in the relevant arts, but this method is sufficient for the present embodiment of the Visual Link Capture Engine 138. Then, and assuming for purposes of the present example that the bitmap comprising Original Image 210 is free of border, marginalia or other extraneous accouterments, the Original Image 210 bitmap is read and processed into a ¼ size grayscale image comprising Grayscale Image 212. As such, 116 source pixels of Original Image 210 contribute to each destination pixel of Grayscale Image 212 and this conversion is accomplished by adding and averaging the brightness of the 116 source pixels corresponding to each Grayscale Image 212 pixel, as taken from the gray-scale LUT.

The low-pass filtered image comprising Filtered Grayscale Image 214 is then created from Grayscale Image 212 by use of a kernel array of coefficients, that is, by multiplying neighboring pixels of Grayscale Image 212 by the numbers of the kernel array and dividing by 18, wherein an exemplary kernel array may be represented by

00100

01210

12221

01210

00100, and wherein the value 18 is the sum of the multipliers in the kernel.

In then creating Edge Image 216, it must be noted that the value of each pixel of Edge Image 216 depends on the values of the left, right, top and bottom neighbors of the corresponding source pixel in Filtered Grayscale Image 214. The value of each pixel of Edge Image 216 may therefore be found by finding the brightness difference between left and right neighbors and the brightness difference between top and bottom neighbors, and then adding the absolute values of these values, multiplying each result by a first constant, subtracting a second constant, and clipping the result for each pixel of Edge Image 216 to a minimum value of 0 and maximum value of 255. Alternatively, the value of each pixel of Edge Image 216 may be determined as the absolute difference between the corresponding left and right vs. top and bottom pixels of Filtered Grayscale Image 214, which tends to emphasize horizontal and vertical edges in the images. In yet another alternate implementation, the same method may be executed, but using the red, green and blue color components, as described above, thereby causing the Visual Link Capture Engine 138 to evaluate the candidate regions of the original image on the basis of image structures exhibited by differences in color as well as brightness.

The value assigned to each block, or coarse pixel, of the resulting extremely coarse ¹⁄₁₆ size edge image, that is, Coarse Edge Image 218, is then the sum of a corresponding 4×4 pixel block of Edge Image 216 pixels, these values being stored as word-size values rather than byte-size values.

The Visual Link Capture Engine 138 then determines the rectangular region to be used as source for the Graphic Icon 144 by executing four distinct steps, or operations:

(1) an initial rectangular region is found by exhaustive search in the very coarse image, Coarse Edge Image 218;

(2) by reference to the ¼ size image, Edge Image 216, this area is extended on any or all sides so long as its figure of merit increases;

(3) by iterative successive treatment, each side of the grown rectangle is adjusted either in or out as best fits the edge structure found in the local area (cutting back if the rectangle has extended into empty space and pushing out if structure seems to have been truncated); and, (4) the otherwise "final" area is adjusted to conform to one of the selected aspect ratios to form the Graphic Icon 144.

Considering each of these operations further, the mechanism for examining candidate rectangles will be discussed in a following detailed description and it will shown therein that the mechanism used in the presently preferred embodiment of Visual Link Capture Engine 138 permits fast summing values in candidate rectangles, thereby allowing Visual Link Capture Engine 138 to test a large number of candidate rectangles quickly and efficiently. As such, the initial candidate rectangle is found by exhaustive examination of all candidate rectangles in a Coarse Edge Image 218 having widths in the range of 6 through 10 pixels less-than-full-wideth pixels and heights in the range of 6 through 10 less-than-full-height pixels. That is, the starting rectangle must be at least 6 pixels of the $\frac{1}{16}$ size image and at most ten less than the full size rectangle in both the horizontal and vertical directions so that the search in the coarse space is exhaustive execpt for very thin and very tall or very wide rectangles. The evaluation of these candidate rectangles on the same basis that is subsequently used to evaluate growth of the selected rectangle, which will thereby be equally exhaustive and with the same possible exceptions. It will also be noted that 6-through-10 pixel high by 6-through-10 pixel wide rectangles of Coarse Edge Image 218 were selected as providing areas having an acceptable probability of containing at least parts of visually significant image structures while being sufficiently small as to reduce the processing burden.

As described above, the search for and subsequent modification of suitable candidate rectangles for the generation of Graphic Icons 144 requires a method for the evaluation of each rectangle or modification thereof, that is, the determination of a "figure of merit" or "figure of assurance" for each candidate rectangle. The search for a suitable area of an image to comprise of Graphic Icon 144, or a proposed modification of a candidate rectangle to determine whether the candidate rectangle is improved by moving the sides of the rectangle inwards or outwards, results in each case in a local maximum in the total search space wherein the local maximum has a "value" and a "sharpness" which together can be used to express a figure or merit or assurance that the rectangle is the or a proper area to be used in generating a Graphic Icon 144. In addition to being used by Visual Link Capture Engine 138 to evaluate a candidate rectangle or a modification to a candidate rectangle, the figure of merit or assurance can then be used to flag or otherwise indicate results having a low figure of assurance for subsequent human approval or correction, for example, by use of a Visual Links Manual Capture Engine 138M.

It will be appreciate by those of ordinary skill in the arts that the value component of the figure of merit or assurance of a candidate rectangle is a function of the location of the candidate rectangle in the image and the size of the candidate rectangle. That is, the location of a candidate rectangle determines which area of the image is included in the rectangle and, in turn, is a function of the average amount of image "edge" in the candidate rectangle, wherein "edge" may be defined as the local degree of visual coarse structure non-uniformity of image in the selected area of the image. The degree of local visual coarse structure non-uniformity, in turn, may be generally defined as the amount of contrast, or difference, in brightness or color between adjacent areas in the rectangle and the "sharpness", or abruptness, of the boundary between adjacent areas of different brightness or color in the rectangle, that is, how fast does the change in brightness or color occur when moving from one area to another.

The criteria of "sharpness" also applies in the steps wherein the sides of a candidate are adjusted inwards or outwards to incorporate the entirety of a visually strong local structure already at least partially included in the candidate rectangle into the final candidate rectangle. In this sense, "sharpness" is a measure of how fast and in what direction the figure of merit or assurance value of the candidate rectangle changes per unit distance as a side of the rectangle is moved inwards or outwards.

In this regard, it will be appreciated by those of ordinary skill in the arts with respect to the determination of a figure of merit or assurance of a candidate rectangle that the step of generating Filtered Grayscale Image 214 is essentially a pre-processing step with respect to the search for and evaluation of candidate rectangle wherein small text and low resolution or low contrast areas of the original image are discarded as being of little value in generating a Graphic Icon 144 presenting strong visual components to a viewer.

Finally, the size of the rectangle determines the amount of original image incorporated into the candidate rectangle and in the presently preferred embodiment of Visual Link Capture Engine 138 is selected on the general principle that a larger candidate rectangle is preferable over a smaller candidate rectangle.

In the presently preferred embodiment of Visual Link Capture Engine 138, therefore, the figure of merit or assurance is determined as a function of the average amount of "edge" per pixel in the rectangle and adding a contribution value that increases, up to a limit, with increasing size of the rectangle. In the presently preferred embodiment, the actual size contribution has two breakpoints with increasing value of the perimeter of the rectangle, such that for rectangles beyond a certain size there is no further value added for a further increase in size of the rectangle. This reduces, but does not eliminate, the possibility of very small disproportionally structured areas from becoming Graphic Icons 144, and prevents a potential "run-away" condition whereby the "figure of merit" increases with the size of the rectangle regardless of content.

The near-final operation of pushing a side of a rectangle in or out is performed by computing the amount of edge in the strip of pixels just inside the rectangle and, if significantly lower than average, excluding the strip from the rectangle, that is, pulling the side of the rectangle back, or, if the strip just outside the side of the rectangle contains a significant amount of edge structure, indicating that image structure has been truncated that probably should be included in the region, including the strip in the rectangle, that is, pushing out that side of the rectangle.

Finally, the final sizing and shaping of the Graphic Icon 144 area has been discussed above. However, for the case in which no "filling" or "stretching" is to be done, but the source area is made to conform to an acceptable ratio of, say 6:2 or 4:3 of 3:4 or 2:6, the following are the steps for deciding which sides are to be pushed out, relative to the existing rectangle.

These "rules" for the steps for final sizing and shaping may be represented schematically, including the additional in-between ratios of 5:9 and 1:1 and 9:5 as division points, by:

$$\rightarrow 6:2 \leftarrow 9:5 \rightarrow 4:3 \leftarrow 1:1 \rightarrow 3:4 \leftarrow 5:9 \rightarrow 2:6 \leftarrow$$

The meaning of the schematic is:

if the height:width ratio is greater than 6:2, widen the area to 6:2 else if the ratio is greater than 9:5, stretch its height to 6:2;

else if it is greater than 4:3, widen it to make it 4:3;

else if it is greater than 1:1, make it taller so as to make it 4:3;

else if it is greater than 3:4, widen it to make it 3:4;

else if it is greater than 5:9, make it taller to make it 3:4;

else if it is greater than 2:6, widen it to 2:6;

else make it taller to make it 2:6

Figure 2B:
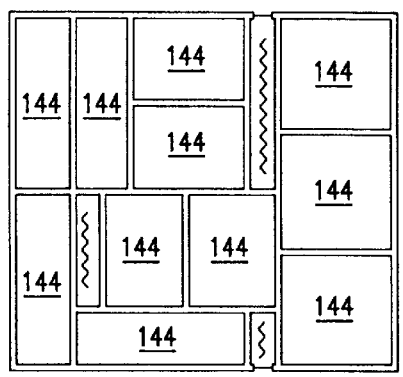
FIG. 2B illustrates the arrangement or tiling of graphic icons with borders in a display.

It should be noted that in the example described above, the final adjustment for a selected aspect ratio has, for the sake of illustration, been slightly simplified. For example, in the most common implementation the final Graphic Icon 144 will have a thin border area on all sides for the purpose of delineating it from neighboring icons in screen layouts containing many icons, as illustrated in FIG. 2B. The candidate areas are therefore slightly smaller, and ratios slightly different, if no distortion whatever is to be allowed in re-sizing from the source image to the icon, although a slight re-sizing may not only be acceptable but even desirable in order to use a more desirably shaped or sized region from the source image.

It must also be noted that the "tiling" of many icons of the various acceptable sizes and shapes, as illustrated in FIG. 2B, is a "bin-packing" problem of tiling geometry and, in certain implementation, such as with a relatively small number of icons per display, for example, 10 to 20, Visual Links Organizer 166, which will be discussed further in the following descriptions, may be implemented by computing and tabulating one arrangement for each maximally achievable icon population distribution. Thus, the possible arrangements for a display or a sub-section of a display can be determined in advance, as pre-arranged packing patterns for packing, for example, two 6:2s, four 4:3s, three 3:4s and one 2:6, and stored for use in a display or a sub-section of a display as necessary.

Finally, it must be noted that the Original Images 210 from which Graphic Icons 144 are generated will generally be acquired, or captured, by Local System 112 or Server System 114 as a graphics file or component of a standard type, such as a GIF or JPEG image or an HTL document or page containing graphic information in the form of GIF or JPEG images, and that the graphic file or component will most usually be a color image in any of several different color information formats. There are many well known and available methods and utilities for converting between GIF and JPEG images and, while it is preferable that Visual Link Capture Engine 138, Visual Links Control 164 and Visual Links Organizer 166 operate with a standard image format, the conversion between one format and another is well understood by those of ordinary skill in the relevant arts and will not be discussed further herein.

As regards color information formats, it is again preferable that Visual Link Capture Engine 138, Visual Links Control 164 and Visual Links Organizer 166 use a standard color format, of which there are several. For example, the 256 color format as used in Microsoft Windows, provides 256 numeric values that may be assigned to corresponding color values wherein the color of each pixel is coded in one byte of information as a RGB (red, green, blue) value and wherein each of the 256 different numeric values may be assigned to a different combination of red, green and blue and thus to a different color. In the "high color" format, each pixel's red, green and blue values are stored in 5 or 6 bit fields of a 16 bit word, and in the "true color" format each pixel's red, green and blue values are expressed directly in three corresponding bytes, giving 256 different possible values each of red, green and blue.

It is also preferable that the color format chosen for use in Visual Link Capture Engine 138, Visual Links Control 164 and Visual Links Organizer 166 be compatible with, for example, Microsoft Windows and Microsoft Windows compatible application programs, such as Netscape and Microsoft Explorer, as it is anticipated that Visual Links 142 will be used and displayed in such an operating environment and with such application programs. For this reason, the presently preferred implementations of Visual Link Capture Engine 138, Visual Links Control 164 and Visual Links Organizer 166 generate, store and display Graphic Icons 144 in a 256 color format that is compatible with Microsoft Windows and Microsoft Windows compatible application programs, such as Netscape and Microsoft Explorer.

In this regard, it should be noted that the 256 color format allows each of the 256 different numeric values that can be expressed in a single byte to be assigned arbitrarily to a different color and that, as a consequence, the 256 colors used in Visual Link Capture Engine 138, Visual Links Control 164 and Visual Links Organizer 166 need not be identical to those assigned to corresponding numeric values in Microsoft Windows and Microsoft Windows compatible application programs, such as Netscape and Microsoft Explorer, so long as the color assignments are sufficiently similar to be visually compatible.

It is possible, however, that a given Original Image 210 will use a 256 color format in which the color/numeric value assignments are visually incompatible with the assignments used in Visual Link Capture Engine 138, Visual Links Control 164 and Visual Links Organizer 166 or in Microsoft Windows and, in these cases, the reassignment of color/numeric values is easily accomplished through a lookup table, as well known in the relevant arts. In a like manner, an Original Image 210 in the high color or true color formats may be readily converted into the chosen 256 color format by determining the bit and byte assignments to red, green and blue value, unpacking the color information from the format into red, green and blue values, and converting the red, green and blue numeric values into comparable red, green and blue values in the chosen 256 color format, either through lookup tables or, in some instances, by numeric calculation.

Finally in this regard, it should be noted that Visual Link Capture Engine 138 will perform a conversion of the Original Image 210 from the received color format to the chosen 256 color format before the Grayscale Image 212 is generated from the Original Image 210, so that the generation of Grayscale Images 212, and all subsequent operations, including the final generation of the Graphic Icon 144, are performed in a standard manner. As illustrated in FIG. 2A, it should also be noted that it may be desirable to display an image of the Graphic Icon 144 or potential Graphic Icons 144 during operation of Visual Link Capture Engine 138, such as in the implementation of Visual Link Capture Engine 138 used in Local Server 112 where the user is actively interacting with the system. In these applications the presently preferred implementation of Visual Link Capture Engine 138 generates and displays a temporary representation of the Graphic Icon 144 or potential Graphic Icons 144 being considered or generated to the user using the original color format of the Original Image 210, thereby avoiding the need to perform a color format conversion for a temporary display. This image or representation of the Graphic Icon 144 is not stored or saved, however, and only the 256 color format final Graphic Icon 144 is stored for later use.

Lastly, it has been described above that certain implementations of Visual Links Capture Engine 138, such as Visual Links Manual Capture Engine 138M in Local System 112, provide a user with the capability to manually designate a region of Original Image 210 and to convert the designated region of Original Image 210 into a Graphic Icon 144. These implementations of Visual Link Capture Engine 138 preferably utilize the graphic functions and capabilities provided in the operating environment in which Visual Link Capture Engine 138, Visual Links Control 164 and Visual Links Organizer 166 are executing, such as Microsoft Windows. In these implementations, the Visual Links Manual Capture Engine 138M and Visual Links Control 164 provide interfaces to, for example, the Microsoft Windows graphics functions which allow the user to delineate and copy a selectable rectangular region of an image, as well known and understood by those of ordinary skill in the relevant arts.

The selected region is then provided directly to the Visual Link Capture Engine 138 final shaping and sizing functions, described above and described further below, which perform the final steps of generating a Graphic Icon 144 from the selected region. It should be noted that, in certain implementations, it may be desirable to limit the user's selection as regards the size and proportions, or aspect ratios, of the selected region, as described herein above.

3. Detailed Description of Visual Link Capture Engine 138

Having described the overall operation of a Visual Link Capture Engine 138, the following will describe an implementation of Visual Link Capture Engine 138 in greater detail. It will be noted, in this regard, that certain aspects of the structure and operation of Visual Link Capture Engine 138, such as the methods and mechanisms for converting between color formats, generating Grayscale Images 212 from Original Images 210, Filtered Grayscale Images 214 from Grayscale Images 212, Edge Images 216 from Filtered Grayscale Images 214, and Coarse Edge Images 218 from Edge Images 216, will be understood by those of ordinary skill in the relevant arts from the above discussions of an Visual Link Capture Engine 138 and will accordingly not be described in further detail except as would assist in understanding the present invention.

a. General Description of Visual Link Capture Engine 138 (FIGS. 3A–3H)

Figures 1, 3A:
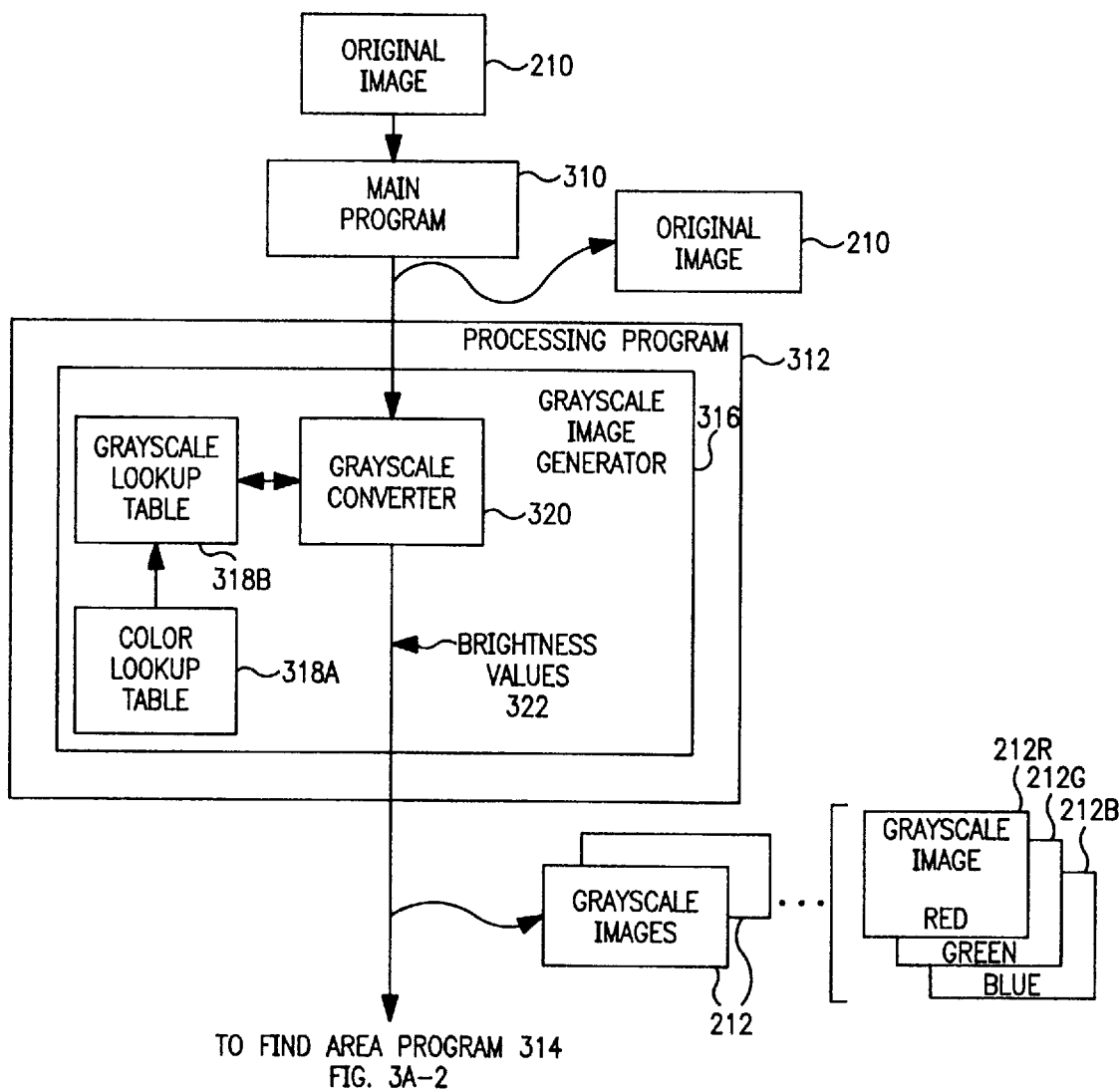
FIGS. 3A-1 and 3A-2 are block diagrams of a capture engine of the present invention.
Figures 2, 3A:
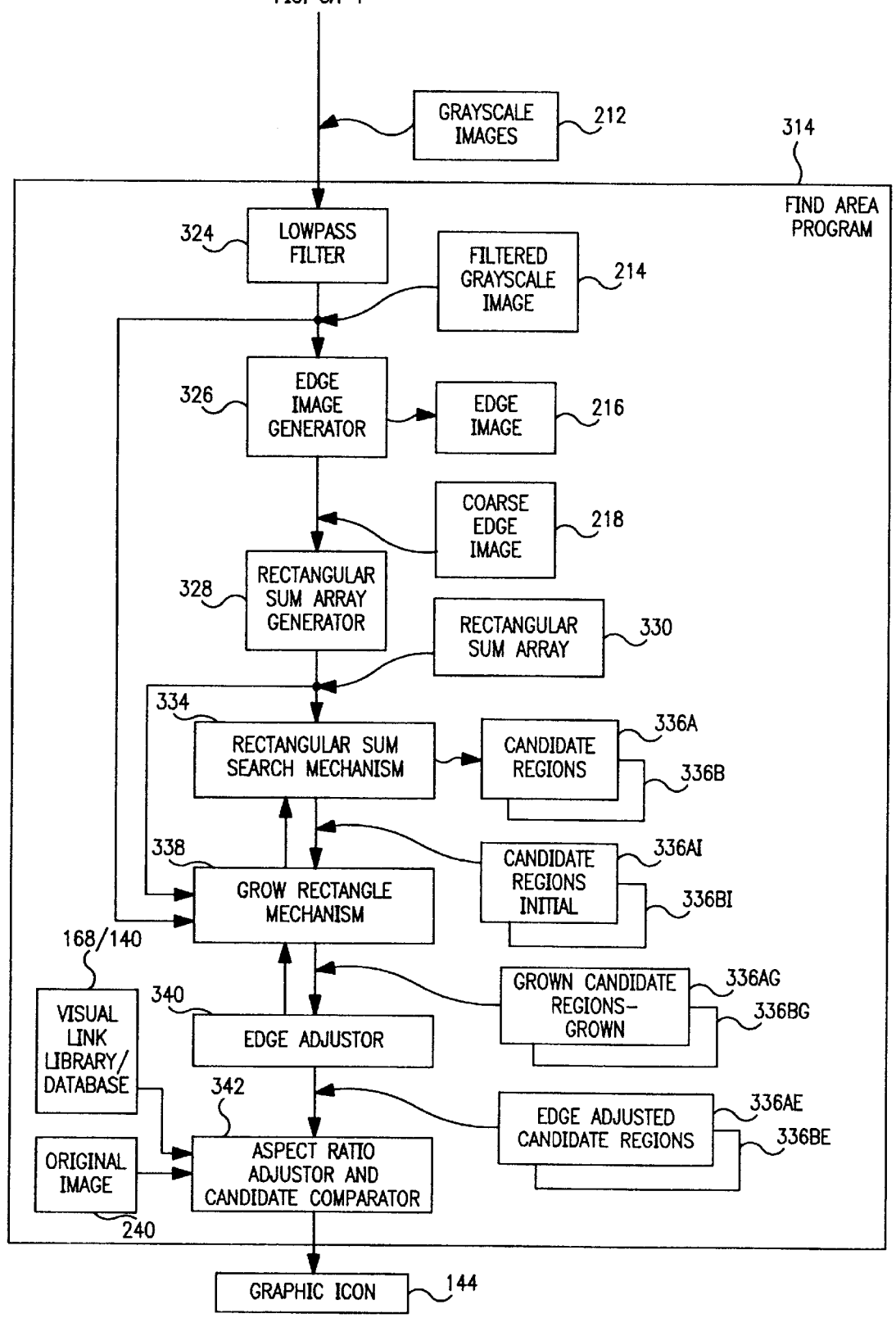

Referring now to FIG. 3A1 and 3A-2, the Visual Link Capture Engine 138 is implemented in a presently preferred embodiment in Local System 112 and in Server System 114 as a plurality of program modules residing in Disk Drive 156 or Memory 158 and controlling the operations of Processor 160 to execute the operations described herein on image data residing in Disk Drive 156 or Memory 158. As is well known and understood in the relevant arts, such programs control the operations general purpose Processor 160 and its associated components to operate as one or more dedicated, single purpose mechanisms for performing specific operations that are determined by the programs. Finally, it is assumed for purposes of the present discussions that Server System 210 and Local System 212 are operating under the control of and incorporate the functions and capabilities of a well known and understood operating system such as Microsoft Windows or the general equivalent providing object based processing, object linking, and a variety of functions and operations that are generally available to the program creator, such as graphics editing functions.

The organization of Visual Link Capture Engine 138 as a group of processor control program modules and the functional mechanisms provided by each of the program control modules is illustrated in FIG. 3A and in the exemplary program listings provided in Appendix A.

Before beginning the following detailed description, however, certain aspects of the control program listings provided in Appendix A should be understood, as should certain technical details and assumptions of the following descriptions. First, the control program listings provided in Appendix A include certain versions of the program modules having the extension ".noc". These listings contain alternate implementations of certain program modules that may be used in alternate embodiments of the present invention, and implementations that, for example, provide displays that are not necessary for essential operation of the present invention but that provide displays that may be advantageous for a user or for one who maintains the programs.

For example, there may be implementations in which immediate visual feedback to a user is desired, wherein the Visual Link Capture Engine 138 operates first to select a potential Graphic Icon 144 region of Original Image 210 and presents the selection as a suggestion that the user may often accept without revision. In other instances the user may choose to intervene and, taking some time and care, adjust the source region from Original Image 210 or pick an entirely different source region from Original Image 210. Other alternate embodiments illustrated in these listings utilize red, green blue color information in selection of regions of Original Image 210 to convert to a Graphic Icon 144, again as discussed above.

In addition, the following descriptions assume that Original Images 210 are in the form of ".bmp format" screen captures of a 640-pixel-wide by 480-line-high screen, used in color-mapped mode with 256 colors. In the following examples, only 408 of the 480 lines are actually used, and the colormap is assumed to start in byte [54] of the file, each entry consisting of the four bytes: blue value, green value, red value, zero. It is also assumed that, immediately thereafter (starting in byte [1078]), is the byte-per-pixel data, appearing bottom line first. It is further assumed for purposes of the following discussions that such files, or RAM bitmap equivalents, will be available without marginal frames, Windows buttons, sliders, etc. In the exemplary embodiment presented herein, such marginalia are stripped by strictly ad hoc means wherein for each image there is side information describing how the picture is to be stripped—by replacing a certain amount of the side material with additional white or black background. It will be understood by those or ordinary skill in the relevant arts that these and other techniques may be used to obtain Original Images 210, and how the system described herein may be readily adapted to other image formats and to other technical assumptions.

As illustrated in FIG. 3A, the control programs comprising Visual Capture Engine 138 include a Main Program 310 (see iconmain.c in Appendix A) which feeds information about images, one at a time, to an image processing mechanism comprised of a Processing Program 312 and a Find Area Program 314 (see respectively process.c and findarea.c in Appendix A). As will be described in further detail below, Processing Program 312 generates Grayscale Images 212 from Original Images 210 and passes Grayscale Images 212 to Find Area Program 314, which generates Filtered Grayscale Images 214, Edge Images 216 and Coarse Edge Images 218 and identifies appropriate areas of Original Image 210 to iconize, that is, to convert into Graphic Icons 144, by searching for locations of bold image, that is, areas of Original Image 210 holding large fonts, photos, logos or combinations of these.

b. Processing Program 312—Grayscale Image Generator 316

For the reasons stated above, and for reasons of speed, the search performed by Find Area Program 314 is based on one or more small versions of Original Image 210 and, in the present implementation, the search is performed using a ¼ size gray-scale images, that is, Grayscale Images 212, generated by a Grayscale Image Generator 316 implemented by Processing Program 312, and derivatives of Grayscale Image 212, that is, Filtered Grayscale Image 214, Edge Image 216 and Coarse Edge Image 218, generated by Find Area Program 314.

In alternate embodiments, however, the search process may be performed with images having less or more reductions, depending upon the processing power and speed of Local System 112 or Server System 214 and the time available to process each image. It should be noted, in this regard, that the loss of quality of result appears not be significant for greater reductions in image size as the object of the search is only to identify regions of strong, bold image. Larger images are desirable, however, at least in those implementations providing the user with a display of the proposed Graphic Icon 144 areas under consideration, as providing a more legible and detailed image to the user, and the modifications to Processing Program 312, and to Find Area Program 314, to generate and use images having greater or lesser reductions will be well understood by those of ordinary skill in the relevant arts.

It should also be noted, as discussed above, that Processing Program 312 and Find Area Program 314 may be implemented to use the red, green and blue color components of Original Image 210, as well as the brightness component, in searching for and identifying the areas of bold image suitable for Graphic Icons 144 and, in this implementation, Processing Program 312 may generate, for example, ¼ scale grayscale images of the red, green and blue components of Original Image 210 for use by Find Area Program 314, and for display to the user.

It has been found, however, that acceptable results are normally obtained from brightness information alone. As a consequence, in the presently preferred embodiment, Processing Program 312 transforms the RGB (red, green, blue) Original Image 210 into a grayscale image, as discussed previously, by using a Color Lookup Table 318A to compose a Greyscale Lookup Table 318B which is used, for each pixel in an Original Image 210, to determine greyscale equivalent values for the red, green and blue values associated with each of the 256 numbers. A Grayscale Converter 320, in turn, receives these values and sums these values for 4×4 blocks of Original Image 210 pixels to generate a "Brightness" Value 322 for each 4×4 block of Original Image 210 pixels, the resulting Brightness Value 322 for each block becoming the grayscale value for a corresponding single pixel of the corresponding ¼ scale Grayscale Image 312. It will be appreciated by those of ordinary skill in the arts that Grayscale Converter 320 may generate Grayscale Images 212 at sizes other than ¼ scale by corresponding changes in the numbers and arrangements of the Original Image 210 pixels selected to form each corresponding pixel of the Grayscale Image 212.

The color component images, that is, Grayscale Images 212R, 212G and 212B are constructed in an analogous manner, but wherein each is generated using only the values for a single corresponding color component, that is, red, green or blue (as illustrated in process.c in Appendix A).

c. Mechanisms of Find Area Program 314, Introduction

Once a ¼-size grayscale image Grayscale Image 212 is available from Processing Program 312, Find Area Program 314 provides the mechanisms for performing the operations necessary to generate the remaining images used in finding a Graphic Icon 144 region and constructing a Graphic Icon 144. These operations include:

(1) Generating a low-pass filtered version, Filtered Grayscale Image 214 of Grayscale Image 212 to blur and diminish any fine text and detail, preferentially leaving any bold image content relatively prominent;

(2) Generating an Edge Image 216 from Filtered Grayscale Image 214, the Edge Image 216 having high pixel values in regions where Filtered Grayscale Image 214 has certain kinds of structure, and an ultra-low-resolution $\frac{1}{16}$-size version of Edge Image 216, that is, Coarse Edge Image 218, for use in an initial quick search;

(3) Replacing each "pixel" of the Coarse Grayscale Image 218 by the sum (modulo register size) of a corresponding rectangle-to-there from 0,0, wherein an arithmetic combination of up to four such entries yields the sum of the corresponding pixels of the corresponding candidate rectangle of the Coarse Grayscale Image 218 and a value representing a "figure of merit" representing, in turn, the proportion of "image edge" in the candidate rectangle;

(4) Searching essentially the entire Coarse Grayscale Image 218 to find a candidate rectangle of high "merit", that is, high proportion of "image edge", which will serve as the starting point for subsequent enlargement, reduction or modification of the region to be used in constructing a Graphic Icon 144.

(5) Extending the left, top, right, and bottom sides of the candidate rectangle outward so long as enough edge value, as determined above, continues to accumulate so as to maintain the "figure of merit" of the growing candidate rectangle;

(6) Adjusting the sides of the candidate rectangle for the purpose of (a) trimming back relatively empty side areas of the image and (b) extending the sides of the candidate rectangle outward where the rectangle side seems to truncate sufficiently strong structural elements in the image; and, (7) Adjusting the candidate rectangle to obtain a rectangle having one of the selected aspect ratios chosen for efficient tiling of screen space—such as 6:2, 4:3, 3:4 and 2:6, a final adjustment is made and presented as a "fattened" version of the rectangle to iconize.

It should be noted that Find Area Program 314 has identified only the part of the Original Image 210 that is to be re-sized, and perhaps slightly re-shaped, to form the final icon. Visual Link Capture Engine 138 then generates the final Graphic Icon 144 by reference to the Original Image 210 in its original resolution as the source from which the Graphic Icon 144 is generated.

The mechanisms implemented by Find Area Program 314 also address the possible issue that a pair of Graphic Icons 144 from different Original Images 210 may turn out to be sufficiently similar as to be visually confusing. The mechanisms of Find Area Program 314 therefore execute steps 4 through 7 above twice to obtain an alternate region of the Original Image 210 to use as the Graphic Icon 144. On the second pass through the Original Image 210, that is, through the grayscale representations of the Original Image 210, the mechanisms of Find Area Program 314 preclude the area of the first candidate rectangle from becoming any part of the initial candidate rectangle generated by step 4 although, in the present implementation, the second candidate rectangle is not precluded from growing into and including part of, or even all of, the first candidate rectangle. The final output of the Find Area Program 314 mechanisms thereby include four areas, the first candidate rectangle, the first candidate rectangle adjusted to a desirable aspect ratio, the second candidate rectangle, and the second candidate rectangle adjusted to a desirable aspect ratio. The choice between the two candidate rectangles may then be made manually by a user, for example, in a Visual Link Capture Engine 138 as implemented in a Local System 112, or automatically, for example, in a Visual Link Capture Engine 138 as implemented in a Server System 114. In the latter instance, the Visual Link Capture Engine 138 or, more probably, Visual Link Organizer 136, will retain a grayscale image from the newly generated Graphic Icon 144 selection and generation process, such as Edge Image 216 or Coarse Edge Image 218, and will compare the grayscale images of the two candidate rectangles with equivalent stored grayscale images of previously generated Graphic Icons 144.

d. Mechanisms of Find Area Program 314, Detailed Description

1. Lowpass Filter 324

Referring again to FIG. 3A for a detailed description of the structure and operation of the mechanisms implemented by Find Area Program 314, it is shown therein that Visual Link Capture Engine 138 includes a Lowpass Filter 324 connected from Grayscale Image Generator 316 to constructs an image, that is, Filtered Grayscale Image 214, from each Grayscale Image 212 wherein the fine details of the Grayscale Image 212 image are "smeared", that is, wherein the high spatial frequency elements are degraded or suppressed, while the low spatial frequency elements, that is, the larger image components, are preserved. In practice this means generating each destination pixel, that is, each pixel of Filtered Grayscale Image 214, from a weighted sum of pixels of the corresponding neighborhood of the source image, that is, Grayscale Image 212. The corresponding program code exemplified in Appendix A illustrates two possible smudging filters having, respectively, "radii" of 1 and 2 pixels, which apply the following weighting array to each target array of Grayscale Image 212 pixels to generate a corresponding pixel of Filtered Grayscale Image 214:

```
                            00100
               010          01210
for radius 1: 111  for radius 2: 12221
               010          01210
                            00100
```

It will be understood that these low-pass filters are illustrative and representative of a wide variety of sizes and patterns of such arrays of weightings that may be employed in low pass filtering of pixel image data. Many alternative filters will be known and understood by those of ordinary skill in the arts and would be appropriate and, in environments with particular statistically frequent image characteristics, one or another alternative filter may be preferable.

2. Edge Image Generator 326

Edge Image Generator 326, referred to in Appendix A as "make edge pics", is connected from Low Pass Filter 324 to receive each Filtered Grayscale Image 214 and to construct two "edge" images from Filtered Grayscale Image 214, one being the corresponding Edge Image 216 and the other being the corresponding Coarse Edge Image 218. As has been described, the grayscale image is ¼ the linear size of the original image and the edge image is the same size, in pixels, as the grayscale image while the coarse edge image is ¼ the linear size of the grayscale image, thereby being ¹⁄₁₆ the linear size of the original image.

For purposes of the present invention and the present description, the amount or degree of "edge" at a pixel in an image is the degree of coarse structure non-uniformity at that pixel as indicated by the rate at which the coarse structure brightness is changing in some direction. In the present implementation, Edge Image Generator 326 selects a pixel as a target pixel and examines the brightness value, as determined as described previously, a selected distance to either side, or above or below, the target pixel, such as the pixels located two pixels above and below the target pixel, and determines the brightness value of the two pixels and the absolute value of the difference between the two brightness values. Edge Image Generator 326 also determines the absolute value of the difference between the brightness values of the pixels the selected distance to the right and left of the target pixel. The sum of the absolute values of the difference in brightness values is considered the degree of "edge" at the target pixel. Alternatively, the maximum of these values may be used.

This operation may be represented graphically as illustrated in FIG. 3B and expressed as value =(|2-up−2-down|+ |2-left−2-right|).

The image of edge values may be still further improved by increasing the dynamic range, transposing the image to render low values invisible to further computation, and clipping the value to an allowed storage range. It will be realized by those of ordinary skill in the arts, that all of the constants involved are adjustable to yield the best results in a particular universe of images, the values in the present example having been found to be acceptable for World Wide Web pages as typically designed for 256-color colormapped display at 480- by-640 screen resolution.

In an alternate implementation, and instead of the sum of values, Edge Image Generator 326 may be implemented to take the greatest of these differences, or to use diagonally located neighbors, or neighboring pixels at greater or lesser distances away.

Other indications of being on or near an edge of coarse structure may be used instead or in addition to the above methods. For example, whether a given target pixel is near by not exactly on a prominent edge or in the middle of a broad line may be detected by analysis of one of the pixel patterns represented by FIGS. 3C, 3D, 3E and 3F and their mirror images and 90° rotations wherein a, b, c and d are the brightness values of pixels 3 to the left, 1 to the left, 1 to the right and 3 to the right of the target pixel, and may be expressed for FIGS. 3C, 3D, 3E and 3F, respectively, as max(a,b)-min(c,d), max(a,b,c)-d, a-min(b,c,d) and max(a, d)-min(b,c)

In yet other implementations, Edge Image Generator 326 may also measure for steps up, or down, or at different distances or directions, using the strongest such result, or a combination of the results.

In still other implementations of Edge Image Generator 326 wherein the Visual Link Capture Engine 138 utilizes the color information available from the original image, and as described previously, Edge Image Generator 326 may generate either a single Edge Image 216 incorporating or combining information regarding the three color components, red, green and blue, of an Original Image 210 into a single image, or may generate separate Edge Images 216 and Coarse Edge Images 218 for the three color components. It will be noted in this regard, however, that the use of reduced scale edge image is intended to reduce the volume of data that must be processed while implementations using multiple edge images require significantly increased image processing with consequent increased requirements for processing speed and power or, alternatively, slower processing due to the additional data to be processed. In either implementation, the color information would be used to determine edges of image structures in three dimensional color space. Also as described, Edge Image Generator 326 may use for each entry the maximum or average values of the color component values, or still other combinations. Still other method for mapping strong image features will be useful for yet other particular applications.

Regardless of which method is used, however, to generate Edge Images 216 and Coarse Edge Images 218, the essential principle is to seek a two dimensional image with high values in locations corresponding to prominent structural features in the original image, whether the structural features are line art, such as in logos or large text, or pictures. In general, line art will have localized strong edges in the sense herein while pictures, such as photographs, tend to have continuing undulation of value and, while its edge maxima may be lesser than line art, the average edge value over an area of a picture may be equivalent to that of line art. It should be obvious to one versed in the arts of picture processing that, by adjustment of various parameters of the computation, one can strike a desirable balance between the influence of discrete-valued line art and that of bitmapped-continuous grayscale pictures.

Finally, and in addition to Edge Images 216, Edge Image Generator 326 also, and at the same time as it generates a ¼ size Edge Image 216, generates a linearly 4 times coarser edge image by accumulating the values generated for Edge Image 216 to comprise the pixel values of the corresponding Coarse Edge Image 218, with the accumulated values of four Edge Image 216 pixels comprising a value for a corresponding pixel of Coarse Edge Image 218. It should be noted, in this regard, that while an Edge Image 216 is created as a set of byte sized values, the corresponding Coarse Edge Image 218 is accumulated as a set of 16-bit unsigned word values.

As also illustrated in FIG. 3A, Rectangular Sum Array Generator 328 operates on each Coarse Edge Image 218 to generate a corresponding Rectangular Sum Array 330 which, in turn, allows Visual Link Capture Engine 138 to quickly determine, or evaluate, the "edge figure of merit" of any sub-rectangle within Coarse Edge Image 218, that is, the degree of significant image features or structure within any sub-rectangle of a Coarse Edge Image 218 as indicated by the amount of "edge" within the sub-rectangle. It will be noted that any subrectangle must generally have certain minimum dimensions and must generally fall short of the full image dimensions in each direction by at least a small minimum amount.

As illustrated in FIG. 3G, a Rectangular Sum Array 330 contains a Storage Location 332 for and corresponding to each "pixel" of the corresponding Coarse Edge Image 218. Rectangular Sum Array Generator 328 stores, in each Storage Location 332 in Rectangular Sum Array 330, the sum of the values of all pixels of Coarse Edge Image 218 contained within the area bounded by 0,0 as the origin at the upper left corner of the Rectangular Sum Array 330, which corresponds to the upper left corner of the corresponding Coarse Edge Array 218, and the location of the Coarse Edge Image 218 pixel corresponding to the storage location in the Rectangular Sum Array 330. For example, in FIG. 3G Storage Location 332a contains the sum of the values of all pixels in the Coarse Edge Image 218 in the rectangular area bounded on the upper left by the origin (0,0) and on the lower right by the pixel corresponding to the location of Storage Location 332a, Storage Location 332d contains the sum of the values of all pixels in the Coarse Edge Image 218 in the rectangular area bounded on the upper left by the origin (0,0) and on the lower right by the pixel corresponding to the location of Storage Location 332d, and so on. It will be noted, in this regard, that the pixels corresponding to Storage Location 332a, 332b, 332c, and so on are located immediately outside the rectangles of interest defined by the origin an a corresponding one of Storage Locations 332.

The relative value of the total amount of "edge" structure of features appearing in any sub-rectangle of interest in a Coarse Edge Image 218 can thereby be determined from sum values stored in the Rectangular Sum Array 330 as the value sum a+sum d−sum b−sum c wherein sum a, b, c and d are the stored sum values for the corners of the sub-rectangle of interest. To do so, Rectangular Sum Search Mechanism 334, described below, identifies the Storage Locations 332 corresponding to the pixels in the Coarse Edge Image 218 corresponding to the upper left and lower right corners of the sub-rectangle of interest and subtracts from the sum value stored therein, which is the sum of all Coarse Edge Image 218 pixel values in the rectangle defined by the origin and the pixel corresponding to that Storage Location 332, the sum values stored in Storage Locations 332 corresponding to the upper right, lower left and upper left corners of the sub-rectangle of interest. These Storage Locations 332 corresponding to the upper right, lower left and upper left of the sub-rectangle of interest contain the sums of all Coarse Edge Image 218 pixel values in the Coarse Edge Image 218 sub-rectangles defined by the origin and the pixels corresponding to the upper right, lower left and upper left corners of the sub-rectangle of interest, and therefore contained within the array sum stored in the Storage Location 332 corresponding to the lower right corner of the sub-rectangle of interest and the result of the operation will be the sum of the values of the Coarse Edge Image 218 pixels contained within the sub-rectangle of interest. For example, and referring to FIG. 3G, the sum of the edge values of the Coarse Edge Image 218 pixels in the sub-rectangle defined by Storage Location 332 is determined by subtracting from the sum value stored therein the sum values stored in Storage Locations 332a, 332b and 332c, thereby subtracting the sum values of the three sub-rectangles defined by the origin and Storage Locations 332a, 332b and 332c from the sum value stored in Storage Location 332d, thereby generating a sum value for the sub-rectangle defined by the origin and Storage Location 332d.

It will be noted that if the rectangle of interest extends from the left and/or the top of the image, the calculation is correspondingly simplified. That is, if any of the pixels corresponding to Storage Locations 332a, 332b, 332c, and so on are outside of, that is, above or to the left of, the original total image, their rectangle-sum values are not looked up on the sums array, but instead the corresponding value is understood to be zero. Alternatively, the entries of the rectangle-sums array may be stored into and fetched from one position to the right of and below where previously indicated, with the top row and left column filled with zeros. There are then no special cases to consider as a fetch above the top or to the left of the left edge will automatically result in a zero value.

It is apparent that a sum value for any sub-rectangle of a Coarse Edge Image 218 can be quickly and easily determined. It will also be apparent, as will be discussed below, that the sum values for the sub-rectangles of a given Coarse Edge Image 218 can thereafter be used to quickly and easily determine the relative figures of merit of those sub-rectangles wherein a figure of merit essentially indicates whether a sub-rectangle contains enough edge, that is, "sum", in relation to the size of the sub-rectangle.

It should be noted that sum values may exceed the maximum value that may be held in a machine word. This is generally acceptable, however, provided that overflow-traps or other such cautionary hardware or software features are not activated in the system in which Visual Link Capture Engine 138 is executing, as the sum modulo 2-to-the-power-of-bits-per-word will be stored, that is, the sum starts counting over, e.g. 65534, 65535, 0, 1, 2, . . . 2. Also, in most computer systems, the above arithmetic d+a−b−c will be performed modulo the same number, yielding the desired value, provided only that the highest sum that is expected is lower than the modulus, in which case the capture engine as implemented could add results from several such sub-parts of the indicated rectangle so long as no part's sum exceeds the maximum possible such sum.

Finally, the search for the optimum candidate rectangle, described below, can be exhaustive, and involves tests on thousands of possible rectangles. It will be apparent, however, that each test is relatively fast to perform, involving calculations of only a few values each. In addition, in the present implementation the conversion of a Coarse Edge Image 218 to a Rectangular Sum Array 330 is performed in a very simple and straightforward way, computing first the top row and the left column, then filling each remaining Storage Location 332 in the remainder of the array from the values immediately above, immediately to the left, and immediately diagonally above and to the left.

3. Rectangular Sum Search Mechanism 334

As illustrated in FIG. 3A, Rectangular Sum Search Mechanism 334, implemented as "find_start_rect" in Appendix X, searches the Rectangular Sum Array 330 corresponding to a Coarse Edge Image 216 of an Original Image 210 for candidate regions to be potentially used in generating a Graphic Icon 144 and determines a "best" first approximation to an acceptable Graphic Icon 144 region in the Original Image 210 as a Candidate Region 336A.

In this regard, in the present implementation of Rectangular Sum Search Mechanism 334 the figure of "merit" or "assurance" of each candidate rectangle is determined, as described previously, first, on the average "edge" values of the pixels, that is, on the values of the pixels of Coarse Edge Image 218 as represented by the sum values stored in the corresponding Storage Locations 332 of Rectangular Sum Array 330, for each potential sub-rectangle of Rectangular Sum Array 330, and, as a secondary factor, on the size of each candidate rectangle, for the reason that a very small rectangle can easily but not meaningfully exceed larger rectangles as regards the average "edge" value of the pixels represented therein. Stated another way, a larger region or rectangle that includes a smaller region or rectangle of higher average "edge" value is probably a meaningful enlargement of the smaller region or rectangle.

In an alternate embodiment of Rectangular Sum Array Generator 328, the figure of "merit" or "assurance" of a rectangle is implemented as the average edge value of the rectangle, as determined by the value sums stored in Rectangular Sum Array 330, plus a constant times the perimeter of the rectangle in pixels. Clearly a variety of such alternate evaluations of "merit" or "assurance" might be used. The principle implemented in the presently preferred embodiment of Rectangular Sum Array 330, however, is that for rectangles having approximately equal values of "merit" or "assurance", the larger the rectangle the better. In the reverse, for rectangles of equal size, the greater the amount of edge (bold structure), the better.

Having identified a "best" Candidate Region 336A, Rectangular Sum Search Mechanism 334 in the presently preferred embodiment of Visual Link Capture Engine 138 then repeats the search procedure to determine at least a second Candidate Region 336B, thereby determining and identifying at least two candidate rectangles from each Original Image 210, as previously described. As has been and will be discussed, the identification of two or more Candidate Regions 336 thereby allows Visual Link Capture Engine 138 or the user to select the Candidate Region 336 most visually representative of the original image or to compare the Candidate Regions 336 to previously existing Graphic Icons 144 and to select and retain the Candidate Region 336 most visually distinct from all previously existing Graphic Icons 144 without having to repeat the entire identification process from the beginning.

In the presently preferred implementation, Rectangular Sum Search Mechanism 334 is not permitted to retrace the search through the image by which Candidate Region 336A was identified when locating and identifying Candidate Region 336B. Rectangular Sum Search Mechanism 334 is thereby prevented from identifying the same or nearly the same region of the image as Candidate Regions 336A and 336B as it is desirable to locate two visually distinguished Candidate Regions 336. As such, and for this reason, Rectangular Sum Search Mechanism 334 is designed so that Candidate Region 336A is designated as a forbidden area of the image and the search operation performed by Rectangular Sum Search Mechanism 334 is accordingly constrained by the designation of Candidate Region 336A as a forbidden area to avoid overlap with a forbidden area if in fact, a Candidate Region 336A has been previously identified.

It will be appreciated by those of ordinary skill in the arts that there are a number of methods for constraining the Rectangular Sum Search Mechanism 334's search for Candidate Region 336B to prevent overlap, or at least significant overlap, with a Candidate Region 336A. For example, a second rectangle will not overlap a first rectangle if and only if the second rectangle is completely above, or completely to the left of, or completely to the right of, or completely below the first rectangle. Rectangular Sum Search Mechanism 334 may be implemented, however, to be constrained from considering any rectangular region of Rectangular Sum Array 330 wherein one or both of the upper left or lower right corners of the rectangular region fall within the rectangular region of Rectangular Sum Array 330 comprising Candidate Region 336A. However, while a constraint with respect to both corners will prevent any overlap between Candidate Regions 336A and 336B, a constraint with respect to only one corner would permit at least some overlap, unless further constraints are imposed on the possible locations of a Candidate Region 336B corner within Candidate Region 336A.

The present implementation of Rectangular Sum Search Mechanism 334, is not constrained however, so that the fully developed Candidate Region 336B will not overlap the fully developed Candidate Region 336A, as the full extents of Candidate Regions 336A and 336B will not be known until the regions are fully developed, as described below. As such, an overlap may occur between the fully developed Candidate Regions 336A and 336B, particularly when there is no acceptable but completely separate second Candidate Region 336B.

Finally, it should be noted that search is performed by Rectangular Sum Search Mechanism 334 in what may be referred to as "1/16 scale space", that is, within the dimensions and coordinates of Coarse Edge Image 218 and Rectangular Sum Array 330. As such, Rectangular Sum Search Mechanism 334, having identified Candidate Regions 336A and 336B in terms of the coordinates and dimensions of Coarse Edge Image 218 and Rectangular Sum Array 330, transforms the coordinates defining the bounds of Candidate Regions 336A and 336B, that is, the coordinates of the corners of Candidate Regions 336A and 336B into corresponding coordinates in the "¼ scale space" of Grayscale Image 212, Filtered Grayscale Image 214 and Edge Image 216 by, in effect, magnifying the coordinates of Candidate Regions 336A and 336B by a factor of four. The final results of the search are thereby reported in "¼ scale space" as Initial Candidate Regions 336AI and 336BI for final selection and adjustment of the selected region or regions as Graphic Icons 144, as described below.

4. Grow Rectangle Mechanism 338

Grow Rectangle Mechanism 338, which is shown in Appendix A as implemented by "grow_rect", cyclically and iteratively attempts to "grow" each of Initial Candidate Regions 336AI and 336BI by extending each side of each of Initial Candidate Regions 336AI and 336BI outward. A "figure of merit" or "assurance" for each of Initial Candidate Regions 336AI and 336BI is evaluated after each such extension, with the purpose of searching for larger Candidate Region 336A and 336B rectangles with higher figures of "merit" or "assurance".

In the initial steps of the "growing" process, a few possible extensions are considered to the right, then upward, then to the left, and then downward. Then, and dependent upon the results of the initial attempts, progressively larger ranges of extension are attempted and evaluated. As a result of this process, the extents of either or both of Initial Candidate Regions 336AI or 336BI may be extended to "bridge over" possible "blank" areas, that is, adjacent areas having little or no significant visual structures or features, if and when there are nearby areas having significant and presumably related visual structures or features that may be preferably incorporated into either or both of Candidate Regions 336A or 336B.

As indicated in FIG. 3A, Grow Rectangle Mechanism 338 may perform this "growing" operation using Edge Image 214 or Coarse Edge Image 216 or Rectangular Sum Array 330. As has been described previously, both Coarse Edge Image 218 and Edge Image 216 contain numeric values for each pixel therein that represent the "edge" characteristics or properties of the pixels while Rectangular Sum Array 330 contains an accumulated value representing the cumulative totals of edge information for the rectangles defined by each pixel in Coarse Edge Image 218. In addition, the coordinates and dimensions of Initial Candidate Regions 336AI and 336BI have been determined by Search Rectangle Mechanism 330 in terms of the "¼ scale" coordinates of Edge Image 216 and in terms of the "¹⁄₁₆ scale" coordinates of Coarse Edge Image 218 and Rectangular Sum Array 330.

The operation of Grow Rectangle Mechanism 338 will therefore be essentially the same whether Grow Rectangle Mechanism 338 operates in "¼ scale" space or in "¹⁄₁₆ scale" space, although the present implementation of Grow Rectangle Mechanism 338 operates in "¼ scale" space. In either implementation, Grow Rectangle Mechanism 338 will determine an initial figure of "merit" or "assurance" for each of Initial Candidate Regions 336AI and 336BI wherein the figure of "merit" or "assurance" represents the amount of edge information initially within the rectangles defined by Initial Candidate Regions 336AI and 336BI. This information is already available for "¹⁄₁₆ scale" space from the operations of Search Rectangle Mechanism 330, as described above, and an equivalent figure of "merit" or "assurance" can be determined from the information stored in Edge Image 214 for "¼ scale" space.

Grow Rectangle Mechanism 338 will then extend each of Initial Candidate Regions 336AI and 336BI by a predetermined amount in an initial predetermined direction, such as one pixel to the right, and will evaluate the figure of "merit" or "assurance" for the resulting extended rectangles. This process will be repeated by successive amounts, and in different directions, for amounts of increase and directions for which the figure of "merit" or "assurance" of an extended rectangle remains approximately the same as the initial value or increases. If the figure of "merit" or "assurance" declines for the smaller initial extensions, the process will be repeated for greater extensions, such as two, four or eight pixels in each direction.

The final result of the operations of Grow Rectangle Mechanism 338 are then provided as Grown Candidate Regions 336AG and 336BG.

5. Edge Adjuster 340

Edge Adjuster 340, implemented in Appendix A as "adjust_edges", operates upon Grown Candidate Regions 336AG and 336BG to perform a subsequent adjustment of the sides of Grown Candidate Regions 336AG and 336BG. As has been describe, Edge Adjuster 340 "trims away" pixels along the sides of the rectangles having relatively little visual structure or features and extends the sides of the rectangles where visual or structural features extend across the sides of the rectangles, thereby incorporating the continuing visual structures or features within the rectangles, and generating Edge Adjusted Candidate Regions 336AE and 336BE.

Edge Adjuster 340 operates according to the criteria described previously to cyclically and iteratively adjust the boundaries of Grown Candidate Regions 336AG and 336BG by one-pixel adjustments, either inwards or outwards on each edge, to incorporate the entirety of such features as pictures and logos within the rectangles, even when such extensions do not meet the edge information figure of "merit" or "assurance" criteria used by Search Rectangle Mechanism 330 or Grow Rectangle Mechanism 338.

As the criteria used by Edge Adjuster 340 has been discussed previously, and the operation of Edge Adjuster 340 is described further in Appendix A, Edge Adjuster 340 will not be discussed in further detail herein. It will be apparent to those or ordinary skill in the relevant arts, however, that many methods may be used to adjust the regions enclosed in either or both of Grown Candidate Regions 336AG and 336BG to include visual features and structures that extend outside the rectangles, or to eliminate peripheral areas of the rectangles having little visual structure or features. The essential aspect of the operation of Edge Adjuster 340 is to find at least one nucleus area containing strong image material and to adjust its sides, or boundaries, so as to differentiate visually objects contained therein from extraneous areas that ought not to be included. For this purpose, Edge Adjuster 340 operates to grow or enlarge the initial candidate area so as to include an agreeable relationship between coarse structure and size and to adjust the sides of the initial candidate area in or out to appropriate cut-off points with the goal of totally including internal visual objects while excluding nearby parts of external visual objects.

It should be noted that the initial rectangles of Candidate Regions 336A and 336B are determined in "¹⁄₁₆ scale" space, as descried above, and that all subsequent operations, such as growing Candidate Regions 336A and 336B and adjusting the sides of Grown Candidate Regions 336AG and 336BG are performed in "¼ scale" space in the present implementation of Visual Link Capture Engine 138. As such, the granularity of the grown and adjusted Candidate Regions 336A and 336B will be limited to the granularity of "¼ scale" space. In alternate embodiments, however, and with additional computing time and more storage allotted to image arrays, Visual Link Capture Engine 138 can maintain and use half-size and/or full size arrays, alternatively or subsequently, and perform these operations in "½ scale" or "full scale" space, yielding a 2 pixel or single pixel granularity for the final growing and adjustment of Candidate Regions 336A and 336B. While this increase in resolution, or refinement of granularity, may result in ultimately finer adjustments, the benefit may be marginal given that the location of coarse structure is the essential goal.

6. Aspect Ratio Adjuster and Candidate Comparator 342

Finally, Aspect Ratio Adjuster and Candidate Comparator 342, implemented in Appendix A in "fix_aspect_ratio" accepts proposed source image areas Edge Adjusted Candidate Regions 336AE and 336BE and enlarges Edge Adjusted Candidate Regions 336AE and 336BE horizontally or vertically to conform to one of a set of desirable aspect ratios. As described previously, in the present example those aspect ratios are selected as 6:2, 4:3, 3:4 and 2:6, including a border area.

Aspect Ratio Adjuster and Candidate Comparator 342 also compares the ratio adjusted Edge Adjust Candidate Regions 336AE and 336BE, in the manner previously described, to select between the candidate regions, and compares the selected ratio adjusted candidate region with previously generated Graphic Icons 144, if any, to determine whether the selected candidate region is too similar to a previously existing Graphic Icon 144, reverting to the unselected candidate region if too similar a match is found with a previously existing Graphic Icon 144, or even reinitiating the generation process if necessary. As has been described elsewhere herein, and for other processes, the selection process may be performed automatically by the capture engine, for example, by performing an overall comparison between two Graphic Icons 144, or manually by displaying the Graphic Icons 144 to a user for selection at the user's decision.

As has also been described, the adjustment is performed by means of selected intermediate ratios used as aspect ratio range dividers. For example, if a Candidate Region 336 heighth-to-width ratio is less than 4:3 and greater than 3:4, and taller than wide, the Candidate Region 336 is "stretched" vertically to an aspect ratio of 4:3. Otherwise, if the ratio lies within this range the Candidate Region 336 it is stretched horizontally to an aspect ratio of 3:4, as the applicable aspect ratio range divider in this example occurs at 1:1. Other range dividers of the present example have been chosen to occur at 9:5 and 5:9.

Many aspect ratios and aspect ratio range dividers are possible, depending upon the number and range of acceptable aspect ratios for Graphic Icons 144. For example, another set of icon aspect ratios might be 6:2, 5:3, 4:4, 3:5 and 2:6, which would provide more advantageous "fits" for certain ranges of icons, but would result in significantly more icon shapes and greater consequent difficulty in organizing the icons tightly in a display. Still other sets of acceptable sizes and shapes are possible, including those based on nonrectangular division of the ultimate display space.

As has been described, and will be understood by those of ordinary skill in the relevant arts, many methods and combinations of methods may be used to "stretch" or otherwise adjust the aspect ratios of Candidate Regions 336 to form Graphic Icons 144 or to "fit" the Candidate Regions 336 into the selected aspect ratios when a given Candidate Region 336 does not fit into one of the selected aspect ratios. For example, any extra space around a Candidate Region 336 after it has been fitted into a selected aspect ratio may be left blank in the display, which may result in a disorderly appearing display which, however, may be acceptable. In another implementation, the Candidate Region 336 may be "stretched" in the needed direction, horizontally or vertically, as stretches of up to 5% will scarcely be noticed and stretches of up to 10% or even more will probably not be objected to by a user. In yet other implementations, the top or bottom or sides or any combination thereof may be "trimmed" or extended as necessary, perhaps using one of the methods described herein above. In another method, the Candidate Region 336 may be extended until the region reaches a recognizable background color, and thereafter filled with that background color, rather than including accidental and inappropriate parts of neighboring objects.

The operation of Aspect Ratio Adjuster and Candidate Comparator 342 has been described further herein above, and an implementation of Aspect Ratio Adjuster and Candidate Comparator 342 is described in Appendix A as "fix_aspect_ratio" and will thereby be well understood by those of ordinary skill in the arts. As such, Aspect Ratio Adjuster and Candidate Comparator 342 will not be discussed further herein or, and for the same reasons, will be the operation of various implementations of Visual Link Capture Engine 138 in selecting between the two Graphic Icons 144 resulting from the operation of Aspect Ratio Adjuster and Candidate Comparator 342 on Edge Adjusted Candidate Regions 336AE and 336BE. In this respect, however, it will be noted that the object in selecting between the two Graphic Icons 144 is to determine whether a first one of the two Graphic Icons 144 is sufficiently similar to a Graphic Icon 144 already in the current library or set of Graphic Icons 144 to be visually confusing to a user and, if so, whether the second candidate Graphic Icon 144 may be more suitable as being more visually distinctive to a user with respect to the already existing Graphic Icon 144.

7. Reiterative Method For Finding A "Best Rectangle"

It must be noted that the "best rectangle" of an original image for use in creating a Graphic Icon 144 may also be found be means of a reiterative method using essentially the same mechanism and data structures as described above, but in a reiterative manner using a plurality of progressively coarser edge images. Although requiring the construction of additional edge images in the same manner as described above, this method involves simpler steps and is thereby faster in at least some implementations.

According to the alternative, recursive method, the capture engine develops a quarter-size grayscale image as described above, for example, 192 pixels wide by 144 pixels high as these dimensions are multiples of 2, and from that grayscale image develops a low-pass filtered image and a first edge image. The capture engine then generates a sequence of progressively coarser edge images, each being reduced in resolution by 2 with repect to the previous edge image of the sequence. This, for example, will result in a 192×144 edge image, referred to as the first edge image, a 96×72 second edge image, a 48×36 third edge image, a 24×18 fourth edge image, and a 12×9 fifth edge image.

The capture engine will then perform an exhaustive search as described above to find the best subarea of the fifth, and smallest, edge image that contains none of the fifth edge image edge pixels and is at least 3 pixels wide by 2 pixels high. The coordinates of the best rectangle of the fifth edge image are then reflected back to the fourth edge image and 81 varients of that "best rectange" as reflected back to the fourth edge image are tested to find the "best" rectangle varient of the fourth edge image corresponding to the "best" rectangle of the fifth edge image. In this regard, the quantity 81 represents 3 varients on each possible edge adjustment of the "best" rectangle from the fifth edge image, that is, with each edge being pushed out one pixel, being left alone, or being pulled in one pixel.

The coordinates of the "best" rectangle of the fourth edge image that is a varient of the "best" rectangle of the fifth edge image are then reflected into the third edge image to find the corresponding rectangle therein. 81 varients of the "best" fourth edge image rectangle that is a varient of the "best" fifth edge image rectangle are again examined in the third edge image, again by one pixel adjustments of the edge of the rectangle in the third edge image, until the "best" third edge image rectangle is found.

This processes is repeated for successive edge images up through the sequence, moving to progressively higher resolution edge images, until a final "best" rectangle is found.

It will be appreciated by those of ordinary skill in the relevant arts that this alternative method thereby achieves a definition of a sub-rectangle for use in creating a Graphic Icon 144 by successive approximation. It will also be appreciated that this method can, in principle, define any possible sub-rectangle of the largest edge image, except those containing the very edge row of pixels, with tests on only a few hundred mostly smaller rectangles.

4. Detailed Description of Visual Links Organizer 166 (FIGS. 4A–4I)

As has been discussed briefly above, a common problem in designing computer/user interfaces is to arrange the non-overlapping placement or organization of objects, such as conventional icons, Graphics Icons 144 or photographs of electronic mail recipients, of various sizes and/or shapes in a display space, such as a display window, in an efficient manner. A further aspect of this problem in instances wherein there are a large number of such displays of objects is to provide a selection of display arrangements or organizations for each given number of objects of given sizes and shapes to allow a variety of mutually distinctive display arrangements for each given number of objects of given sizes and shapes.

According to the present invention, Visual Links Organizer 166 provides a solution to these problems by providing a mechanism for efficient packing any arbitrary collection of Graphic Icons 144 having various dimensions and aspect ratios objects, or other visual display objects such as conventional icons or photographs of electronic mail recipients of various sizes and/or shapes into a display area.

It has been noted in the previous discussions of Visual Links Organizer 166 that the "tiling" of many icons of various sizes and shapes, as was illustrated in FIG. 2B, is a "bin-packing" problem of tiling geometry and that, in certain implementations, such as those with a relatively small number of icons per display, for example, 10 to 20, Visual Links Organizer 166 may be implemented by computing and tabulating at least one arrangement for each maximally achievable icon population distribution. Thus, the possible arrangements for a display or a sub-section of a display can be determined in advance, as pre-arranged packing patterns for packing, for example, two 6:2s, four 4:3s, three 3:4s and one 2:6, and stored for use in a display or a sub-section of a display as necessary.

Therefore, and as will be described in the following Visual Links Organizer 166 performs this function by pre-computing and concisely storing tabulated guides or tables for organizing visual objects, such as conventional icons, Graphics Icons 144 or photographs of electronic mail recipients, of various sizes and/or shapes in a display space so as to speed and simplify the solution to specific object layout problems as they arise. Despite the conciseness of these tables, however, Visual Links Organizer 166 provides a wide variety of answers to each given problem, that is, a variety of visual object organization layouts for each given number of objects of given sizes and shapes.

a. General Description of Visual Links Organizer 166

As has been discussed with reference to FIG. 1A, Local System 112 includes a Visual Links Control 164 and a Visual Links Organizer 166, both of which are associated with and operate in association with Web Access Program 162, and associated with Visual Links Control 164 and Visual Links Organizer 166 is a Visual Links Library 168 for storing Visual Links 142, which include Graphic Icons 144. As discussed, Visual Links Control 164 operates to interface and integrate Visual Links 142, Visual Links Organizer 166 and Visual Link Capture Engine 138, if present, into Web Access Program 162, and allows a user to access the target of a Visual Link 142 and to save a Visual Link 142 in Visual Links Library 168 or a file. Visual Links Organizer 166, in turn, allows a user to create and edit Visual Links 142, to store Visual Links 142 in Visual Links Library 168, and to otherwise manage Visual Links 142 and Visual Links Libraries 168. Visual Links Organizer 166, which will be described in detail further below, also allows a user to organize the display of Visual Links 142 in a Visual Links Library 168, for example by displaying Graphic Icons 144 in one or more display windows or areas.

Figure 4A:
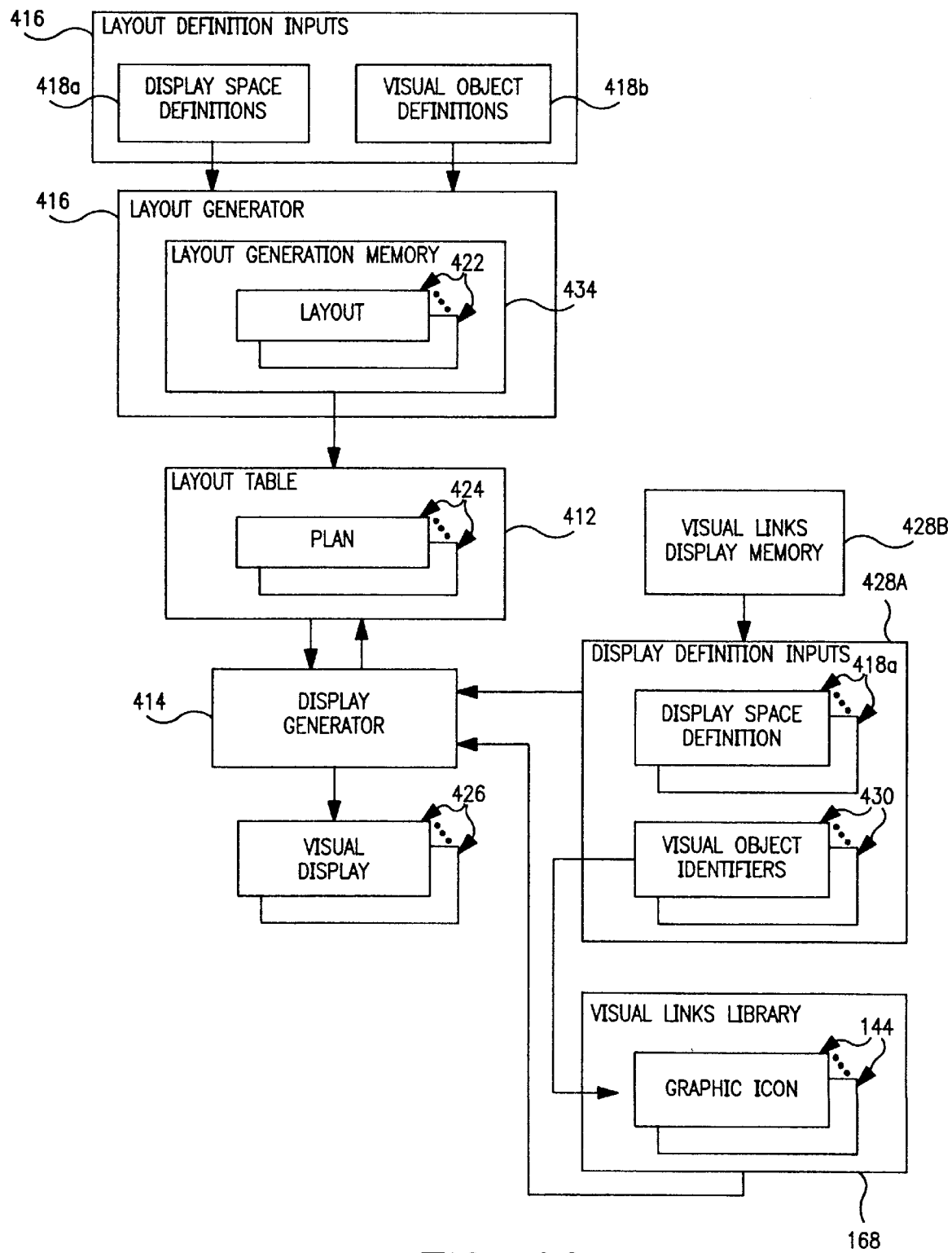
FIG. 4A is a block diagram of a visual links organizer for generating display layouts and plans for graphic icons.

Referring to FIGS. 1A and 4A, it is illustrated therein that a the Visual Links Organizer 166 of a Local System 112 or, for example, a Server System 114, may include a Layout Generator 410, a Layout Table 412 and a Display Generator 414, for respectively generating and storing display layouts and generating displays of visual objects, depending upon the particular implementation and function of a given specific embodiment of Visual Links Organizer 166. In many Local Systems 112, for example, as illustrated in FIG. 1A, the Visual Links Organizer 166 may include only a Layout Table 412 and a Display Generator 414 and the layouts may be provided from another system, such as another Local System 112 or a Server System 114 to be stored in the Layout Table 412 for use in the Local System 112.

In this regard, Layout Generator 410 is responsive to Layout Definition Inputs 416, each including a Display Space Definition 418a containing a specification of a selected display area, such as 12 units by 12 units, and a Visual Object Definition 418b containing a specification of the numbers, sizes and aspect ratios of visual objects to be displayed therein, for generating one or more corresponding Layouts 420 which are encoded as Plans 424, each containing a description of a layout, or organization, of the specified visual objects in the specified display space. Plans 424 are then stored in Layout Table 412, where they may be accessed by Display Generator 414 to generate a Visual Display 426 of a specified display area containing a set of identified specific Graphic Icons 144 or other visual objects conforming with the corresponding Visual Object Definition 418b as to number, size and aspect ratio.

Display Generator 414 is, in turn, responsive to Display Definition Inputs 428A containing a Display Space Definition 418a provided, for example, by a user or by another program operating through Visual Links Control 164 or from a Visual Link Display Memory 428B associated with Visual Links Organizer 166 for storing information relating to the display capabilities of Local System 112, and specifying the display area to be used for displaying a set of Graphic Icons 144 or other visual objects. Display Definition Inputs 428A also include a set of Visual Object Identifiers 430, such as pointers to specific Graphic Icons 144 residing in Visual Links Library 168 and identifying members of a set visual objects conforming with the corresponding Visual Object Definition 418*a* that are to be displayed in the defined display area. In this regard, Visual Object Identifier 430 may be provided by a user of another program or, more probably from Visual Links Display Memory 428B because a user will generally use Visual Links Organizer 166 to organize Visual Links 142 into groups of related Visual Links 142 and will store the identifications of the Visual Links 144 as groups in Visual Links Display Memory 428B. Display Generator 414 is then responsive to Display Definition Inputs 428 for indexing Layout Table 412 with Display Definition Inputs 428, reading one or more corresponding Plans 422 therefrom, and generating a Display 428 of the identified Graphic Icons 144 or other visual objects in the specified display area and according to the selected Plan 424.

It will be appreciated by those of ordinary skill in the relevant arts that the component parts of a given implementation of Visual Links Organizer 166 may depend upon the intended purpose and functions of that implementation of Visual Links Organizer 166. For example, and as illustrated in FIG. 1A, an implementation of Visual Links Organizer 166 residing in a Local System 112 may include only Display Generator 414 and one or more Layout Tables 412 as the Layout Tables 412 may be provided from an external source, such as downloaded from a Server System 114 or a Web Site 118 or otherwise provided with Visual Links Organizer 166 on initial installation of Visual Links Organizer 166 or later loaded from disk. In other instances, however, an implementation of Visual Links Organizer 166 residing on a Local System 112 may include Layout Generator 410 to allow the user of the Local System 112 to generate Plans 422 at will. In a like manner, an implementation of Visual Links Organizer 166 residing on a Server System 114 may include Display Generator 141, one or more Layout Tables 412 and Layout Generator 410, thereby allowing the operators of the Server System 114 to generate Displays 428 of Graphic Icons 144 residing in Visual Links Library 168 for use by the operators of Server System 114 in managing the creation an storage of Visual Links 142 therein, as well as generating Layout Tables 412 for local use in Server System 114 and possibly for downloading to Local Systems 112. In yet other implementations, a system for generating Layout Tables 412 may include only Layout Generator 410 and the Layout Tables 412 generated by Layout Generator 410, with the Layout Tables 412 being provided elsewhere, such as to a Local System 112 or a Server System 114 for use therein.

It will also be understood by those of ordinary skill in the relevant arts that the applications of the various implementations and embodiments of Visual Links Organizer 166 are not limited only to World Wide Web systems and the organization and display of Graphics Icons 144 but may be used in any application requiring the non-overlapping placement or organization of objects, such as conventional icons or photographs of electronic mail recipients, of various sizes and/or shapes in a display space, such as a display window, in an efficient manner. The implementations of Visual Links Organizer 166 may therefore be used, for example, to organize and display graphic representations or icons representing application programs, as in Microsoft Windows Program Manager, or to organize and display graphic representations or icons of files, as in Microsoft Windows File Manager, or to organize and display icons or graphic representations, such as photographs, of recipients or locations in an electronic mail system.

b. Definitions and Terms

The operation of Layout Generator 410 may be illustrated with reference to FIG. 4B, which illustrates an exemplary Layout 422 generated by Layout Generator 410. In this example, the Display Space Definition 418*a* specifies a display area of 12 by 12 units and Visual Object Definition 418*b* has specified that the visual objects to be displayed therein shall include three 6-high by 2-wide Graphic Icons 144, five 4-high by 3-wide Graphic Icons 144, two 3-high by 4-wide Graphic Icons 144, and one 2-high by 6-wide Graphic Icon 144, with 12 square units of unused space occurring in the resulting Layout 422.

Before proceeding with the detailed description of Visual Links Organizer 116, certain of the terms and expressions used in the following descriptions will be defined, and illustrated by reference to FIG. 4B. These terms and expressions include:

(a) Screen: a rectangular space allotted for tiling with icons.

(b) Coordinates (of an icon): the coordinates of a Graphic Icon 144 or other visual object in a screen is described by the coordinates stating horizontal and vertical positions, in that order, of the top left corner of the visual object, using the horizontal and vertical coordinates 0, 1, . . . ,9,A,B, . . . Z having an origin at the top left corner of the screen, as illustrated in FIG. 4B.

(c) Units: the basic dimensional granularity of visual object, such as Graphic Icons 144, and screen layouts.

Figure 4B:
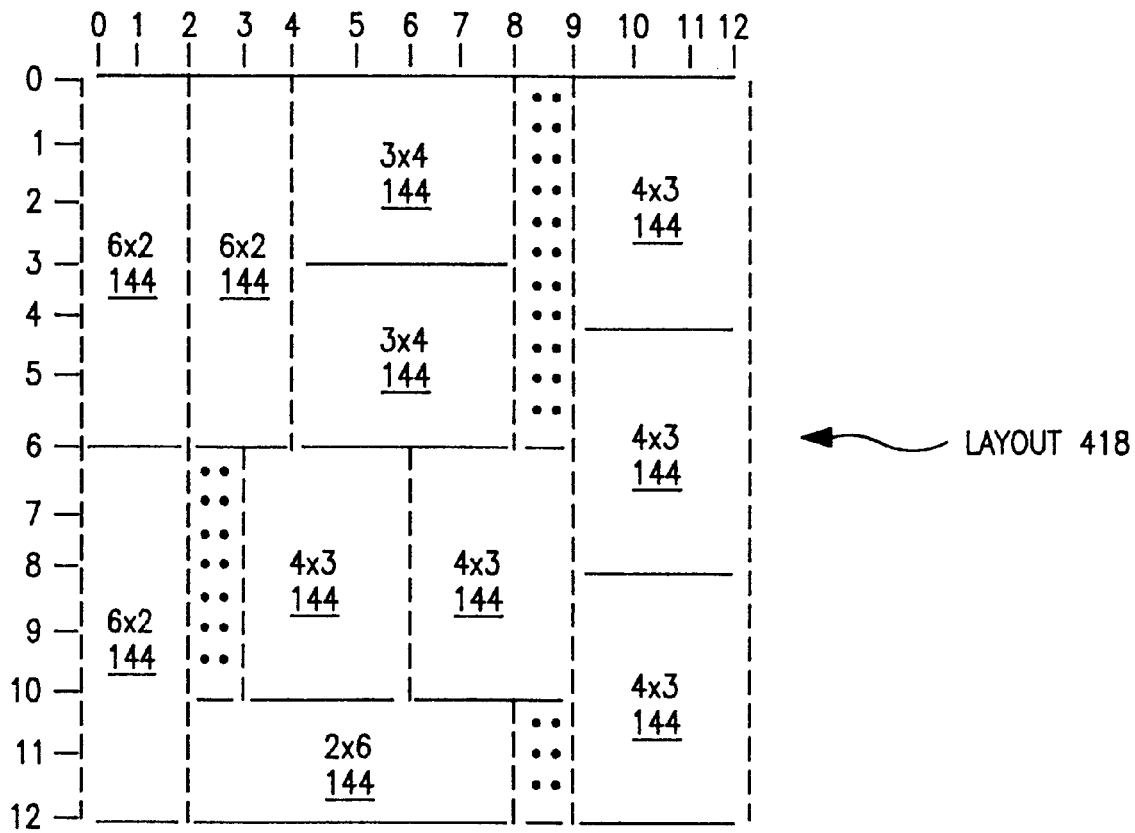
FIGS. 4B, 4C and 4D are illustrations of graphic icon layouts and plans.

(d) Icons: generic term for Graphic Icons 144 or other visual objects forming the tiles for filling space, illustrated in FIG. 4B for Graphic Icons 144 having aspect ratios of 6×2, 4×3, 3×4, and 2×6 units;

(e) Layout: a specific geometric configuration of icons in a screen, referred to herein as a Layout 422.

(f) Orientations, rotations and reflections: an angular position, orientation rotation in a screen with respect to the horizontal and vertical axes of the screen and labeled with respect to the 1:00 o'clock position, using a clock face as a coordinate system according to the convention

```
    B  1
 A      2
    *
  8     4
    7 5
``` so that orientation "8" specifies a reflection through a 45 degree backslash angle.

(g) Icon set: a specified group of icons having defined aspect ratios, for example, the set illustrated in FIG. 4B is {6×2, 4×3, 3×4, 2×6} and an alternative set might be {6×2, 5×3, 4×4, 3×5, 2×6}.

(h) Fault: a cutline across a layout which divides it into two rectangles without intersecting any icons.

(i) Subrectangle: a proper subarea of a layout containing completely some subset of its icons and no parts of other icons.

(j) Subsquare: a square sub-rectangle.

(k) Types: the sizes and shapes of the icon set as identified by the heights of the icons in the set, so that the types of the icons illustrated in FIG. 4B are 6, 4, 3, 2.

(l) Population (of a layout): the number of icons of various sizes/shapes as specified by the number of each type stated in an understood order, such as decreasing height, so that the population of the layout illustrated in FIG. 4B is specified as 3 5 2 1, representing 3 6x2 icons, 5 4x3 icons, 2 3x4 icons, and 1 2x6 icon, wherein it us understood that a population may be hypothetical and may, in fact, be unrealizable in a certain size of screen, so that the population 6 0 0 0 cannot be realized by a layout for an 11x11 screen even though there would seem to be sufficient space for the icons in the screen.

(m) Subpopulation (of a population): a set of icons for which the count for each type therein is not greater than the count for corresponding type in the population of which the subpopulation is a member, and which is lesser for at least one type, so that the set 2 4 2 1 is a subpopulation of the population 3 5 2 1.

(n) Maximal population: for a specific screen size and shape, a layout-realizable pupulation such that the increase by one of any of its icons types yields an unrealizable population for that screen size and shape.

(o) Plan: a notation, referred to herein as a Plan 424, for a layout for understood screen size/shape, such as the 12x12 screen illustrated in FIG. 4B and wherein the population and sequence of top left coordinate locations of the icons are ordered by type, so that the plan for the example of FIG. 4B is written as 3521 00 20 06, 90 94 36 66 98,40 43, 2A, with the understanding the commas and spaces are not required, wherein the first number, which contains a digit for each type of icon, such as 3521, defines the population of the screen by number of each type of icon, such as 3 6x2 icons, 5 4x3 icons, 2 3x4 icons, and 1 2x6 icon in the present example, and each set of two digit numbers defines, for each type of icon, the coordinates of the upper left corners of the icons of the corresponding type, so that 00 20 06 specifies the coordinates of the upper left corners of the 6x2 icons, and so on. Further examples of a tablulated set of layouts is illustrated in Appendix B.

Figure 4C:
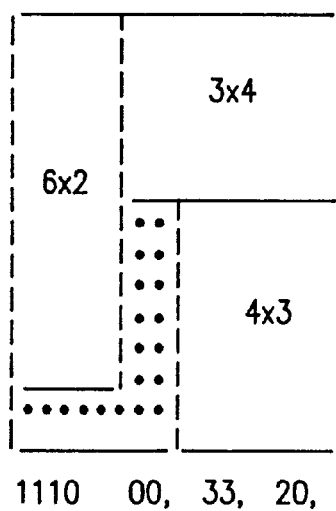
Figure 4D:
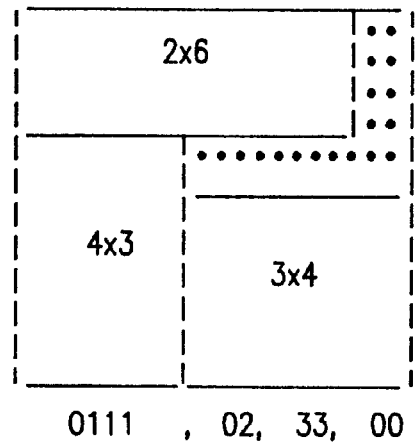

(p) Inversion (of a screen's aspect ratio): a reinterpretation of a plan, such as 6x7, to its inverted aspect ratio, such as 7x6, by 45-degree-backslash flip and performed by exchanging the interpretation of its x and y dimensions and interchanging all designations of aspect ratios stated for the original screen, such as 6x2<—>2x6 and 3x4<—>4x3, so that the two plans are inversions of each other, as illustrated in FIGS. 4C and 4D.

According to the present invention, it is necessary to generate and save only plans for wider-than-high and square screens for icon sets that contain all icons in both orientations as the corresponding higher-than-wide, or wider-than-high, screens and the inversions of square screens may be generated by inversion of the generated screens.

(q) Sublayout: a subset of a layout wherein the population of the subset is a subpopulation of the layout so that the layout may contain the population of the sublayout by occupying a part of the icon locations in the layout with the icons of the population of the sublayout. For example, the population 3421 is a subpopulation of the population 3521 and can be arranged in the 3521 plan by using any four of the five locations designated for 4x3 icons in the 3521 plan. This principle is related to but different from the principle that a set of one or more different plans may often be generated from an original plan having space not occupied by icons by vertical or horizontal lateral movement, that is, sliding, of one or more of the icons of the original plan.

Therefore, by visual examination of FIG. 4A it can be seen that at least four additional 3521 layouts may be generated from the 11x12 layout illustrated therein by horizontal movement, or sliding, or an icon and that more may be generated by horizontal movement of combinations of two or more of the icons therein.

d. The Generation of Plans by A Layout Generator 410

Figures 1, 4E:
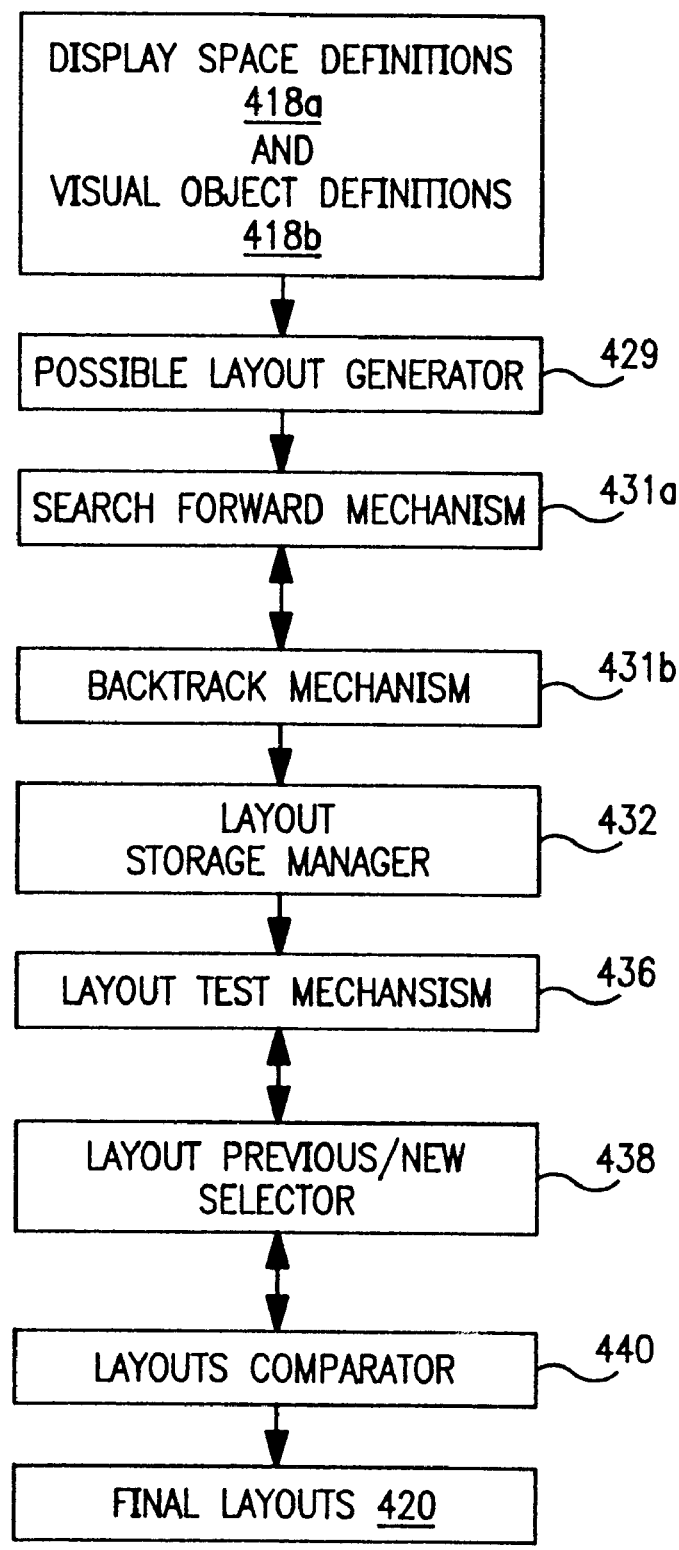
Figures 2, 4E:
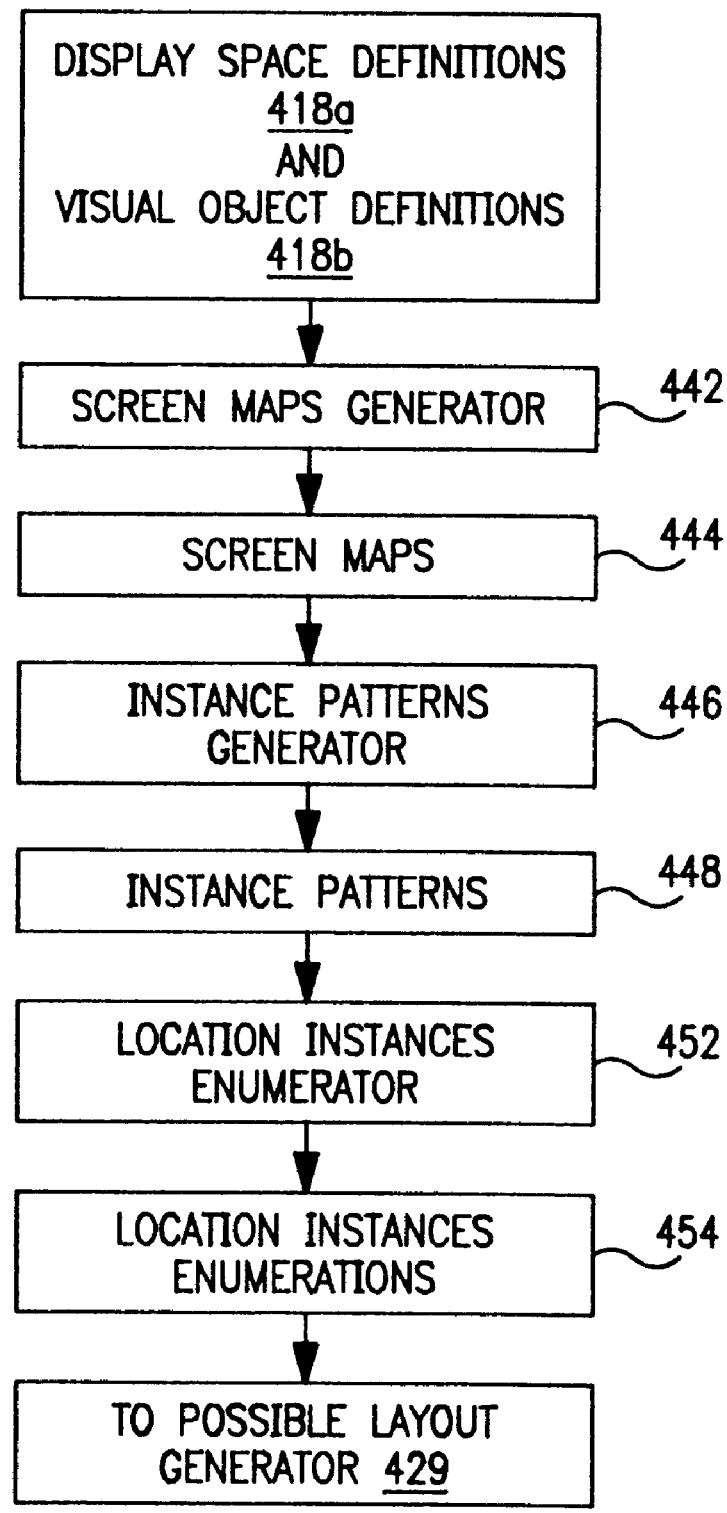

Referring to FIG. 4E-1, therein is illustrated the process executed by Layout Generator 410 in generating at least one Layout 422 and a corresponding Plan 424 for each specified screen, such as 6x6, 6x7, 6x8, . . . 7x7, 7x8, . . . 10x6, . . . 11x12, . . . and so on. The following will assume that, in the presently preferred embodiment of Layout Generator 410, only one Plan 424 is stored for each population of Graphic Icons 144 or other visual objects to be displayed therein, although it will be understood that in other implementations a plurality of Plans 422 may be generated and stored for each combination of a screen size and aspect ratio and population of Graphic Icons 144 or other visual objects to be displayed therein. It will be understood by those of ordinary skill in the relevant arts that the following process and mechanism may be applied to the arrangement or layout of any form of visually displayable objects, such as conventional icons, graphic images of all forms and images such as photographs, in any form of display and is thereby not limited in use only to the layout of Graphic Icons 144. As such, it will be understood that in the following the term "graphic icon" is intended to refer to any form of visually displayable object occupying a rectangular space.

As illustrated in FIG. 4E, therefore, the process executed by Layout Generator 410 is generating Layouts 420 and Plans 422 is performed by a Layout Generator 410 mechanism including a Possible Layout Generator 429. Possible Layout Generator 429 generates, for each screen size and aspect ratio and for each maximal population of Graphic Icons 144 or other visual objects, as specified by the numbers and types of visual objects, as, for example, by a Display Space Definition 416 and a Visual Object Definition 420, generate all possible Layouts 420 for a combination of screen and population by trying all possible locations of the various types of icons of the specified population in the specified screen, disallowing icon overlaps, and consider as candidates the endpoint Layouts 420 that can accommodate no further icons, that is, are filled by the specific population.

As indicated in FIG. 4E-1, Possible Layout Generator 429 includes a Search Forward Mechanism 431a which searches forward on each placement of each Graphic Icon 144 or other visual object of the current population in the current screen until possibilities have been considered, wherein a search forward is an attempt to place a next icon from a list of icons of the current population into the current screen.

Possible Layout Generator 429 further includes a Backtrack Mechanism 431b connected from and interoperating with Search Forward Mechanism 431a which backtracks on each placement of each Graphic Icon 144 or other visual object of the current population in the current screen until all possibilities have been considered, wherein a backtrack is the removal of the most recently placed icon and an attempt to place a next icon from the list of icons of the current population into the screen and, if no subsequent icon can be placed after removal of the most recent icon, a removal of the next previously placed icon and an attempt to place a next icon from the list of icons of the current population.

A Layouts Storage Manager 432 then stores each Layout 422, that is, Plan 424, in a Layout Generation Memory 434, shown in FIG. 4A, for subsequent testing and selection. In this regard, a Layout Test Mechanism 436 is connected from Layout Generation Memory 434 through Layouts Storage Manager 432 to read each Layout 422 from Layout Generation Memory 434 and to test each new resulting Layout 422 against all other Layouts 420 previously generated in Step 430 and stored in Layout Generation Memory 434.

Layout Previous/New Selector 438 is connected from Layout Test Mechanism 436 and selects between a new Layout 422 and a previously existing Layout 422 according to a predetermined criteria. For example, and in the present embodiment, if a new Layout 422 has a subpopulation of a previous Layout 422, Layout Previous/New Selector 438 discards the new Layout 422. If a previous Layout 422 has a subpopulation of a new Layout 422, Layout Previous/New Selector 438 replaces the previous Layout 422, unless disqualified in a following step, as described below. If a previous Layout 422 has a subpopulation of the new Layout 422, Layout/Previous Selector 438 discards the new Layout 422 and, if a previously existing Layout 422 has the same population as a new Layout 422, Layout Test Mechanism 436 selects between the previous and new Layouts 420 by discarding one or the other by either (1) random selection between the previous and new Layouts 420 having the same population or (2) selecting the Layout 422 having the greater asymmetry as potentially generating the larger number of different Layouts 420 through a subsequent step of usage-phase modification, described below.

At this stage in the process there may still survive Layouts 420 having populations that are subpopulations of other surviving Layouts 420, such as a Layout 422 that eliminated a previously generated Layout 422, that is, a Layout 422 with a subpopulation of its own, that may in turn might also disqualify others Layouts 420 previously generated which also have subpopulations of that Layout 422's population. A final selection of Layouts 420 may therefore be performed by a Layouts Comparator 440 wherein the populations of each pair of surviving Layouts 420 are compared and Layouts 420 having populations that are subpopulations of Layouts 420 are discarded. Alternately, this process may be performed by comparison of each pair of Layouts 420 in Layout Test Mechanism 436, depending upon which implementation proves most efficient in a given embodiment of Layout Generator 410.

Finally, the surviving Plans 422 encoding the final surviving Layouts 420 are tabulated and stored in are tabulated, as demonstrated in one or more Layout Tables 412. In this regard, it should be noted that in a presently preferred embodiment of the invention Plans 422 are grouped in Layout Tables 412 by screen size and aspect ratio, often with each Layout Table 412 continuing the Plans 422 for a given screen size and aspect ratio, and that Layout Tables 412 may then be indexed, first, by available display, or screen, size and aspect ratio, with the selected Layout Table 412 then being indexed by the icon population to read therefrom a Plan 424, if available therein. In other implementations, the Plans 422 may be grouped first by populations and then by screen size and aspect ratio.

It should be noted that in as much as it is often necessary to generate no more than one, two or three Layouts 420 for each maximal achievable population for a particular screen, Step 430 may be implemented alternatively by first searching for the full area occupancy populations for the screen for each possible maximal set of icons that would fill the screen area, with Layout Generator 410 searching for a fitting of each of the sets of icon shapes into the screen area. Then, for each population that cannot be realized, Layout Generator 310 searches for Layouts 420 for each possible subpopulation of that population that contains one less member, repeating the search with successive subpopulations that are each reduced a different icon type and, in each branch of the search, repeating the search with progressively reduced subpopulations until a subpopulation is found that can be fitted into the screen area, to find all possible subpopulations of the original population that can be fitted into the screen area. The resulting Layouts 420 are then culled by comparison to previously generated Layouts 420, as described above.

It will be recognized by those of skill in the relevant arts that the procedure of Steps 430 through 440 described above may require significant computing power to time to complete due to the large number of possible screen sizes and possible plans that must be searched for each possible population. The method of the present invention, however, and as described below, provides additional initial steps to increase the speed and efficiency of the generation of Plans 422.

As illustrated in FIG. 4E-2, therefore, and according to the present invention, mechanism described above with regard to FIG. 4E-1 may further include mechanism for performing the following operations in association with or preceding the operations performed in Possible Layout Generator 429 to generate patterns of various instances of icon layouts in various screens and to provide the resulting patterns for use the process described above.

In this regard, and referring to FIG. 4E-2, Layout Generator 410 may further include a Screen Map Generator 442 for generating, for each screen size and aspect ratio up to a maximum screen height (or width) of X units, a corresponding Screen Map 444 at a resolution, for example, of Y bits-per-unit-square in as many X bit words as the screen is wide (or high) wherein X is selected as a convenient word length for processing in the system in which Layout Generator 410 is implemented and Y is, for example, the smallest dimension, in bits, of any icon. For example, many computers operate efficiently with 16 bit words and, accordingly X is selected as 16 in a presently preferred embodiment of Layout Generator 410.

The Screen Maps 444 are then provided to an Instance Patterns Generator 446 that, for each icon type, that is, icon size and aspect ratio, generates as many screen-size "Instance" Patterns 448 as there are possible locations in the Screen Map 444 for that type of icon, using special encoding for clear space at top and bottom between the placement of a icon and a side or the top or bottom of the Screen Map 444 as necessary. This process of determining whether a given instance of an icon of a given type into the Screen Map 444 will fit, and placing or removing it, is thereby comprised of fast logical AND, OR and EXCLUSIVE-OR operations, respectively.

It will be noted that with regard to allowing clear space along any side of the Screen Map 444 that if there is no icon type under consideration with minimum dimension less than two, then it is unnecessary to consider instances, or placements of the icon in the Screen Map 444, having one-unit space between the icon and an edge, unless it is necessary due to the shapes of an icon and the screen, as in the placement of a 2×6 icon on a 7×7 screen. Therefore, in making instance patterns of icon positions, Step 446 omits near-but-not-on-side locations except where necessary.

Figures 3, 4E:
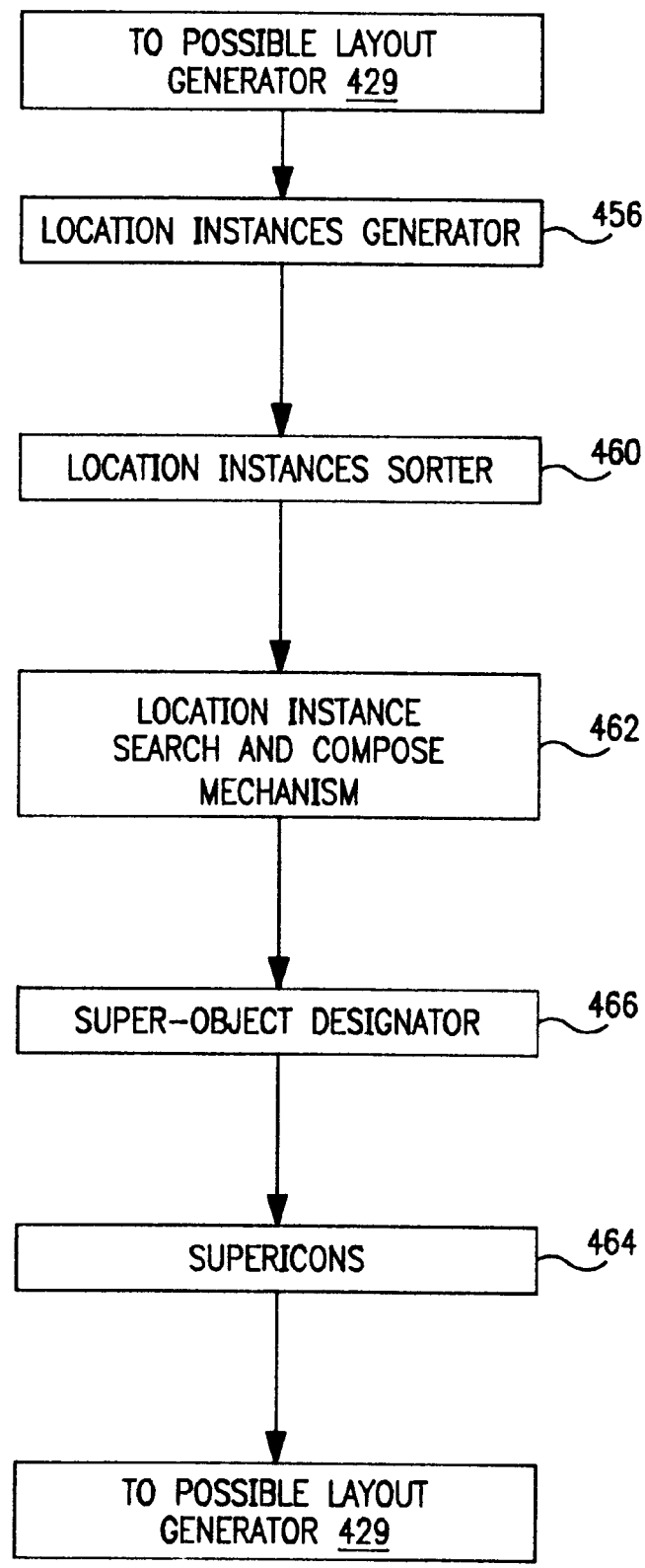
Figures 4, 4E:
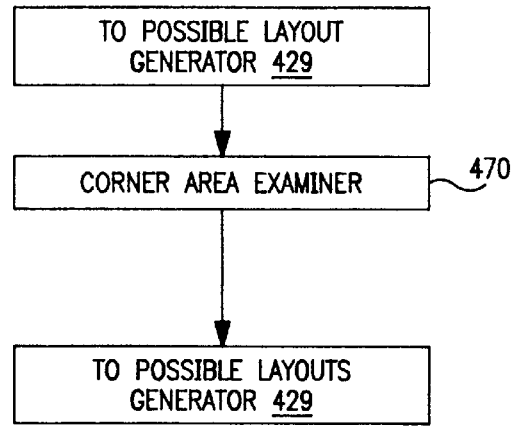
Figures 4, 4E, 5:
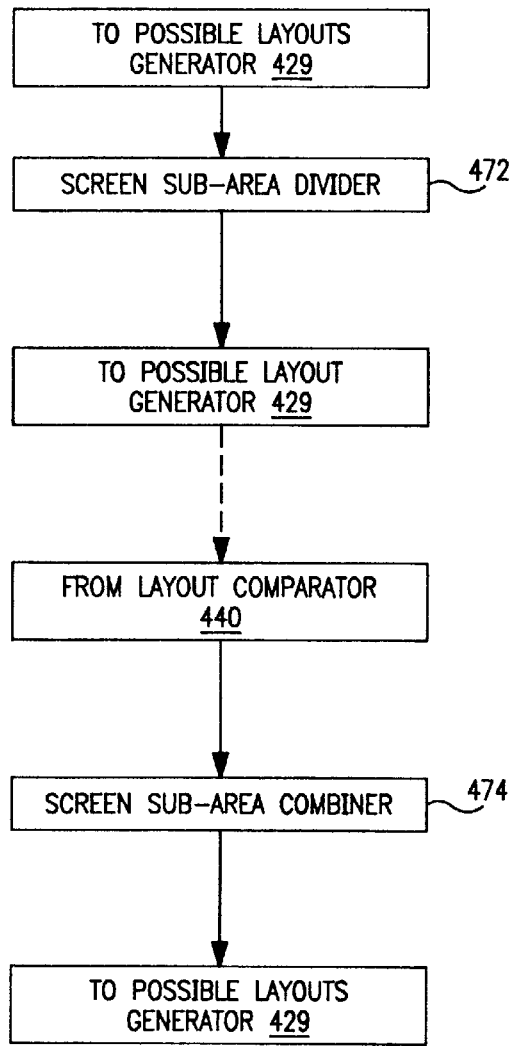
Figure 4F:
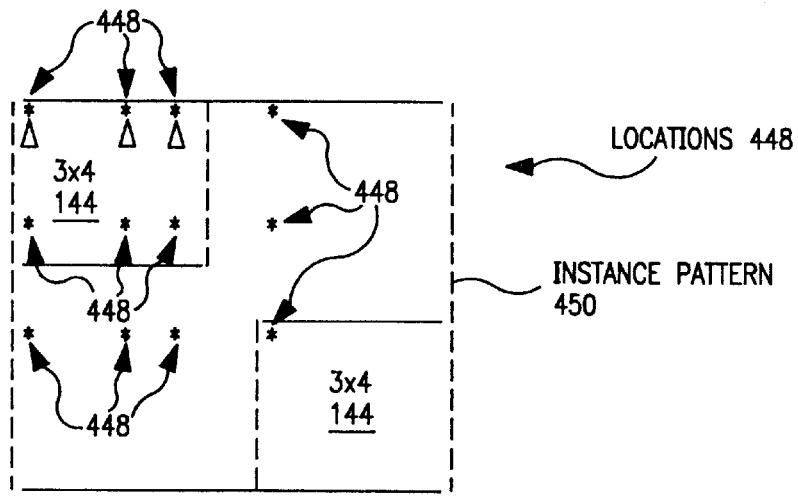
FIGS. 4F, 4G, 4H and 4I and 4J through 4M are illustrations of data structures and layouts used in the operation of the visual links organizer in generating graphic icon layouts and plans.

The result of these operations is thereby at least one Instance Pattern 450, an example of which is illustrated in FIG. 4F, containing a sufficiently complete set of Locations 450 for each icon type in the screen represented by Screen Map 444, each Location 448 representing a possible instance of the icon type in the given screen. The example of an Instance Pattern 450 illustrated in FIG. 4F shows a sufficiently complete set of Locations 450 for 3×4 icons in a 7×9 screen wherein each Location 448, each of which is indicated by a *, identifies the location of the upper left corner of a 3×4 icon for a possible placement, or instance, of an icon of that type in the given screen.

Finally, a Location Instances Enumerator 452 enumerate the instances of the icon of the given type in the screen in order of proximity to the screen corners for each screen and icon type to be considered in a corresponding Instance Enumeration 454, and provide the Instance Enumerations 454 for use by Possible Layout Generator 429.

As has been discussed above, the process executed by Possible Layout Generator 429 involves a significant number of reiterations of icon placement steps and backtrack steps, which in turn entails the inadvertent rediscovery of members of sets of icons far down through the process steps that conflict with one another. As such, the processes and operations described above may be further enhanced for the case of large screens, such as 12×12 or larger, by a method wherein variously located instances of each shape of icon to be placed in a screen are sorted into disjoint sets according to their locations in the screen and each set is treated as a "supericon", the supericons then being used in the screen filling process described above.

Figure 4G:
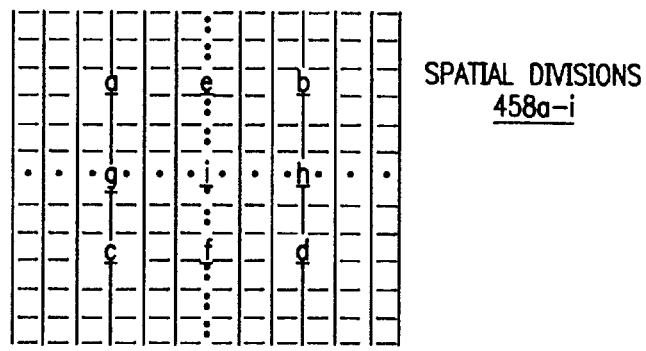

As illustrated in FIG. 4E-3, Layout Generator 430 may thereby further include a Screen Spatial Division Generator 456 that determines, for a large screen such as 12×12 or larger, the various possible location instances of each type of icon with respect to nine spatial divisions of the screen, which are illustrated in FIG. 4G for a 12×12 screen. As may be seen therein, the screen is divided into four quadrants by horizontal and vertical axes of symmetry and four of the spatial divisions are formed by the four corner quadrants formed by the two axes of symmetry while the right and left halves of and along the horizontal axis of symmetry, the upper and lower halves of and along the vertical axis of symmetry and the intersection point of the axes of symmetry in the center of the screen form the remaining five spatial divisions. The nine sets correspond to Spatial Divisions 458a, 458b, 458c and 458d, which correspond to the four corner quadrants, Spatial Divisions 458e, 458f, 458g and 458h, which correspond to the halves of the two axes, and Spatial Division 458i, which corresponds to the intersection point of the two axes.

Thereafter, a Location Instances Sorter 460 sorts, for and according to each type of icon, the location instances of the icon in the screen according to their positions with regard to nine spatial divisions of the screen.

Then, and for each of the nine sets, a Location Instance Search and Compose Mechanism 462 searches for and composes compatible, that is, non-overlapping, combinations of icon location instances, for example, by operation of Layout Generator 410 or by presenting possible choices to a human operator, and a following Super-object Generator 466 designates each compatible combination as a Supericon 464, with the purpose of filling the screen as completely as possible with Supericons 464.

For each of the nine sets of icons, and in principle, all combinations of 0, 1, 2, or 3 or more icons may be considered as Supericons 464. The search for such combinations may be restricted, and the search accordingly shortened, according to certain principles.

First, for Spatial Divisions, or sets, 458a, 458b, 458c and 458d, which occupy the four corner quadrants of the screen, all combinations having at least one quadrant with zero members may be discarded as no maximal population can result from a combination having an empty corner quadrant. Further, in any pattern in which a corner unit of a quadrant is not occupied, one of the icons near the corner may be moved, or translated horizontally or vertically, into the empty corner quadrant, and that pattern will result at least one other point in the search. That is, the two instances, with the icon near the corner and with the icon in the corner, are essentially equivalent so that the icon may as well be placed in the corner rather than considering the two instances separately.

Second, there will most probably be one or more combinations wherein there are "slits" one unit wide between two icons which cannot be filled by vertical or horizontal translation of one of the icons, and which may in fact impede the placement of other icons. Also, the configuration that would result from moving the icons to close the "slits" will most probably occur elsewhere in the search and, as a result, as no maximal population can result from a combination generated by vertical or horizontal translation of an icon to eliminate a "slit" space between two icons. Such combinations are therefore preferably discarded from consideration.

It will be noted that the above two situations are instances wherein there are two equivalent combinations, one where there is a non-fillable slit and one where an icon has been moved to fill the slit and results in an equivalent non-fillable slit. In these instances it is not necessary to consider both of the equivalent combinations, but only those combinations wherein moving an icon results in the locking out of an icon placement possibility. For example, and referring to FIG. 4H, if the 4×3 icon at the upper left were one unit further right, no new combinations or placements would result than what is possible with the icon in its present placement, so it is not necessary to consider the combination with the icon moved one unit to the right. In the instance wherein the upper left 6×2 icon and the 4×3 icon are reversed, however, with a unit space between the icons, a movement of the 6×2 icon to the left precludes a 3×4 icon immediately under the 4×3 from being placed, so that this instance should be considered.

Finally, some combinations occupy exactly the same areas and have exactly the same subpopulations as other combinations and are therefore equivalent and may be discarded from consideration.

The search for such combinations may be restricted and the culling of combinations according to the above principles may be implemented as by Supericon Designator 466 operating in association with Location Instance Search and Compose Mechanism 448, or may be performed manually by presenting possible combinations to a human operator for decision. It should be noted that experimentation has shown that the application of these principles will result in approximately ¾ of the possible combinations surviving the culling process, so that the generation and search process can accordingly be reduced to approximately ¾ to the ninth power of the original time required, that is, to approximately less than a tenth of the original time required to generate and search layouts for large screens.

Figures 4H, 4I:
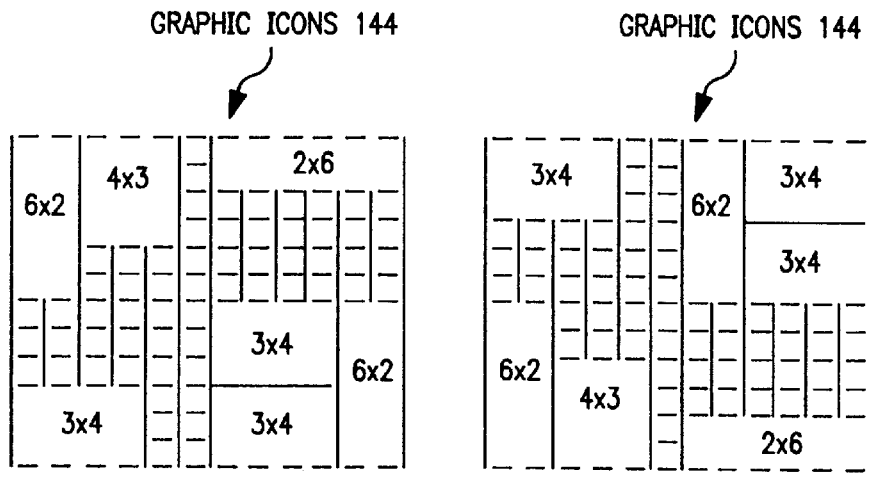

Lastly with regard to the use of Supericons 464 to reduce the number of reiterations of icon placement steps and backtrack steps, it will be apparent from the above discussions that certain sets of combinations generated as described above will result in sets of combinations that are rotational or reflectional equivalents to one another. For example, each of several starting points of a search for combinations may start with a set of combinations with one combination from each of the corner quadrants of the screen, that is, a 458a, 458b, 458c and 458d combination wherein each of the combinations, when appropriately rotated or reflected, is equivalent to the other combinations. This may be illustrated as in FIGS. 4H and 4I wherein it is apparent that the two starting sets of combinations are equivalent because the subpopulation and covered area pattern of FIG. 4I is the same as that of FIG. 4H when subjected to a rotation about the right half horizontal axis.

As also discussed above, it is anticipated that the final usage of Layouts 420 to generate screen displays anticipates that at least certain Layouts 420 will be rotated or reflected to generate yet other Layouts 420, so that the end result of the entire process could be the generation of equivalent Layouts 420.

As a consequence, the search for such combinations may further be restricted and the generation of combinations enhanced by a process wherein the starting combinations are pruned, or culled, or any set of starting quadruple combinations that are rotational or reflective duplicates of already generated starting combination quadruples.

The speed and efficiency of Possible Layout Generator 429 and thus of the subsequent processes described above may also be increased by further mechanism associated with Possible Layout Generator 429 or a subsequent process wherein a large screen is generated as a combination of two or more smaller screens.

Therefore, and as illustrated in FIG. 4E-4, Layout Generator 410 may further include a Corner Area Examiner 470 connected from and to Possible Layout Generator 429 which, for very large screens, examines the corner areas of each Layout 422 as it is generated and retain only Layouts 420 whose corners are filled in unique ways, that is, discard one or any pair of Layouts 420 if the patterns of similar icons filling their corners are rotational or reflectional equivalents, that is, if one is a 5, 7, or B reorientation of the other. Corner Area Examiner 470 may also apply the criteria that all four corners of a Layout 422 be occupied.

Finally, the speed and efficiency of Layouts Generator 430 and thus of the subsequent processes described above may also be increased by additional processes primarily intended for use with large screens, for example, greater than 12×12. In these additional processes, Layouts 420 are composed by dividing the screen into two or more smaller screens, generating solutions for the smaller screens, and generating the solution for the original large screen by combining the solutions for the smaller screens. In this embodiment, as illustrated in FIG. 4E-5 and primarily for use with large screens, Layout Generator 410 will further include a Screen Sub-Area Divider 472 connected from Possible Layout Generator 429 which divides each screen, such as a 13×12 screen, into two or more smaller screens or sub-areas, for example, (n)×12 and (13−n)×12 wherein n=5, 6, 7. Screen Sub-Area Divider 472 then provides the smaller sub-area screens to Possible Layout Generator 429, which uses each sub-area screen independently as a display area for the generation of corresponding Layouts 420.

Then, a Screen Sub-Area Combiner 474 operates in conjunction with Layouts Comparator 440 to compose Layouts 420 for the original full size screen by joining the Layouts 420 generated for the smaller sub-area screens, adding the populations of the smaller screens, transposing the coordinates of the smaller screens into coordinates of the large, combined screen and test for duplication and inclusion relationships among the resulting Layouts 420, as described previously.

Alternatively, the Layouts 420 may be generated for the smaller screens as described above and a Layout 422 may be generated for the original larger screen by Location Instance Search and Compose Mechanism 462 wherein Layout Generator 410 or another program searches Layout Tables 412 for a combination of smaller screens that may be combined into a screen having the dimensions and population of the large screen, and so combines the smaller screen Layouts 420 into a Layout 422 for the large screen.

Figure 4J:
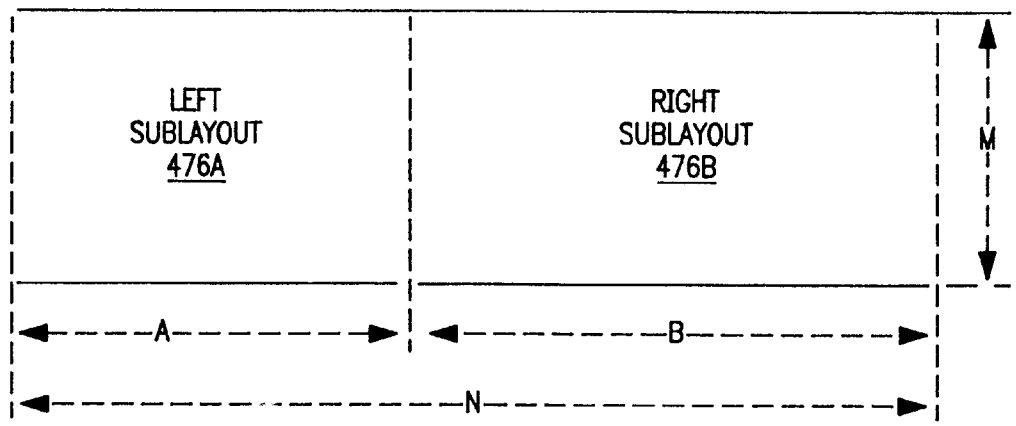

The above described process of generating a layout for a large screen as a combination of layouts for smaller screens may be illustrated with the aid of FIG. 4J wherein an M×N Screen 476 is divided two SubScreens 476A and 476B having dimensions, respectively, of M×A and M×B and which may be side by side, as illustrated in FIG. 4J, or one above the other. Layouts 420 for SubScreens 476A and 476B that are usefull in generating a Layout 422 for Screen 476 may be generated and tabulated in advance by considering the generating all pairs of sublayouts for screens having dimensions of M×A and wherein A+B=N. Layout Generator 410 can generate a very large number of populations that can be arranged in M×N screens by adding various A+B populations. As described above, Layout Generator 410 may discard any resulting population that is a subpopulation or equivalent population to one already generated, and may disqualify those layouts whose populations are subpopulations of a new layout.

Figure 4K:
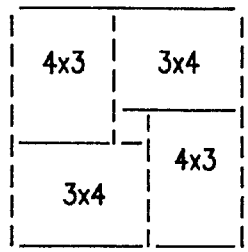
Figure 4L:
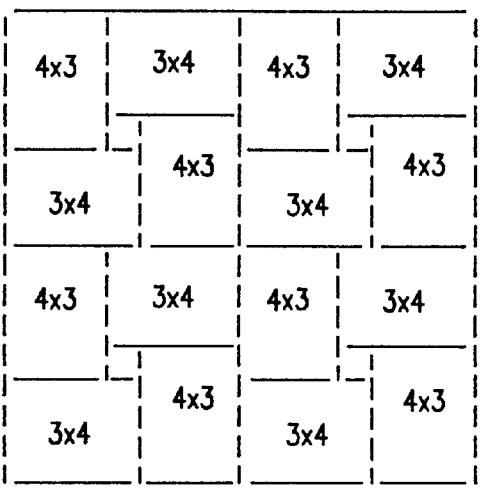
Figure 4M:
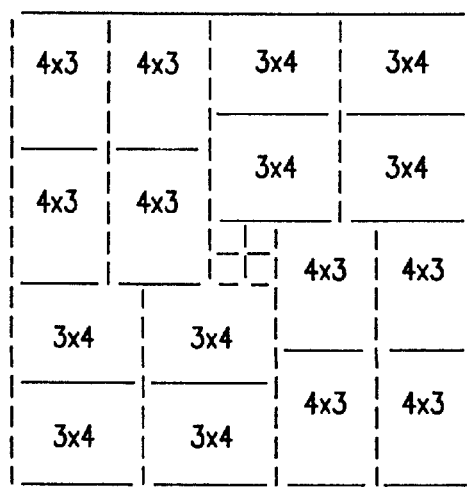

It will be apparent from the above discussions that the method of constructing Layouts 420 for screens as combinations of Layouts 420 for smaller screens that can be combined into the larger screen can be extended to combinations of greater numbers of smaller screens, as illustrated in FIGS. 4K, 4L and 4M, which respectively illustrate a Layout 422 for a 7×7 screen as a combination of Layouts 420 for four 4×3 and 3×4 screens, a Layout 422 for a 14×14 screen as a combination of Layouts 420 for 16 4×3 and 3×4 screens, and a 14×14 screen as a different combination of Layouts 420 for 16 4×3 and 3×4 screens. It is also shown in FIGS. 4K, 4L and 4M that the resulting screen need not have "faults" or lines of rotational or reflective symmetry among the smaller screens comprising the larger screen.

Finally in this respect, the Plans 422 for composite layouts for larger screens comprised of two or more smaller screens may be tabulated into Layout Tables 412 by listing the Plans 422 by its subparts, either by assigned serial numbers or by populations, rather than by the member icons, and that the definitions of the composite Plans 422 can cascade.

Also, the previously discussed methods for generating additional Layouts 420 from a Plan 424 stored in a Layout Table 412 by rotation or reflection of the stored Plan 424, that is, its corresponding Layout 422, may be used to generate additional composite Layouts 420 by rotation or reflection of the stored composite Plan 424.

e. Using Plans 422

As discussed above, a user of a Visual Links Organizer 166, and in particular Display Generator 141 and one or more Layout Tables 412, will generate requirements such as "for a 12×10 screen, provide a plan for placing population 3 3 2 1." Such a need is satisfied (or not) by a linear scan of the appropriate Layout Table 412 for the first Plan 424 that contains at least the desired population. The result of the search is either a Plan 424 or a failure, the latter meaning that the stated population of icons cannot be arranged on specified screen. although it should be noted that if the specified screen is inverted with respect to screen for which a Plan 424 exists, the request may be satisfied by inverting the Plan 424 for the screen for which a Plan 424 is found.

As described above, a Plan 424 is a specific geometric layout for the stated numbers of icons of the specified types and for the specified screen and the user may use the Plan 424 unaltered or, for the sake of variety in the appearances of numerous similar layouts, may perform various alterations to the Plan 424 to vary the visual appearance of the Plan 424.

For example, criteria for the search for a Plan 424 is satisfied if the search population is a subpopulation of an existing Plan 424. Therefore, and if the user does not have additional icons of the number and types necessary to fill the available space in the Layout 422 represented by the Plan 424, there is at least some flexibility as to which of the icon positions to use and which to leave blank, thereby varying the visual appearance of the Layout 422. The choice of which icons positions to fill may be made, for example, at the individual discretion of the user, for example, using "drag and drop" or "point and click" operations to associate icons with locations, or the locations may be assigned by means of a random number generator, perhaps, in the instance of reuse of the same Layout 422, using the assignments for an earlier use of the Layout 422 as a seed for the later uses of the Layout 422.

In further example, the visual appearance of a Layout 422 may be varied by rotating or reflecting the Layout 422 about, for example, the vertical or horizontal axis or the 1, 5, 7, B orientations of the Plan 424, either at random or by user selection. Also, if the specified screen is square and the population is of the form a b b a, the Layout 422 may be reoriented about the 2, 4, 8, and A axes, with reinterpretations of the icon types, such as 6-high<—>2-high and 4-high<—>3-high.

In a like manner, if the Layout 422 contains a vertical or horizontal fault, the placement of the sub-rectangles defined by the fault may be exchanged or, if there exists s sub-rectangle in Layout 422, the area of the sub-rectangle may be reoriented by along the 5, 7, or B axes or, if there is a subsquare and its subpopulation is of the form a b b a, then the icons of the subpopulation of the subsquare may be reoriented in a similar manner.

Finally, if there is empty space along any side of an icon, the icon may be moved vertically or horizontally to occupy the empty space.

It will be appreciated by those or ordinary skill in the relevant arts that these processes are easily programmed so as to happen automatically, and require little time to execute. It will also be apparent that it is useful to perform these operations in various orders and iteratively in various combinations, so long as new geometric layouts result.

5. Description of Visual Links 142 (FIGS. 5A–5G)

As previously discussed, for example, with reference to FIG. 1B, a Visual Link 142 may generally include a Universal Resource Locator (TRL) 128, a Title 130, a Text 132, and a Date 134, and may include Keywords 136, and will include a Graphic Icon 144. As has been described in detail above, a Graphic Icon 144 is generated or extracted from the graphics and text information present in the corresponding HTML document and which serves as a visual representation to the user of the associated document or file. The role of Graphic Icons 144 may also be fulfilled by graphic representations of various forms of files, locations or recipients on a network, such as photographs of electronic mail recipients.

In addition to representing a document, file, location or recipient, for example, in a visual index of documents, files, locations or recipient, a Graphic Icon 144 is a computer programming construct which permits a small bitmapped picture, that is, a Graphic Icon 144, to serve as an active button on the screen of a World Wide Web browser, electronic mail program or other application program. A user may then initiate access to the document, file, location or recipient for a corresponding purpose by "clicking" on the button. As has been described, Graphic Icons 144 enable users to more readily and easily recognize and remember a Web site, document, file, location or recipient, by providing a representative visual representation of the Web site, document, file, location or recipient, than do text indicators or, for example, ASCII string universal resource locators (URLs).

Figure 5A:
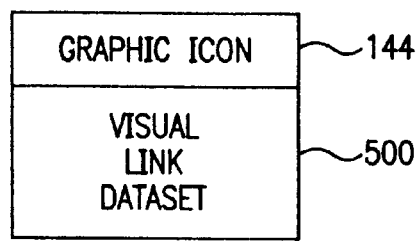

As illustrated in FIG. 5A, a Visual Link 142 concatenates, combines, or otherwise associates, a normally encoded bitmapped picture, that is, a Graphic Icon 144, with a set of Visual Link 142 data, referred to hereafter as a Visual Link Dataset 500, and includes a means for associating the Graphic Icon 144 and the Visual Link Dataset 500. The following will describe each of these elements in turn.

As has been described, the active button bitmapped picture is comprised of a Graphic Icon 144, which is, for example, on the order of 100 by 100 pixels in size and is intended to be encoded in any of the commonly known means of bitmap encoding, which include, but are not limited to, JPEG, GIF and Microsoft BMP. The image data may be compressed by any of the methods thereby supported in each case and, as used for the purposes and uses of Visual Link 142, the basic structure and detailed content of the picture file remains unaltered.

Figure 5B:
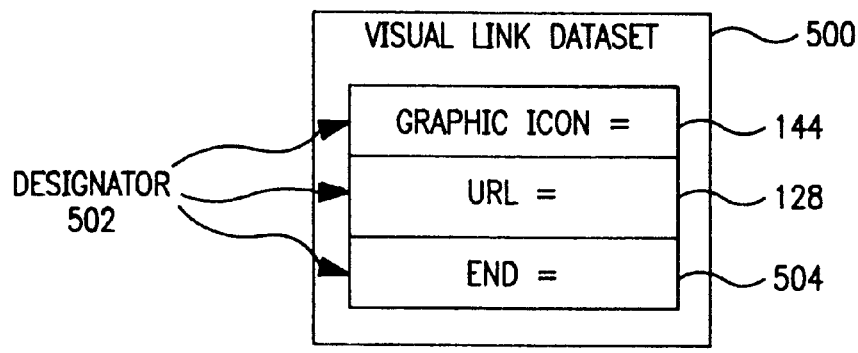

A Visual Link Dataset 500, in turn, is an ASCII file or the equivalent, such as an encrypted alphanumeric file, which contains, most essentially, a URL 128 which, in turn, is an ASCII character string, for example, http://www.netwavelink.com/pointreview.HTML. A minimum Graphic Icon 144 dataset for this example might therefore appear as illustrated in FIG. 5B wherein it is shown that this minimal Visual Link Dataset 500 includes three Designators 502, respectively indicated as Graphic Icon 144=, URL 128=http://www.netwavelink.com/pointreview.HTML, and END 504=

Each Designator 502 is a body or item of data related to the Visual Link Dataset 500 and indicates the nature of the following ASCII data, if any, and ends with the '=' character. 'URL 128' of the corresponding Designator 502 illustrated in FIG. 5B thereby represents the URL 128 of a corresponding document, site, file, location or recipient or the like, with the "=" indicating the end of the designator.

Figure 5C:
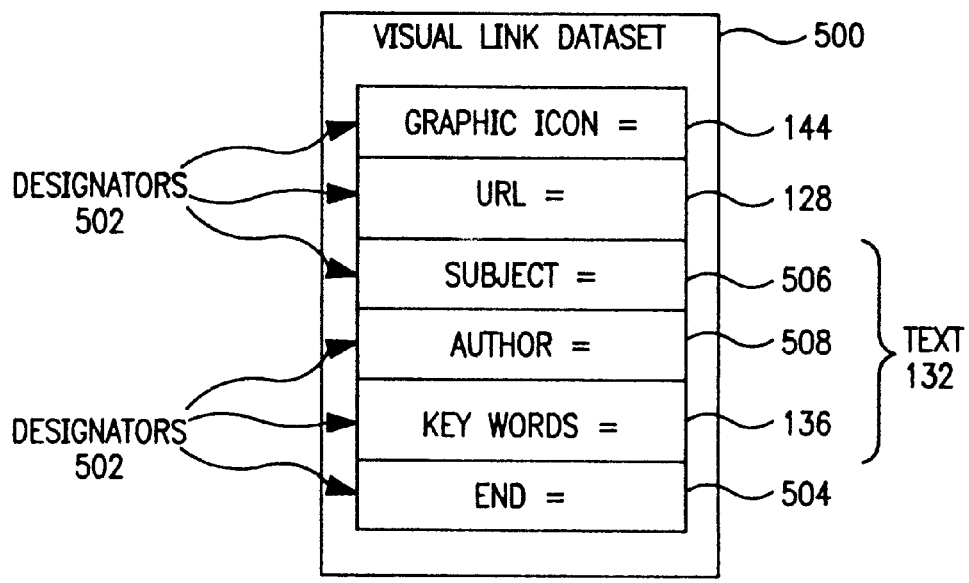

While the URL 128 Designator 502 is the crucial item for contacting a web site, the user will often find it helpful if additional relevant information is stored in the Visual Link Dataset 500, thus making information available immediately when and if the Graphic Icon 144 is stored locally. A typical Visual Link Dataset 500 with such additional information may appear as represented in FIG. 5C wherein the Visual Link Dataset 500 is illustrated as including the Designators 500 represented as Graphic Icon 144=, URL 128=, Text 132 including a Subject 506= and an Author 508=, KeyWords 136= and an END 504=. It should be noted that only Graphic Icon 144=, URL 128= and END 504= are essential and that only URL 128= absolutely requires an argument, that is, the ASCII character string or equivalent comprising the URL 128.

A further example of a rather extensive Visual Link Dataset 500 might be:

Graphic Icon 144=Version 1.0
KeyWords 136=web browser interface icon button visual internet bitmap compression thumbnail
Subject 504=web_browsing
Category=browsers
Company=Netwave, Inc.

USPS=440 Middlesex Road Tyngsboro, Mass. 01879

Phone=(603) 649-8633

FAX=(603) 649-8699

E-Mail=gmiliefsky@netwave.com

Description=Provider of "Visual Links Objects" for making cyberspace easier.

Comment=

PrevGraphic Icon 144=

URL=http://www.netwavelink.com/pointreview.HTML

SerialNo=0000000045

SeeAlso=http://www.foobar.edu/santa.clause

SeeAlso=http://www.patriot.mil/big.guns

Author=Gary Miliefsky

Created=Nov. 10, 1996

LastMod=Nov. 14, 1996

END 504=

NOTE: This dataset (Nov. 14, 1996), is intended only for the purpose of debugging the various software modules that Netwave will soon export. IT IS NOT TO BE DISTRIBUTED TO OUTSIDE PARTIES EXCEPT AS AN EXAMPLE, AND THEN ONLY TO THOSE WHO HAVE SIGNED A NON-DISCLOSURE AGREEMENT. Although this dataset was current as of Nov. 17, 1996, there may be yet newer versions, with slightly different names. Look for all files with names samp*.*.

It will be noted that this example includes text appended at the end, which may be helpful for developers or other users, and that the END 504= Designator 502 is the end of data of significance to the Graphic Icon 144 parser and hence to all computer programs that interrogate or otherwise use Graphic Icons 144.

It should also be noted that in the present implementation, Designators 502 are case-insensitive, meaning that any upper case letters and their corresponding lower case versions are interchangeable. In addition, there may be alternative forms for at least some Designators 502. For example, in order to save storage space and transmission time, at least some Designators 502 may be represented by four-character abbreviations, such as KEY= for KeyWords=. In other examples, the following Designators 502 may be represented by the corresponding following abbreviations:

Graphic Icon 144= by Icon 144=;

Comment= by COM=;

Remark= by REM=;

Date= by DAT=;

Author= by AUT=;

Contact= by CON=;

Key Words= by KEY=; and,

Subject= by SUB=.

The above illustrated group or set of Designators 502 is intended to be a growing set, with additional Designators 502 added as found necessary or advantageous for general use. It may, for example, be desirable to add a "rating system" designator whose arguments indicate the depiction or or reference to sex, nudity, violence or language unsuitable for younger age audiences. There may also be designators whose arguments hold information dealing with encryption or permissions, whereby certain parts of the dataset may be read or interpretable only by users possessing appropriately entitling decryption methods or passwords. For example, the site referenced by a URL may thus be visible or accessible only to privileged users.

It is also intended that specific users may add Designators 502 to meet their specific needs, such as failed= for the cumulative count of failures of the site to respond, found= for the count of successes at downloading from the site, and FSLS= for the count of failures since the last successful access to the site.

It is intended that Visual Link Datasets 500 may be parsed, interpreted and use by relevant systems and programs from a variety of sources. As such, it is further intended that Visual Link Datasets 500 conform to a commonly accepted set of at least minimum rules and definitions so that any given Visual Link Dataset 500 may be used, at least to the minimum necessary extent to meet the intended purpose, by any system or program conforming to these rules and definitions. The following explicit rules and definitions, or an alternative but generally similar set of rules and definitions, are exemplary of such a set of rules and definitions.

Accordingly, the following are definitions used in a presently preferred implementation of Visual Link Datasets 500:

A WHITESPACE is a contiguous string of non-printing non-ink characters, most notably space, tab, carriage return, line feed, and the implicitly understood beginning-of-file and end-of-file.

A TOKEN is a contiguous string of visibly-printed ASCII characters that appear between successive whitespaces.

A DESIGNATOR 502 is a token that ends with the character '='.

An ARGUMENT is a token not ending with '=' appearing somewhere between successive designators.

An ENTRY is logically a line of Visual Link Dataset 500 code consisting of a Designator 502 and the following argument(s), if any, up to but not including the next designator. According to a present implementation of Visual Link Datasets 500, the arguments of a designator need not appear on one line, that is, the whitespace separating arguments may be or include carriage return and/or linefeed.

In a like manner, the rules and practices for a presently preferred embodiment of the present invention include that a Visual Link Dataset 500 is comprised of:

a Graphic Icon 144= <argument(s)>;

<entry or entries other than the URL 128=>;

a URL 128= plus one argument in the form of a URL-format web address;

<entry or entries other than the URL 128=>;

END 504=; and,

<text that will be ignored by all programs, wherein the items delineated in <> above are regarded as optional.

In addition, it is presently good practice is to avoid arguments that end in '=', and when this is impossible, then to end the argument with "=" written in the form '^=', correspondingly writing the character '^' in the form "^^".

In other usages, the minimal Visual Link Dataset 500, like that depicted above, may absolutely require some designator and related arguments other than a URL=, such as an e-mail address, or phone number or postal address.

According to the presently preferred embodiment, the order, number of entries, and their content in a Visual Link Dataset 500 is arbitrary except that (1) there must be one and only one Graphic Icon 144=, URL 128= and END 504=, (2) the very first token of a Visual Link Dataset 500 must be Graphic Icon 144=, except that this token is not required in the Visual Link Dataset 500 version wherein the Graphic Icon 144 and the Visual Link Dataset 500 are contained in a single file as the dataset need not point to the icon, (3) the first and probably only argument of the URL 128= token must be, or at least thought to be, a bona fide URL 128, and (4) the END 504= entry is the last entry or token of the file that will be recognized and treated by support programs that parse or use Visual Links 142.

Also, and for purposes of human creation, examination and/or editing, it is preferable that a Visual Link Dataset 500 be comprised of human readable characters, such as ASCII printing characters, blank, carriage return and line feed.

As has been described herein, a Visual Link Dataset 500 may be generated automatically by a capture engine, such as a Visual Link Capture Engine 138, whereby Web sites are interrogated and the Graphic Icon 144 bitmap picture selected and other data gleaned by downloading and scanning the HTML file from each site. Since a Visual Link Dataset 500 is encoded as an ASCII file, however, a Visual Link Dataset 500 may alternatively be generated manually, for example, by a person using a text editor such as a normal word-processing program.

Having considered Graphic Icons 144 and Visual Link Datasets 500 herein above, the following will consider the means for association of a Graphic Icon 144 and a Visual Link Dataset 500 to construct a Visual Link 142. Association of Picture and Graphic Icon 144 Dataset.

As discussed, a Visual Link 142 consists essentially of a picture, that is, a Graphic Icon 144, and a Visual Link Dataset 500, which must be associated with one another to form an entity referred to herein as a Visual Link 142. and a Graphic Icon 144 dataset. This may be accomplished in several ways, as illustrated in FIGS. 5D through 5G, the presently preferred method being illustrated in FIG. FIG. 5F.

Referring first to FIG. 5D, in this embodiment the Graphic Icon 144 picture is described in a typical graphic or image file format, such as JPEG or GIF, with pixel data compressed or not, and is this file is completely isolated from the Visual Link Dataset 500, forming a separate file, and is unaltered. The association between the Graphic Icon 144 file and the Visual Link Dataset 500 file is maintained on a higher level, for example, in a database or link file structure, identified in FIG. 5D as Link 510 that contains at least the relative or absolute Pathnames 512A and 512B of the two files, or the equivalent.

Advantages of this embodiment is that the picture file may be used in any and all of the possible ways that are relevant to the format of the encoded bitmap picture, as can be the Visual Link Dataset 500 file, and the Graphic Icon 144 picture file and the Visual Link Dataset 500 file are individually created or modified more easily. A disadvantage of this embodiment, however, is that three items, the Graphic Icon 144 file, the Visual Link Dataset 500 file and the database or file structure relating the two, must be maintained in agreement, and that more care and/or utilities are thereby needed to maintain between the components of the Visual Link 142.

An alternate embodiment is illustrated in FIG. 5E wherein it is shown that the Graphic Icon 144 picture file and the Visual Link Dataset 500 file are again separate files but that the association between them is indicated in a Designator 502 in the Visual Link Dataset 500, such as 'PIC 514='. In this embodiment, the argument of PIC 514= is the absolute or relative pathname, or equivalent for the Graphic Icon 144 picture file, thereby eliminating the database of file structure used in the embodiment of FIG. 5D to relate the Graphic Icon 144 and the Visual Link Dataset 500. The advantages of the embodiment illustrated in FIG. 5E are the same as for the embodiment illustrated in FIG. 5D, and the disadvantages are similar in that there are still two files whose locations and/or contents must be maintained consistently, although the disadvantages are reduced with respect to the embodiment of FIG. 5D.

Yet another embodiment, and in this instance the presently preferred embodiment, is illustrated in FIG. 5F. As illustrated therein, the Visual Link Dataset 500 is appended to an otherwise unaltered Graphic Icon 144 picture to form a single File 516, which may typically be an image file, wherein a Length-of-Dataset Number 518A is appended to the Visual Link Dataset 500 in the single File 516 and represents the location of the beginning of the Visual Link Dataset 500 in the File 516 relative to the end of the File 516, and thereby the end of the Graphic Icon 144 picture in the File 516 relative to the end of the File 516. The beginning of the Visual Link Dataset 500 is thereby found by seeking to end-of-file minus size of Length-of-Dataset Number 518A, interpreting the Length-of-Dataset Number 518A found at that location, and seeking backward this number of bytes to find the beginning of the Visual Link Dataset 500 component, and the end of the Graphic Icon 144 picture component.

In the present embodiment, Length-of-Dataset Number 518A is stored as a fixed number of ASCII characters, such as four, and high digit first, rather than as an n-byte number, thereby avoiding possible confusion that could arise from differences in byte order of words and double words, and differences in bit order in a byte, in different systems. In yet other implementations of the embodiment shown in FIG. 5F, Length-of-Dataset Number 518A may be accompanied by a URL Pointer 518B identifying the location of the URL 128 Designator 502 in the file and an END Pointer 518C identifying the location of the END 504= Designator 502 in the file.

It will be apparent that the advantages of this embodiment are that there is only one file to maintain, move or copy and that the entire file can be used for most purposes relevant to the display of a non-augmented picture file, such as a display on a screen. It should be noted, however, that if Graphic Icons 144 are dealt with only by programs designed specifically for this purpose, this problem should not arise.

Possible disadvantages could arise in this embodiment due to the structure of the file wherein the actual length of the composite file is different from the length of the file as may be declared within the image file subpart as the user or program constructing this part has generally not anticipated an appendment. That is, the declared length of the composite file would typically be based upon the size of one component of the file, such as the Graphic Icon 144 component of the file if the composite file is treated as a normal picture file. If it is operated upon by a utility that operates upon the file based upon the declared and expected end-of-file length, the utility may read and operate upon the expected rather than actual length of the file. As a consequence, portions of the file, such as the Visual Link Dataset 500 component, may not be operated upon and may, for example, be truncated in a copy or move operation. The same problem may arise when a person or program copies the file into a buffer that accommodates only the self-declared size of the picture file as declared in the image part of the file.

In a related potential problem, any editor that is selected for use in modifying the file must be chosen so as to not make end of line or file modifications or other conversions that might alter the data stored in, for example, the Graphic Icon 144 picture component. In this instance, it may be preferable that the Visual Link Dataset 500 component of the composite file be split off from the composite for editing, and the two files subsequently re-concatenated.

It will be noted, however, that a system's file system will generally know or recognize the actual complete size or length of the file and it is only the length indicator or indicators within the image part of the file that may give misleading indications of the length of the composite file. Programs or utilities that do not rely only on the self declared length of the image part of the file will therefore generally avoid such problems.

In a fourth alternate embodiment, many bitmap picture file protocols, such as those for JPEG and GIF, accommodate application specific extensions or inclusions and, in these instance, the Visual Link Dataset 500 could be added to the Graphic Icon 144 image file as an application specific extension. This embodiment is advantageous in corresponding to established standards of the field of art and in relaxing or avoiding at least some of the caveats discussed above in appending a Visual Link Dataset 500 component to an image file. A disadvantage, however, is that utility programs for dealing with the Visual Link Dataset 500 components of the resulting composite files must be custom-designed or adjusted to each such image file format.

Finally, those of skill in the relevant arts will appreciate that there are still further methods for associating the two files. For example, a common basename with different extensions, such as 'elephant.gif' and 'elephant.txt', would have essentially the advantages and disadvantages discussed above with regard to the embodiment illustrated in FIG. 5E.

7. Hash Protection of Files Such as Visual Links 142 (FIGS. 6A and 6B)

Referring to FIG. 6A, therein is represented a Hashing Protection Mechanism 600 implemented, for example, in a Local System 112 or a Server System 114 for encoding computer system files, such as a Visual Link 142 file, to allow detection of the unauthorized construction or modification of such files.

Hashing Protection Mechanism 600 performs this function for a File 602 by reading a Encrypting Part 604 of the Data 606 of the File 602, wherein Encrypting Part 604 comprises at least a part of Data 606, and generating a "Hash" Encrypted Value 608 by performing a known hashing operation on Encrypting Part 604. Hashing Protection Mechanism 600 then associates the Hash Encrypted Value 608 with the File 602, for example, by embedding Hash Encrypted Value 608 as a Stored Hash Encrypted Value 608S in a Storing Part 610 of Data 606 that is not included or contained within Encrypting Part 604. For these purposes, and as illustrated in FIG. 6A, Hashing Protection Mechanism 600 includes a File Reader 612 for identifying and reading an Encrypting Part 604 of a File 602, a Hashing Mechanism 614 for performing the hashing operation on the Encrypting Part 604, and a File Writer 616 for writing Stored Hash Encrypted Value 608S into Storing Part 610.

Thereafter, Hashing Protection Mechanism 600 may determine whether there has been an unauthorized construction or modification of a File 602 has been altered by reading Encrypting Part 604, performing the hashing operation on Encrypting Part 604 to determine a Confirmation Hash Encrypted Value 608C, and comparing the Confirmation Hash Encrypted Value 608C with the Stored Hash Encrypted Value 608S from Storing Part 610. For these purposes, and as illustrated in FIG. 6A, Hashing Protection Mechanism 600 again includes File Reader 612 for reading Encrypting Part 604 and Hashing Mechanism 614 for generating a Confirmation Hash Encrypted Value 608C from Entrypting Part 604. Hashing Protection Mechanism 600 further includes Comparator 618 for reading the Stored Hash Encrypted Value 6908S from Storing Part 610 comparing the Stored Hash Encrypted Value 608S and the Confirmation Hash Enctrypted Value 608C to determine whether the File 602 has be properly constructed or modified by an authorized user or system.

It will be apparent that, because the specific hashing algorithm used in the hashing operation is known or available only to users or systems authorized to construct or modify Files 602, only an authorized user or system will be able to generate a Confirmation Hash Encrypted Value 608C from Encrypting Part 604 that is equal to the Stored Hash Encrypted Value 608 S. If the values are equal, then the File 602 has not been constructed or modified without proper authorization and, if the values are not equal then the File 602 has been constructed or modified with a hashing algorithm different from that available and known to the authorized users or systems. This method assumes, of course, that the hashing algorithm is held in secrecy, which is a common requirement for amost all protection mechanisms, and that the algorithm is sufficiently complex to avoid accidental or easy discovery, which is a general requirement of all protection mechanisms and a common characteristic of many hashing algorithms.

According to the present invention, Storing Part 610 in which Stored Hash Encrypted Value 608C is stored is comprised of portions of Data 606 that are not only separate from Encrypting Part 604 but also are characterized by having alternate forms of expression, that is, different states, that are semantically equivalent to a user or a computer system, and wherein the alternate, semantically equivalent states of the Data 606 in Storing Part 610 are used to encode the Stored Hash Encrypted Value 608C.

For example, there may be portions of Data 606 comprised of legible words or pseudo-words or abbreviations in English text that, for their primary purpose are semantically equivalent to a human user, such as "END" and "end", or that are treated in a case insensitive manner by a system. Assuming, for example, that a Stored Hash Encrypted Value 608C is comprised of or expressed as a binary string, such as "101", and that an upper case letter is used to indicate a "1" while a lower case letter is used to represent a "0", this Stored Hash Encrypted Value 608C could be encoded in the word "end" as "EnD" so long as this expression of "end" was, as necessary for its primary purpose, semantically equivalent to a user or that a system treated the word in a case insensitive manner. Thus, "end", "End", "eNd", "enD", "ENd", "EnD", "eND", and "END" could all be used to encode different Stored Hash Encrypted Values 608C if these varients of "end" had equivalent meanings to a user or a system, as necessary for the primary purpose of the word.

Therefore, minute differences in ASCII code, for example, may signify bits of a Stored Hash Encrypted Value 608C, with one bit of the Stored Hash Encrypted Value 608C being represented by each ASCII character or string of identically treated ASCII characters, so long as the use of alternate versions of the characters or strings of characters did not interfere with the primary functions of the characters. Also, and as described above, these characters or strings of characters may not or should not be used as the Encrypting Part 604. In addition, the parts of a file that are used for Encrypting Part 604 and for Storing Part 610 should be easily identifiable and locatable by a system.

This method of the present invention for encoding a hash encrypted value generated from portions of the data of a file and stored in other portions of the data of the file having alternate but semantically equivalent expressions that may be used to encode the hash encrypted valued is illustrated in FIGS. 6B-1 and 6B-2 wherein FIG. 6B-1 represents an original file and FIG. 6B-2 represents the same file with the bits of the hash encrypted value, which are listed in a column at the left of the file, encoded in the corresponding case-distinguishing bits of the ASCII characters used to encode the hash encrypted value. It will be noted that the substrings of characters that are considered as valid for encoding by alternate expression are all contiguous substrings of letters terminated by the "=" sign. It will also be noted that, for cosmetic reasons, in each such substring all characters but the first share the same change, that is, the same alternate form of expression and collectively represent one bit of the hash encrypted value, and that the beginning character of each substring is left in the upper case state.

It may be apparent, therefore, that the hashing protection method and mechanism of the present invention is no more complex and requires no more effort, for example, in maintaining the secrecy of the hashing algorithm, than alternate protection mechanisms. It is further apparent that the hashing protection method and mechanism of the present invention is advantageous in that the encrypted hash value is stored in a non-intrusive manner that takes no extra space in a file and does not change the encrypted hash value of the file and in a manner that does not impede human or system interpretation of the data in the file.

Finally, while the invention has been particularly shown and described with reference to preferred embodiments of the apparatus and methods thereof, it will be also understood by those of ordinary skill in the art that various changes, variations and modifications in form, details and implementation may be made therein without departing from the spirit and scope of the invention as defined by the appended claims. Therefore, it is the object of the appended claims to cover all such variation and modifications of the invention as come within the true spirit and scope of the invention.

What is claimed is:

1. In a system including a local system connected through a network to a plurality of remote systems, the local system including a memory for storing data and programs, a processor operating under control of the programs to perform operations on the data, and a display, a visual link mechanism residing in the local system for identifying addresses of locations in the plurality of remote systems, comprising:

a visual link library for storing visual links wherein each visual link corresponds to an address of a location in the plurality of remote systems, and a network access mechanism connected to the network for displaying the visual links to a user and allowing the user to select a visual link representing a corresponding location in a remote system, and responsive to the visual link selected by the user, for accessing the location represented by the selected visual link, wherein each visual link is an entity having an existence independent of the system environment in which a visual link resides and includes a graphic icon providing a displayable image representing the corresponding location, and the address of the corresponding location.

2. The visual link mechanism of claim 1, wherein each visual link further comprises:

alphanumeric information relating to the corresponding location.

3. The visual link mechanism of claim 2, wherein the alphanumeric information comprises:

a title identifying the location, and text describing the location.

4. The visual link mechanism of claim 3, wherein the alphanumeric information further comprises:

keywords relating to the contents of the location.

5. The visual link mechanism of claim 1, wherein each visual link comprises:

the graphic icon providing a displayable image representing the corresponding location, and a visual link dataset containing information relating to the location, including the address of the corresponding location.

6. The visual link mechanism of claim 5, wherein each visual link dataset comprises:

a plurality of designators, each designator storing corresponding information relating to the corresponding location and including a graphic icon designator for storing an identification of the corresponding graphic icon, an address designator for storing the address of the corresponding location, and an end designator for indicating the end of the visual link dataset.

7. The visual link mechanism of claim 6, wherein the designators further comprise:

a subject designator for storing text information identifying the contents of the location, an author designator for storing text information identifying the author of the contents of the location, a keyword designator for storing key words relating to the contents of the location.

8. The visual link mechanism of claim 5, further comprising:

a link for relating the graphic icon and the visual link dataset.

9. The visual link mechanism of claim 8 wherein the link comprises a file for storing a pathname of the graphic icon and a pathname of the visual link dataset.

10. The visual link mechanism of claim 8 wherein the link comprises a graphic icon pointer designator stored in the visual link dataset for storing an identification of the graphic icon.

11. The visual link mechanism of claim 1, wherein the network access mechanism comprises:

a layout table for storing a plurality of plans for arranging and displaying a plurality of graphic icons of a plurality of predetermined dimensions and proportions in display spaces, each plan corresponding to a display space of predetermined dimensions and to a predetermined number of graphic icons of a plurality of predetermined dimensions and proportions and defining the arrangement of the graphic icons in the display space, a input for providing a set of display definition inputs, each set of display definition inputs including a display space definition identifying the dimensions of a display space, and a set of visual object definitions identifying a set of graphic icons of a predetermined number and of a plurality of predetermined dimensions and proportions to be displayed in the display space, a display generator responsive to the display definition inputs for reading from the layout memory a plan corresponding to a set of display definition inputs and generating a display of the identified set of graphic icons in the display space according to the corresponding plan and displaying the identified set of graphic icons on the display.

12. The visual link mechanism of claim 11, wherein the input for providing a set of display definition inputs comprises:
   a visual link display memory for storing groups of identifications of visual links, each group of identifications of visual links being a set of visual object definitions identifying a set of graphic icons of a predetermined number and of predetermined dimensions to be displayed in the display space.

13. The visual link mechanism of claim 1 wherein the network access mechanism comprises:
   a visual links organizer connected to the display for displaying the visual links to a user and allowing the user to select a visual link representing a corresponding location in a remote system, and
   a network communication mechanism connected to the visual links organizer and responsive to the visual link selected by the user for accessing the location represented by the selected visual link.

14. The visual link mechanism of claim 1, further comprising:
   a visual link screen saver connected from the visual link library and to the display and responsive to operations of the local system for generating a visual link screen saver display of selected graphic icons on the display,
   the screen saver being responsive to an indication of a displayed graphic icon of the visual link screen saver display for invoking the a network access mechanism for accessing the location represented by the selected visual link corresponding to the selected graphic icon.

15. In a system including a local system connected through a network to a plurality of remote systems, the local system including a memory for storing data and programs, a processor operating under control of the programs to perform operations on the data, and a display, a visual link mechanism residing in the local system for identifying addresses of locations in the plurality of remote systems, comprising:
   a visual link library for storing visual links wherein each visual link corresponds to an address of a location in the plurality of remote systems, and
   a network access mechanism connected to the network for displaying the visual links to a user and allowing the user to select a visual link representing a corresponding location in a remote system, and
      responsive to the visual link selected by the user, for accessing the location represented by the selected visual link, wherein
   each visual link includes
      a graphic icon providing a displayable image representing the corresponding location, and
      a visual link dataset containing information relating to the location, including the address of the corresponding location, wherein
   the graphic icon and the visual link dataset are stored in a single file, the graphic icon being stored starting at the beginning of the file and the visual link dataset following the graphic icon, and wherein
   the visual link dataset further includes a length of dataset number stored near the end of the file and indicating the location of the start of the visual link dataset relative to the end of the file.

16. The visual link mechanism of claim 15, wherein the visual link dataset further includes an address pointer and an end pointer stored preceding the length of dataset number and indicating the locations of the address designator and the end designator in the file.

* * * * *